US012561624B1

(12) United States Patent
Wang et al.

(10) Patent No.: US 12,561,624 B1
(45) Date of Patent: Feb. 24, 2026

(54) METHOD AND SYSTEM TO AUTOMATE TASK ASSIGNMENT

(71) Applicant: Samsara Inc., San Francisco, CA (US)

(72) Inventors: Jing Wang, Toronto (CA); Alexander Viktor Puzyk, San Francisco, CA (US); William Evan Welbourne, Seattle, WA (US); Sarthak Rajvanshi, Brookline, MA (US); Sharan Srinivasan, Sunnyvale, CA (US); Rohit Sanjay Annigeri, Santa Clara, CA (US)

(73) Assignee: Samsara Inc., San Francisco, CA (US)

( * ) Notice: Subject to any disclaimer, the term of this patent is extended or adjusted under 35 U.S.C. 154(b) by 58 days.

(21) Appl. No.: 18/051,618

(22) Filed: Nov. 1, 2022

(51) Int. Cl.
G06Q 10/06 (2023.01)
G06Q 10/0631 (2023.01)
G06Q 10/083 (2023.01)

(52) U.S. Cl.
CPC ... G06Q 10/063112 (2013.01); G06Q 10/083 (2013.01)

(58) Field of Classification Search
None
See application file for complete search history.

(56) References Cited

U.S. PATENT DOCUMENTS

| | | | |
|---|---|---|---|
| 4,671,111 | A | 6/1987 | Lemelson |
| 5,825,283 | A | 10/1998 | Camhi |
| 5,917,433 | A | 6/1999 | Keillor et al. |
| 6,064,299 | A | 5/2000 | Lesesky et al. |
| 6,098,048 | A | 8/2000 | Dashefsky et al. |
| 6,157,864 | A | 12/2000 | Schwenke et al. |
| 6,253,129 | B1 | 6/2001 | Jenkins et al. |
| 6,317,668 | B1 | 11/2001 | Thibault et al. |
| 6,411,203 | B1 | 6/2002 | Lesesky et al. |
| 6,421,590 | B2 | 7/2002 | Thibault |

(Continued)

FOREIGN PATENT DOCUMENTS

| | | |
|---|---|---|
| CN | 111047179 A | 4/2020 |
| DE | 10 2004 015 221 A1 | 10/2005 |

(Continued)

OTHER PUBLICATIONS

US 11,450,210 B2, 09/2022, Tsai et al. (withdrawn)

(Continued)

*Primary Examiner* — Matthew D Henry
(74) *Attorney, Agent, or Firm* — Knobbe, Martens, Olson & Bear, LLP

(57) ABSTRACT

A management server system may obtain data associated with a vehicle. The management server system may obtain the data from sensors and a dashcam within the vehicle. The management server system may determine a driver and/or vehicle profile based on the collected data and make assignments of drivers and/or vehicles to particular delivery tasks. The driver and/or vehicle profile may be generated by applying an encoder of a neural network. A second ranking neural network can be applied to generate ranking scores for each driver and/or vehicle for a particular delivery task, which can be used to select the optimal driver and/or vehicle for the delivery. The management server system may apply the driver and/or vehicle profile with potential routes for a delivery task to a neural network to identify a recommended route for the delivery task.

20 Claims, 11 Drawing Sheets

(56) References Cited

U.S. PATENT DOCUMENTS

| | | |
|---|---|---|
| 6,452,487 B1 | 9/2002 | Krupinski |
| 6,505,106 B1 | 1/2003 | Lawrence et al. |
| 6,651,063 B1 | 11/2003 | Vorobiev |
| 6,714,894 B1 | 3/2004 | Tobey et al. |
| 6,718,239 B2 | 4/2004 | Rayner |
| 6,741,165 B1 | 5/2004 | Langfahl et al. |
| 6,801,920 B1 | 10/2004 | Wischinski |
| 7,117,075 B1 | 10/2006 | Larschan et al. |
| 7,139,780 B2 | 11/2006 | Lee et al. |
| 7,209,959 B1 | 4/2007 | Campbell et al. |
| 7,233,684 B2 | 6/2007 | Fedorovskaya et al. |
| 7,386,376 B2 | 6/2008 | Basir et al. |
| 7,389,178 B2 | 6/2008 | Raz et al. |
| 7,398,298 B2 | 7/2008 | Koch |
| 7,492,938 B2 | 2/2009 | Brinson, Jr. et al. |
| 7,526,103 B2 | 4/2009 | Schofield et al. |
| 7,555,378 B2 | 6/2009 | Larschan et al. |
| 7,596,417 B2 | 9/2009 | Fister et al. |
| 7,606,779 B2 | 10/2009 | Brinson, Jr. et al. |
| 7,715,961 B1 | 5/2010 | Kargupta |
| 7,769,499 B2 | 8/2010 | McQuade et al. |
| 7,844,088 B2 | 11/2010 | Brinson, Jr. et al. |
| 7,859,392 B2 | 12/2010 | McClellan et al. |
| 7,877,198 B2 | 1/2011 | Tenzer et al. |
| 7,881,838 B2 | 2/2011 | Larschan et al. |
| 7,957,936 B2 | 6/2011 | Eryurek et al. |
| 8,019,581 B2 | 9/2011 | Sheha et al. |
| 8,024,311 B2 | 9/2011 | Wood et al. |
| 8,032,277 B2 | 10/2011 | Larschan et al. |
| 8,140,358 B1 | 3/2012 | Ling et al. |
| 8,156,108 B2 | 4/2012 | Middleton et al. |
| 8,156,499 B2 | 4/2012 | Foulger et al. |
| 8,169,343 B2 | 5/2012 | Sheha et al. |
| 8,175,992 B2 | 5/2012 | Bass, II et al. |
| 8,230,272 B2 | 7/2012 | Middleton et al. |
| 8,260,489 B2 | 9/2012 | Nielsen et al. |
| 8,417,402 B2 | 4/2013 | Basir |
| 8,442,508 B2 | 5/2013 | Harter et al. |
| 8,457,395 B2 | 6/2013 | Boncyk et al. |
| 8,509,412 B2 | 8/2013 | Sheha et al. |
| 8,543,625 B2 | 9/2013 | Middleton et al. |
| 8,560,164 B2 | 10/2013 | Nielsen et al. |
| 8,615,555 B2 | 12/2013 | Koch |
| 8,625,885 B2 | 1/2014 | Brinson, Jr. et al. |
| 8,626,568 B2 | 1/2014 | Warkentin et al. |
| 8,633,672 B2 | 1/2014 | Jung et al. |
| 8,669,857 B2 | 3/2014 | Sun et al. |
| 8,682,572 B2 | 3/2014 | Raz et al. |
| 8,706,409 B2 | 4/2014 | Mason et al. |
| 8,831,825 B2 | 9/2014 | Shah et al. |
| 8,836,784 B2 | 9/2014 | Erhardt et al. |
| 8,918,229 B2 | 12/2014 | Hunt et al. |
| 8,953,228 B1 | 2/2015 | Mehers |
| 8,989,914 B1 | 3/2015 | Nemat-Nasser et al. |
| 8,989,959 B2 | 3/2015 | Plante et al. |
| 8,996,240 B2 | 3/2015 | Plante |
| 9,024,744 B2 | 5/2015 | Klose et al. |
| 9,053,590 B1 | 6/2015 | Kator et al. |
| 9,137,498 B1 | 9/2015 | L'Heureux et al. |
| 9,147,335 B2 | 9/2015 | Raghunathan et al. |
| 9,152,609 B2 | 10/2015 | Schwartz et al. |
| 9,165,196 B2 | 10/2015 | Kesavan et al. |
| 9,170,913 B2 | 10/2015 | Hunt et al. |
| 9,189,895 B2 | 11/2015 | Phelan et al. |
| 9,230,250 B1 | 1/2016 | Parker et al. |
| 9,230,437 B2 | 1/2016 | Brinton et al. |
| 9,280,435 B2 | 3/2016 | Hunt et al. |
| 9,311,271 B2 | 4/2016 | Wright |
| 9,344,683 B1 | 5/2016 | Nemat-Nasser et al. |
| 9,349,228 B2 | 5/2016 | Ochsendorf et al. |
| 9,384,111 B2 | 7/2016 | Hunt et al. |
| 9,389,147 B1 | 7/2016 | Lambert et al. |
| 9,402,060 B2 | 7/2016 | Plante |
| 9,412,282 B2 | 8/2016 | Hunt et al. |
| 9,439,280 B2 | 9/2016 | Chang et al. |
| 9,445,270 B1 | 9/2016 | Bicket et al. |
| 9,477,639 B2 | 10/2016 | Fischer et al. |
| 9,477,989 B2 | 10/2016 | Grimm et al. |
| 9,527,515 B2 | 12/2016 | Hunt et al. |
| 9,594,725 B1 | 3/2017 | Cook et al. |
| 9,672,667 B2 | 6/2017 | Mason et al. |
| 9,688,282 B2 | 6/2017 | Cook et al. |
| 9,728,015 B2 | 8/2017 | Kwak |
| 9,761,063 B2 | 9/2017 | Lambert et al. |
| 9,761,067 B2 | 9/2017 | Plante et al. |
| 9,811,536 B2 | 11/2017 | Morris et al. |
| 9,818,088 B2 | 11/2017 | Penilla et al. |
| 9,846,979 B1 | 12/2017 | Sainaney et al. |
| 9,849,834 B2 | 12/2017 | Reed et al. |
| 9,852,625 B2 | 12/2017 | Victor et al. |
| 9,892,376 B2 | 2/2018 | Pfeiffer et al. |
| 9,922,567 B2 | 3/2018 | Molin et al. |
| 9,934,628 B2 | 4/2018 | Kreiner et al. |
| 9,996,980 B1 | 6/2018 | Gonzalez et al. |
| 10,015,452 B1 | 7/2018 | Schofield et al. |
| 10,033,706 B2 | 7/2018 | Bicket et al. |
| 10,040,459 B1 | 8/2018 | Kukreja |
| 10,065,652 B2 | 9/2018 | Shenoy et al. |
| 10,068,392 B2 | 9/2018 | Cook et al. |
| 10,075,669 B2 | 9/2018 | Vanman et al. |
| 10,083,547 B1 | 9/2018 | Tomatsu |
| 10,085,149 B2 | 9/2018 | Bicket et al. |
| 10,094,308 B2 | 10/2018 | Kolhouse et al. |
| 10,102,495 B1 | 10/2018 | Zhang et al. |
| 10,127,810 B2 | 11/2018 | Durie, Jr. et al. |
| 10,157,321 B2 | 12/2018 | Becker et al. |
| 10,173,486 B1 | 1/2019 | Lee et al. |
| 10,173,544 B2 | 1/2019 | Hendrix et al. |
| 10,196,071 B1 | 2/2019 | Rowson et al. |
| 10,206,107 B2 | 2/2019 | Bicket et al. |
| 10,223,935 B2 | 3/2019 | Sweany et al. |
| 10,275,959 B2 | 4/2019 | Ricci |
| 10,286,875 B2 | 5/2019 | Penilla et al. |
| 10,290,036 B1 | 5/2019 | Gella et al. |
| 10,311,749 B1 | 6/2019 | Kypri et al. |
| 10,336,190 B2 | 7/2019 | Yokochi et al. |
| 10,388,075 B2 | 8/2019 | Schmirler et al. |
| 10,389,739 B2 | 8/2019 | Solotorevsky |
| 10,390,227 B2 | 8/2019 | Bicket et al. |
| 10,444,949 B2 | 10/2019 | Scott et al. |
| 10,445,559 B2 | 10/2019 | Joseph et al. |
| 10,459,444 B1 | 10/2019 | Kentley-Klay |
| 10,460,183 B2 | 10/2019 | Welland et al. |
| 10,460,600 B2 | 10/2019 | Julian et al. |
| 10,471,955 B2 | 11/2019 | Kouri et al. |
| 10,486,709 B1 | 11/2019 | Mezaael |
| 10,489,222 B2 | 11/2019 | Sathyanarayana et al. |
| 10,523,904 B2 | 12/2019 | Mahmoud et al. |
| 10,573,183 B1 | 2/2020 | Li et al. |
| 10,579,123 B2 | 3/2020 | Tuan et al. |
| 10,609,114 B1 | 3/2020 | Bicket et al. |
| 10,621,873 B1 | 4/2020 | Spiel et al. |
| 10,623,899 B2 | 4/2020 | Watkins et al. |
| 10,632,941 B2 | 4/2020 | Chauncey et al. |
| 10,652,335 B2 | 5/2020 | Botticelli |
| 10,715,976 B2 | 7/2020 | Hoffner et al. |
| 10,762,363 B2 | 9/2020 | Watanabe |
| 10,782,691 B2 | 9/2020 | Suresh et al. |
| 10,788,990 B2 | 9/2020 | Kim et al. |
| 10,789,840 B2 | 9/2020 | Boykin et al. |
| 10,803,496 B1 | 10/2020 | Hopkins |
| 10,818,109 B2 | 10/2020 | Palmer et al. |
| 10,827,324 B1 | 11/2020 | Hajimiri et al. |
| 10,843,659 B1 | 11/2020 | Innocenzi et al. |
| 10,848,670 B2 | 11/2020 | Gatti et al. |
| 10,878,030 B1 | 12/2020 | Lambert et al. |
| 10,969,852 B2 | 4/2021 | Tuan et al. |
| 10,979,871 B2 | 4/2021 | Hajimiri et al. |
| 10,999,269 B2 | 5/2021 | Bicket et al. |
| 10,999,374 B2 | 5/2021 | ElHattab et al. |
| 11,046,205 B1 | 6/2021 | Govan et al. |
| 11,069,257 B2 | 7/2021 | Palmer et al. |
| 11,080,568 B2 | 8/2021 | ElHattab et al. |
| 11,122,488 B1 | 9/2021 | Lloyd et al. |

(56) References Cited

U.S. PATENT DOCUMENTS

| | | |
|---|---|---|
| 11,126,910 B1 | 9/2021 | Akhtar et al. |
| 11,127,130 B1 | 9/2021 | Jain et al. |
| 11,131,986 B1 | 9/2021 | Gal et al. |
| 11,132,853 B1 | 9/2021 | Akhtar et al. |
| 11,137,744 B1 | 10/2021 | Heddleston et al. |
| 11,142,175 B2 | 10/2021 | Chow et al. |
| 11,158,177 B1 | 10/2021 | ElHattab et al. |
| 11,184,422 B1 | 11/2021 | Bicket et al. |
| 11,188,046 B1 | 11/2021 | ElHattab et al. |
| 11,190,373 B1 | 11/2021 | Stevenson et al. |
| 11,204,637 B2 | 12/2021 | Tuan et al. |
| 11,260,878 B2 | 3/2022 | Palmer et al. |
| 11,341,786 B1 | 5/2022 | Calmer et al. |
| 11,349,901 B1 | 5/2022 | Duffield et al. |
| 11,352,013 B1 | 6/2022 | Srinivasan et al. |
| 11,352,014 B1 | 6/2022 | Srinivasan et al. |
| 11,356,605 B1 | 6/2022 | Shemet et al. |
| 11,356,909 B1 | 6/2022 | Lloyd |
| 11,365,980 B1 | 6/2022 | Akhtar et al. |
| 11,386,325 B1 | 7/2022 | Srinivasan et al. |
| 11,436,844 B2 | 9/2022 | Carruthers et al. |
| 11,451,610 B1 | 9/2022 | Saunders et al. |
| 11,451,611 B1 | 9/2022 | Saunders et al. |
| 11,460,507 B2 | 10/2022 | Lloyd et al. |
| 11,464,079 B1 | 10/2022 | Aschenbener et al. |
| 11,479,142 B1 | 10/2022 | Govan et al. |
| 11,494,921 B2 | 11/2022 | ElHattab et al. |
| 11,522,857 B1 | 12/2022 | Symons et al. |
| 11,532,169 B1 | 12/2022 | Hassan et al. |
| 11,558,449 B1 | 1/2023 | Bicket et al. |
| 11,595,632 B2 | 2/2023 | Tsai et al. |
| 11,599,097 B1 | 3/2023 | Gal et al. |
| 11,606,736 B1 | 3/2023 | Lloyd et al. |
| 11,611,621 B2 | 3/2023 | ElHattab et al. |
| 11,615,141 B1 | 3/2023 | Hoye et al. |
| 11,620,909 B2 | 4/2023 | Tsai et al. |
| 11,627,252 B2 | 4/2023 | Delegard et al. |
| 11,641,388 B1 | 5/2023 | Saunders et al. |
| 11,641,604 B1 | 5/2023 | Lloyd |
| 11,643,102 B1 | 5/2023 | Calmer et al. |
| 11,659,060 B2 | 5/2023 | Davis et al. |
| 11,665,223 B1 | 5/2023 | Duffield et al. |
| 11,669,714 B1 | 6/2023 | Akhtar et al. |
| 11,671,478 B1 | 6/2023 | Saunders et al. |
| 11,674,813 B1 | 6/2023 | Chung et al. |
| 11,675,042 B1 | 6/2023 | Lloyd et al. |
| 11,683,579 B1 | 6/2023 | Symons et al. |
| 11,688,211 B1 | 6/2023 | Calmer et al. |
| 11,694,317 B1 | 7/2023 | Jain et al. |
| 11,704,984 B1 | 7/2023 | ElHattab et al. |
| 11,709,500 B2 | 7/2023 | Lloyd et al. |
| 11,710,409 B2 | 7/2023 | Nanda et al. |
| 11,720,087 B1 | 8/2023 | Heddleston et al. |
| 11,727,054 B2 | 8/2023 | Grandhi et al. |
| 11,731,469 B1 | 8/2023 | McGillan |
| 11,736,312 B1 | 8/2023 | Xiao et al. |
| 11,741,760 B1 | 8/2023 | Dubin et al. |
| 11,748,377 B1 | 9/2023 | Zhang et al. |
| 11,752,895 B1 | 9/2023 | Govan et al. |
| 11,756,346 B1 | 9/2023 | Wu et al. |
| 11,756,351 B1 | 9/2023 | Akhtar et al. |
| 11,758,096 B2 | 9/2023 | Shah et al. |
| 11,776,328 B2 | 10/2023 | Yang et al. |
| 11,780,446 B1 | 10/2023 | Srinivasan et al. |
| 11,782,930 B2 | 10/2023 | McGee et al. |
| 11,787,413 B2 | 10/2023 | Tsai et al. |
| 11,798,187 B2 | 10/2023 | Zaheer et al. |
| 11,798,298 B2 | 10/2023 | Hassan et al. |
| 11,800,317 B1 | 10/2023 | Dugar et al. |
| 11,838,884 B1 | 12/2023 | Dergosits et al. |
| 11,842,577 B1 | 12/2023 | Harrison et al. |
| 11,847,911 B2 | 12/2023 | ElHattab et al. |
| 11,855,801 B1 | 12/2023 | Stevenson et al. |
| 11,861,955 B1 | 1/2024 | Dubin et al. |
| 11,863,712 B1 | 1/2024 | Young et al. |
| 11,866,055 B1 | 1/2024 | Srinivasan et al. |
| 11,868,919 B1 | 1/2024 | Zhang et al. |
| 11,875,580 B2 | 1/2024 | Hassan et al. |
| 11,875,683 B1 | 1/2024 | Tsai et al. |
| 11,890,962 B1 | 2/2024 | Govan et al. |
| 11,937,152 B2 | 3/2024 | Hajimiri et al. |
| 11,938,948 B1 | 3/2024 | Davis et al. |
| 11,940,287 B2 | 3/2024 | Hou et al. |
| 11,959,772 B2 | 4/2024 | Robbins et al. |
| 11,974,410 B1 | 4/2024 | Lin et al. |
| 11,975,685 B1 | 5/2024 | Innocenzi et al. |
| 11,989,001 B1 | 5/2024 | ElHattab et al. |
| 11,995,546 B1 | 5/2024 | Srinivasan et al. |
| 11,997,181 B1 | 5/2024 | Davis et al. |
| 12,000,940 B1 | 6/2024 | Lloyd et al. |
| 12,106,613 B2 | 10/2024 | Calmer et al. |
| 12,117,546 B1 | 10/2024 | Lloyd et al. |
| 12,126,917 B1 | 10/2024 | Shemet et al. |
| 12,128,919 B2 | 10/2024 | Calmer et al. |
| 12,140,445 B1 | 11/2024 | Akhtar et al. |
| 12,150,186 B1 | 11/2024 | Aguilar et al. |
| 12,165,360 B1 | 12/2024 | Jain et al. |
| 12,168,445 B1 | 12/2024 | Srinivasan et al. |
| 12,172,653 B1 | 12/2024 | Akhtar et al. |
| 12,179,629 B1 | 12/2024 | Govan et al. |
| 12,197,610 B2 | 1/2025 | Wen et al. |
| 12,213,090 B1 | 1/2025 | Dergosits et al. |
| 12,228,944 B1 | 2/2025 | Dubin et al. |
| 12,253,617 B1 | 3/2025 | Aguilar et al. |
| 12,256,021 B1 | 3/2025 | Torres et al. |
| 12,260,616 B1 | 3/2025 | Rajan et al. |
| 12,269,498 B1 | 4/2025 | Rommel et al. |
| 12,289,181 B1 | 4/2025 | Stevenson et al. |
| 12,306,010 B1 | 5/2025 | Rommel et al. |
| 12,327,445 B1 | 6/2025 | Eberhardt et al. |
| 12,328,639 B1 | 6/2025 | Smith et al. |
| 12,344,168 B1 | 7/2025 | Wang et al. |
| 12,346,712 B1 | 7/2025 | Eberhardt et al. |
| 12,367,718 B1 | 7/2025 | Calmer et al. |
| 12,368,903 B1 | 7/2025 | Lin et al. |
| 12,426,007 B1 | 9/2025 | Aguilar et al. |
| 2002/0061758 A1 | 5/2002 | Zarlengo et al. |
| 2002/0128751 A1 | 9/2002 | Engstrom et al. |
| 2002/0169850 A1 | 11/2002 | Batke et al. |
| 2003/0081935 A1 | 5/2003 | Kirmuss |
| 2003/0154009 A1 | 8/2003 | Basir et al. |
| 2004/0093264 A1 | 5/2004 | Shimizu |
| 2004/0236476 A1 | 11/2004 | Chowdhary |
| 2004/0236596 A1 | 11/2004 | Chowdhary et al. |
| 2005/0131585 A1 | 6/2005 | Luskin et al. |
| 2005/0131646 A1 | 6/2005 | Camus |
| 2005/0286774 A1 | 12/2005 | Porikli |
| 2006/0167591 A1 | 7/2006 | McNally |
| 2007/0050108 A1 | 3/2007 | Larschan et al. |
| 2007/0173991 A1 | 7/2007 | Tenzer et al. |
| 2008/0252487 A1 | 10/2008 | McClellan et al. |
| 2008/0319602 A1 | 12/2008 | McClellan et al. |
| 2009/0099724 A1 | 4/2009 | Kranz et al. |
| 2009/0141939 A1 | 6/2009 | Chambers et al. |
| 2009/0240427 A1 | 9/2009 | Siereveld et al. |
| 2010/0030586 A1 | 2/2010 | Taylor et al. |
| 2010/0049639 A1 | 2/2010 | Ferro et al. |
| 2010/0281161 A1 | 11/2010 | Cohn et al. |
| 2011/0060496 A1 | 3/2011 | Nielsen et al. |
| 2011/0093306 A1 | 4/2011 | Nielsen et al. |
| 2011/0234749 A1 | 9/2011 | Alon |
| 2011/0276265 A1 | 11/2011 | Husain |
| 2012/0109418 A1 | 5/2012 | Lorber |
| 2012/0194357 A1 | 8/2012 | Ciolli |
| 2012/0201277 A1 | 8/2012 | Tanner et al. |
| 2012/0218416 A1 | 8/2012 | Leny et al. |
| 2012/0235625 A1 | 9/2012 | Takehara |
| 2012/0262104 A1 | 10/2012 | Kirsch |
| 2012/0303397 A1 | 11/2012 | Prosser |
| 2013/0073112 A1 | 3/2013 | Phelan et al. |
| 2013/0162421 A1 | 6/2013 | Inaguma et al. |
| 2013/0162425 A1 | 6/2013 | Raghunathan et al. |
| 2013/0164713 A1 | 6/2013 | Hunt et al. |
| 2013/0211559 A1 | 8/2013 | Lawson et al. |

(56) References Cited

U.S. PATENT DOCUMENTS

| | | |
|---|---|---|
| 2013/0244210 A1 | 9/2013 | Nath et al. |
| 2013/0250040 A1 | 9/2013 | Vitsnudel et al. |
| 2013/0332004 A1 | 12/2013 | Gompert et al. |
| 2014/0012492 A1 | 1/2014 | Bowers et al. |
| 2014/0095061 A1 | 4/2014 | Hyde |
| 2014/0098060 A1 | 4/2014 | McQuade et al. |
| 2014/0113619 A1 | 4/2014 | Tibbitts et al. |
| 2014/0159660 A1 | 6/2014 | Klose et al. |
| 2014/0195106 A1 | 7/2014 | McQuade et al. |
| 2014/0223090 A1 | 8/2014 | Malone |
| 2014/0278108 A1 | 9/2014 | Kerrigan et al. |
| 2014/0293069 A1 | 10/2014 | Lazar et al. |
| 2014/0328517 A1 | 11/2014 | Gluncic |
| 2014/0337429 A1 | 11/2014 | Asenjo et al. |
| 2014/0354227 A1 | 12/2014 | Tyagi et al. |
| 2014/0354228 A1 | 12/2014 | Williams et al. |
| 2015/0025734 A1 | 1/2015 | Cook et al. |
| 2015/0044641 A1 | 2/2015 | Chauncey et al. |
| 2015/0074091 A1 | 3/2015 | Walkin et al. |
| 2015/0116114 A1 | 4/2015 | Boyles |
| 2015/0226563 A1 | 8/2015 | Cox et al. |
| 2015/0283912 A1 | 10/2015 | Shimizu et al. |
| 2015/0347121 A1 | 12/2015 | Harumoto |
| 2016/0046298 A1 | 2/2016 | DeRuyck et al. |
| 2016/0110066 A1 | 4/2016 | McCormick et al. |
| 2016/0176401 A1 | 6/2016 | Pilkington |
| 2016/0275376 A1 | 9/2016 | Kant |
| 2016/0288744 A1 | 10/2016 | Rutherford et al. |
| 2016/0293049 A1 | 10/2016 | Monahan et al. |
| 2016/0343091 A1 | 11/2016 | Han et al. |
| 2016/0375780 A1 | 12/2016 | Penilla et al. |
| 2017/0024393 A1 | 1/2017 | Choksi et al. |
| 2017/0039784 A1 | 2/2017 | Gelbart et al. |
| 2017/0060726 A1 | 3/2017 | Glistvain |
| 2017/0102463 A1 | 4/2017 | Hwang |
| 2017/0115666 A1 | 4/2017 | Kolhouse et al. |
| 2017/0123397 A1 | 5/2017 | Billi et al. |
| 2017/0124476 A1 | 5/2017 | Levinson et al. |
| 2017/0140603 A1 | 5/2017 | Ricci |
| 2017/0195265 A1 | 7/2017 | Billi et al. |
| 2017/0200061 A1 | 7/2017 | Julian et al. |
| 2017/0263049 A1 | 9/2017 | MacDonald et al. |
| 2017/0263120 A1 | 9/2017 | Durie, Jr. et al. |
| 2017/0278004 A1 | 9/2017 | McElhinney et al. |
| 2017/0286838 A1 | 10/2017 | Cipriani et al. |
| 2017/0291611 A1 | 10/2017 | Innes et al. |
| 2017/0291800 A1 | 10/2017 | Scoville et al. |
| 2017/0323641 A1 | 11/2017 | Shimizu et al. |
| 2017/0332199 A1 | 11/2017 | Elliott et al. |
| 2017/0345283 A1 | 11/2017 | Kwon et al. |
| 2017/0366935 A1 | 12/2017 | Ahmadzadeh et al. |
| 2018/0001771 A1 | 1/2018 | Park et al. |
| 2018/0001899 A1 | 1/2018 | Shenoy et al. |
| 2018/0012196 A1 | 1/2018 | Ricci et al. |
| 2018/0025636 A1 | 1/2018 | Boykin et al. |
| 2018/0063576 A1 | 3/2018 | Tillman et al. |
| 2018/0068206 A1 | 3/2018 | Pollach et al. |
| 2018/0072313 A1 | 3/2018 | Stenneth |
| 2018/0075309 A1 | 3/2018 | Sathyanarayana et al. |
| 2018/0093672 A1 | 4/2018 | Terwilliger et al. |
| 2018/0174485 A1 | 6/2018 | Stankoulov |
| 2018/0234514 A1 | 8/2018 | Rajiv et al. |
| 2018/0247109 A1 | 8/2018 | Joseph et al. |
| 2018/0253109 A1 | 9/2018 | Fontaine et al. |
| 2018/0262724 A1 | 9/2018 | Ross |
| 2018/0295141 A1 | 10/2018 | Solotorevsky |
| 2018/0329381 A1 | 11/2018 | Doh et al. |
| 2018/0356800 A1 | 12/2018 | Chao et al. |
| 2018/0357484 A1 | 12/2018 | Omata |
| 2018/0364686 A1 | 12/2018 | Naidoo et al. |
| 2019/0003848 A1 | 1/2019 | Hoten et al. |
| 2019/0007690 A1 | 1/2019 | Varadarajan et al. |
| 2019/0025817 A1* | 1/2019 | Mattingly ............ H04L 9/3239 |
| 2019/0054876 A1 | 2/2019 | Ferguson et al. |
| 2019/0065951 A1 | 2/2019 | Luo et al. |
| 2019/0077308 A1 | 3/2019 | Kashchenko |
| 2019/0118655 A1 | 4/2019 | Grimes et al. |
| 2019/0120947 A1 | 4/2019 | Wheeler et al. |
| 2019/0174158 A1 | 6/2019 | Herrick et al. |
| 2019/0188847 A1 | 6/2019 | Gonzalez et al. |
| 2019/0228375 A1* | 7/2019 | Laury ................. G05D 1/0088 |
| 2019/0244301 A1 | 8/2019 | Seth et al. |
| 2019/0257661 A1 | 8/2019 | Stentz et al. |
| 2019/0265712 A1 | 8/2019 | Satzoda et al. |
| 2019/0272725 A1 | 9/2019 | Viklund et al. |
| 2019/0286948 A1 | 9/2019 | Sathyanarayana et al. |
| 2019/0303718 A1 | 10/2019 | Tanigawa et al. |
| 2019/0304082 A1 | 10/2019 | Tokashiki et al. |
| 2019/0318419 A1 | 10/2019 | VanderZanden |
| 2019/0318549 A1 | 10/2019 | Zeira et al. |
| 2019/0327590 A1 | 10/2019 | Kubo et al. |
| 2019/0327613 A1 | 10/2019 | Bicket et al. |
| 2019/0370581 A1 | 12/2019 | Cordell et al. |
| 2020/0018612 A1 | 1/2020 | Wolcott |
| 2020/0026282 A1 | 1/2020 | Choe et al. |
| 2020/0050182 A1 | 2/2020 | Cheng et al. |
| 2020/0074326 A1 | 3/2020 | Balakrishnan et al. |
| 2020/0074397 A1 | 3/2020 | Burda et al. |
| 2020/0134735 A1* | 4/2020 | Carver ................... G06Q 40/08 |
| 2020/0139847 A1 | 5/2020 | Baumer et al. |
| 2020/0150739 A1 | 5/2020 | Tuan et al. |
| 2020/0162489 A1 | 5/2020 | Bar-Nahum et al. |
| 2020/0164509 A1 | 5/2020 | Shults et al. |
| 2020/0168094 A1 | 5/2020 | Shimodaira et al. |
| 2020/0283003 A1 | 9/2020 | Raichelgauz |
| 2020/0309543 A1 | 10/2020 | Voznesensky |
| 2020/0311602 A1 | 10/2020 | Hawley et al. |
| 2020/0312155 A1 | 10/2020 | Kelkar et al. |
| 2020/0327009 A1 | 10/2020 | Callison et al. |
| 2020/0327369 A1 | 10/2020 | Cruz et al. |
| 2020/0342230 A1 | 10/2020 | Tsai et al. |
| 2020/0342235 A1 | 10/2020 | Tsai et al. |
| 2020/0342274 A1 | 10/2020 | ElHattab et al. |
| 2020/0342506 A1 | 10/2020 | Levy et al. |
| 2020/0342611 A1 | 10/2020 | ElHattab et al. |
| 2020/0344301 A1 | 10/2020 | ElHattab et al. |
| 2020/0371773 A1 | 11/2020 | Kato et al. |
| 2020/0380806 A1 | 12/2020 | Tabata |
| 2020/0389415 A1 | 12/2020 | Zhao et al. |
| 2021/0006950 A1 | 1/2021 | Hajimiri et al. |
| 2021/0097315 A1 | 4/2021 | Carruthers et al. |
| 2021/0245656 A1 | 8/2021 | Weldemariam et al. |
| 2021/0397908 A1 | 12/2021 | ElHattab et al. |
| 2022/0092520 A1* | 3/2022 | Hunter .............. G06Q 30/0201 |
| 2022/0156680 A1 | 5/2022 | Tripathy et al. |
| 2022/0165073 A1 | 5/2022 | Shikii et al. |
| 2022/0229438 A1 | 7/2022 | Nabeta |
| 2022/0284634 A1 | 9/2022 | Griffin et al. |
| 2022/0289203 A1 | 9/2022 | Makilya et al. |
| 2022/0324461 A1 | 10/2022 | Kuehnle et al. |
| 2022/0332335 A1* | 10/2022 | Milton ................... G06N 3/098 |
| 2022/0374737 A1 | 11/2022 | Dhara et al. |
| 2023/0077207 A1 | 3/2023 | Hassan et al. |
| 2023/0099553 A1 | 3/2023 | Primack et al. |
| 2023/0153735 A1 | 5/2023 | Dhara et al. |
| 2023/0169420 A1 | 6/2023 | Dhara et al. |
| 2023/0219592 A1 | 7/2023 | Calmer et al. |
| 2023/0281553 A1 | 9/2023 | Singh et al. |
| 2023/0298410 A1 | 9/2023 | Calmer et al. |
| 2023/0349706 A1 | 11/2023 | Sanchez |
| 2024/0003749 A1 | 1/2024 | Lin et al. |
| 2024/0005678 A1 | 1/2024 | Hassan et al. |
| 2024/0013423 A1 | 1/2024 | Zaheer et al. |
| 2024/0063596 A1 | 2/2024 | Pandian et al. |
| 2024/0112562 A1 | 4/2024 | Sicconi et al. |
| 2024/0146629 A1 | 5/2024 | Lloyd |
| 2024/0394389 A1 | 11/2024 | Wen et al. |
| 2025/0002033 A1 | 1/2025 | Calmer et al. |
| 2025/0067570 A1 | 2/2025 | Ivanov et al. |

FOREIGN PATENT DOCUMENTS

| | | | |
|---|---|---|---|
| EP | | 1615178 A2 | 1/2006 |
| GB | | 2288892 A | 11/1995 |

(56) References Cited

FOREIGN PATENT DOCUMENTS

| WO | WO 2011/072753 A1 | 6/2011 |
| WO | WO 2017/123665 A1 | 7/2017 |
| WO | WO 2018/131322 A1 | 7/2018 |
| WO | WO 2018/217526 A1 | 11/2018 |
| WO | WO 2019/099409 A1 | 5/2019 |
| WO | WO 2019/125545 A1 | 6/2019 |
| WO | WO 2019/133533 A1 | 7/2019 |
| WO | WO 2023/244513 A1 | 12/2023 |

OTHER PUBLICATIONS

Kutila et al. (M. Kutila, M. Jokela, G. Markkula and M. R. Rue, "Driver Distraction Detection with a Camera Vision System," 2007 IEEE International Conference on Image Processing, San Antonio, TX, USA, 2007, pp. VI-201-VI-204, doi: 10.1109/ICIP.2007.4379556).*

"Cargo Monitor", Samsara Inc., accessed Feb. 21, 2024 [publication date unknown], in 2 pages. URL: https://www.samsara.com/products/models/cargo-monitor.

"Connect your operations on the Samsara Platform.", Samsara Inc., [publication date unknown]. URL: https://www.samsara.com/products/platform/?gad_source=1&gclid=EAIaIQobChMI14DWlofYgwMVaymtBh36cwx9EAAYASAAEgKjUfD_BwE#impact1 (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 4 pages.

"Driver Scorecards & Fleet Safety" [archived webpage], KeepTruckin, Inc., accessed on Oct. 24, 2023 [archived on Apr. 23, 2019; publication date unknown], in 9 pages. URL: https://web.archive.org/web/20190423104921/https://keeptruckin.com/fleet-safety-and-coaching.

"Dual-Facing AI Dash Cam—CM32", Samsara Inc., accessed Feb. 7, 2024 [publication date unknown]. URL: https://www.samsara.com/ca/products/models/cm32/ (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 5 pages.

"ELD Fact Sheet—English Version", Federal Motor Carrier Safety Administration, U.S. Department of Transportation, last updated Oct. 31, 2017 [publication date unknown], in 3 pages. URL: https://www.fmcsa.dot.gov/hours-service/elds/eld-fact-sheet-english-version.

"EM21—Environmental Monitor", Samsara Inc., accessed Feb. 21, 2024 [publication date unknown], in 5 pages. URL: https://www.samsara.com/uk/products/models/em21/.

"Fast Facts: Electronic Logging Device (ELD) Rule", Federal Motor Carrier Safety Administration, U.S. Department of Transportation, Jun. 2017, Document No. FMCSA-ADO-17-003 (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 2 pages.

"Front-Facing AI Dash Cam—CM31", Samsara Inc., accessed Feb. 7, 2024 [publication date unknown]. URL: https://www.samsara.com/products/models/cm31/ (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 5 pages.

"Guide: DRIVE risk score 101", Motive Technologies, Inc., [publication date unknown], Document No. 2022Q2_849898994 (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 22 pages.

"KeepTruckin Expands Hardware Portfolio to Support Fleet Safety and Efficiency—New dual-facing dash camera and asset tracker deliver fleet safety and asset visibility", Business Wire, Sep. 9, 2019, in 4 pages. URL: https://www.businesswire.com/news/home/20190909005517/en/KeepTruckin-Expands-Hardware-Portfolio-to-Support-Fleet-Safety-and-Efficiency.

"KeepTruckin Launches New AI Dashcam Featuring Industry-Leading Accuracy to Proactively Prevent Accidents, Increase Safety and Efficiency", Business Wire, Aug. 12, 2021. URL: https://www.businesswire.com/news/home/20210812005612/en/KeepTruckin-Launches-New-AI-Dashcam-Featuring-Industry-Leading-Accuracy-to-Proactively-Prevent-Accidents-Increase-Safety-and-Efficiency (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 4 pages.

"Map and Tile Coordinates", Google for Developers, last updated Oct. 23, 2023 [retrieved on Oct. 24, 2023], in 5 pages. URL: https://developers.google.com/maps/documentation/javascript/coordinates.

"Mobile Logbook for Drivers" [archived webpage], KeepTruckin, Inc., accessed on Feb. 5, 2024 [archived on Dec. 13, 2013; publication date unknown]. URL: https://web.archive.org/web/20131213071205/https:/keeptruckin.com/ (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 3 pages.

"Product Brief: System Overview", Motive Technologies, Inc., [publication date unknown], Document No. 2022Q4_1203118185166511 (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 3 pages.

"Product Brief: System Overview", Motive Technologies, Inc., [publication date unknown], Document No. 2022Q4_1203118185166511 (referenced in Jan. 24, 2024 Complaint, Case No. 1:24-cv-00084-UNA), in 3 pages. URL: https://gomotive.com/content-library/guides/system-overview/.

"Real-Time GPS Fleet Tracking" [archived webpage], KeepTruckin, Inc., accessed on Oct. 24, 2023 [archived on Apr. 8, 2019; publication date unknown], in 4 pages. URL: https://web.archive.org/web/20190408022059/https:/keeptruckin.com/gps-tracking.

"Samsara Vehicle Telematics—Fleet Technology That Goes Beyond GPS Tracking", Fleet Europe, Nexus Communication S.A., Oct. 11, 2022, in 7 pages. URL: https://www.fleeteurope.com/en/connected/europe/features/samsara-vehicle-telematics-fleet-technology-goes-beyond-gps-tracking?t%5B0%5D=Samsara&t%5B1%5D=Telematics&t%5B2%5D=Connectivity&curl=1.

"Smart Dashcam" [archived webpage], KeepTruckin, Inc., accessed on Oct. 24, 2023 [archived on Apr. 8, 2019; publication date unknown], in 8 pages. URL: https://web.archive.org/web/20190408015958/https://keeptruckin.com/dashcam.

"Spec Sheet: AI Dashcam", Motive Technologies, Inc., [publication date unknown], Document No. 2023Q2_1204527643716537 (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 5 pages.

"Spec Sheet: AI Dashcam", Motive Technologies, Inc., [publication date unknown], Document No. 2023Q2_1205736073289732 (referenced in Jan. 24, 2024 Complaint, Case No. 1:24-cv-00084-UNA), in 5 pages. URL: https://gomotive.com/content-library/spec-sheet/ai-dashcam/.

"Spec Sheet: AI Omnicam", Motive Technologies, Inc., [publication date unknown], Document No. 2023Q2_1204519709838862 (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 5 pages.

"Spec Sheet: Smart Dashcam", Motive Technologies, Inc., [publication date unknown], Document No. 2022Q2_911703417 (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 4 pages.

(56) References Cited

OTHER PUBLICATIONS

"Spec Sheet: Vehicle Gateway", Motive Technologies, Inc., [publication date unknown], Document No. 2022Q1_858791278 (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 6 pages.

"Spec Sheet: Vehicle Gateway", Motive Technologies, Inc., [publication date unknown], Document No. 2022Q1_858791278 (referenced in Jan. 24, 2024 Complaint, Case No. 1:24-cv-00084-UNA), in 6 pages. URL: https://gomotive.com/content-library/spec-sheet/vehicle-gateway/.

"Vehicle Gateway", Samsara Inc., [publication date unknown]. URL: https://www.samsara.com/products/models/vehicle-gateway (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 5 pages.

"Transform your business with the Connected Operations ™ Cloud", Samsara Inc., accessed Feb. 21, 2024 [publication date unknown], in 8 pages. URL: https://www.samsara.com/products/platform/#impact0.

24/7 Staff, "KeepTruckin Raises $18 Million as Silicon Valley Eyes Trucking Industry", Supply Chain 24/7, May 23, 2017. URL: https://www.supplychain247.com/article/keeptruckin_raises_18_million_as_silicon_valley_eyes_trucking_industry/CSA (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 1 page.

Brown, P. et al., "AI Dash Cam Benchmarking" [report], Strategy Analytics, Inc., Apr. 15, 2022, in 27 pages.

Camden, M. et al., "AI Dash Cam Performance Benchmark Testing Final Report", Virginia Tech Transportation Institute, revised Aug. 17, 2023 [submitted Jun. 30, 2023] (filed with Jan. 24, 2024 Complaint, Case No. 1:24-cv-00084-UNA), in 110 pages.

Camden, M. et al., "AI Dash Cam Performance Benchmark Testing Final Report", Virginia Tech Transportation Institute, submitted Jun. 30, 2023 (filed with Jan. 24, 2024 Complaint, Case No. 1:24-cv-00084-UNA), in 109 pages.

Geraci, B., "It's been one year since we launched the Motive AI Dashcam. See how it's only gotten better.", Motive Technologies, Inc., Oct. 13, 2022, in 5 pages. URL: https://gomotive.com/blog/motive-ai-dashcam-year-one/.

Green, A., "Logistics Disruptors: Motive's Shoaib Makani on AI and automation", McKinsey & Company, Sep. 6, 2022, in 7 pages. URL: https://www.mckinsey.com/industries/travel-logistics-and-infrastructure/our-insights/logistics-disruptors-motives-shoaib-makani-on-ai-and-automation.

Hanson, Kelly, "Introducing Motive's Safety Hub for accident prevention and exoneration.", Motive Technologies, Inc., Aug. 18, 2020, in 6 pages. URL: https://gomotive.com/blog/motive-safety-hub/.

Haridas, S., "KeepTruckin Asset Gateway Review", Truck Trailer Tracker, Nov. 16, 2020, in 7 pages. URL: https://trucktrailertracker.com/keeptruckin-asset-gateway-review/.

Horowitz, E. "Improve Fleet Safety with Samsara", Samsara Inc., Aug. 25, 2017, in 4 pages. URL: https://www.samsara.com/ca/blog/improve-fleet-safety-with-samsara/.

Khan, M., "Why and How We Measure Driver Performance", Medium, Jan. 14, 2020. URL: https://medium.com/motive-eng/why-and-how-we-measure-driver-performance-768d5316fb2c#:~:text=By%20studying%20data%20gathered%20from,the%20driver%20a%20safety%2Oscore (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 8 pages.

Kinney, J., "Timeline of the ELD Mandate: History & Important Dates", GPS Trackit, May 3, 2017. URL: https://gpstrackit.com/blog/a-timeline-of-the-eld-mandate-history-and-important-dates/ (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 5 pages.

Motive Help Center, "*New Fleet Managers Start Here*—Getting Started with Motive for Fleet Managers", Motive Technologies, Inc., accessed on Oct. 24, 2023 [publication date unknown], in 2 pages. URL: https://helpcenter.gomotive.com/hc/en-us/articles/6162442580893--New-Fleet-Managers-Start-Here-Getting-Started-with-Motive-for-Fleet-Managers.

Motive Help Center, "How to add a vehicle on the Fleet Dashboard", Motive Technologies, Inc., accessed on Oct. 25, 2023 [publication date unknown], in 6 pages. URL: https://helpcenter.gomotive.com/hc/en-us/articles/6208623928349.

Motive Help Center, "How to assign an Environmental Sensor to Asset Gateway", Motive Technologies, Inc., accessed on Oct. 24, 2023 [publication date unknown], in 11 pages. URL: https://helpcenter.gomotive.com/hc/en-us/articles/6908982681629.

Motive Help Center, "How to create a Geofence", Motive Technologies, Inc., accessed on Oct. 24, 2023 [publication date unknown], in 5 pages. URL: https://helpcenter.gomotive.com/hc/en-us/articles/6162211436061-How-to-create-a-Geofence.

Motive Help Center, "How to create Alert for Geofence", Motive Technologies, Inc., accessed on Oct. 24, 2023 [publication date unknown], in 10 pages. URL: https://helpcenter.gomotive.com/hc/en-us/articles/6190688664733-How-to-create-Alert-for-Geofence.

Motive Help Center, "How to enable Dashcam In-cab Alerts for a Vehicle?", Motive Technologies, Inc., accessed on Feb. 7, 2024 [publication date unknown]. URL: https://helpcenter.gomotive.com/hc/en-us/articles/11761978874141-How-to-enable-Dashcam-In-cab-Alerts-for-a-Vehicle (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 3 pages.

Motive Help Center, "How to enable Event Severity", Motive Technologies, Inc., accessed on Oct. 24, 2023 [publication date unknown], in 3 pages. URL: https://helpcenter.gomotive.com/hc/en-us/articles/7123375017757-How-to-enable-Event-Severity.

Motive Help Center, "How to enable In-Cab audio alerts on the Motive Fleet Dashboard", Motive Technologies, Inc., accessed on Oct. 25, 2023 [publication date unknown], in 4 pages. URL: https://helpcenter.gomotive.com/hc/en-us/articles/6176882285469.

Motive Help Center, "How to install Environmental Sensors", Motive Technologies, Inc., accessed on Oct. 24, 2023 [publication date unknown], in 4 pages. URL: https://helpcenter.gomotive.com/hc/en-us/articles/6907777171613.

Motive Help Center, "How to Manage a Group and Sub-groups", Motive Technologies, Inc., accessed on Oct. 24, 2023 [publication date unknown], in 4 pages. URL: https://helpcenter.gomotive.com/hc/en-us/articles/6189047187997-How-to-Manage-A-Group-and-Sub-groups.

Motive Help Center, "How to manage Fuel Hub Vehicle Details", Motive Technologies, Inc., accessed on Oct. 24, 2023 [publication date unknown], in 5 pages. URL: https://helpcenter.gomotive.com/hc/en-us/articles/6190039573789-How-to-manage-Fuel-Hub-Vehicle-Details.

Motive Help Center, "How to modify/ set up custom safety events thresholds", Motive Technologies, Inc., accessed on Oct. 24, 2023 [publication date unknown], in 4 pages. URL: https://helpcenter.gomotive.com/hc/en-us/articles/6162556676381-How-to-set-up-Custom-Safety-Event-Thresholds-for-vehicles.

Motive Help Center, "How to monitor Fleet's Speeding behavior", Motive Technologies, Inc., accessed on Oct. 24, 2023 [publication date unknown], in 4 pages. URL: https://helpcenter.gomotive.com/hc/en-us/articles/6189068876701-How-to-monitor-fleet-s-Speeding-behavior.

Motive Help Center, "How to recall/request video from the Motive Fleet Dashboard?", Motive Technologies, Inc., accessed on Oct. 25, 2023 [publication date unknown], in 7 pages. URL: https://helpcenter.gomotive.com/hc/en-us/articles/6162075219229-How-to-recall-request-video-from-the-Motive-Dashcam.

Motive Help Center, "How to record Hours of Service (HOS) with Vehicle Gateway", Motive Technologies, Inc., accessed on Oct. 24,

(56) References Cited

OTHER PUBLICATIONS

2023 [publication date unknown], in 3 pages. URL: https://helpcenter.gomotive.com/hc/en-us/articles/6162505072157-How-to-record-Hours-of-Service-HOS-with-Vehicle-Gateway.

Motive Help Center, "How to set a custom Speed Limit", Motive Technologies, Inc., accessed on Oct. 24, 2023 [publication date unknown], in 5 pages. URL: https://helpcenter.gomotive.com/hc/en-us/articles/8866852210205-How-to-set-a-custom-Speed-Limit.

Motive Help Center, "How to Set Real-Time Speeding Alerts on the Fleet Dashboard", Motive Technologies, Inc., accessed on Oct. 24, 2023 [publication date unknown], in 7 pages. URL: https://helpcenter.gomotive.com/hc/en-us/articles/6175738246557-How-to-Set-Real-Time-Speeding-Alerts-on-the-Fleet-Dashboard.

Motive Help Center, "How to set up Custom Safety Event Thresholds for vehicles", Motive Technologies, Inc., accessed on Mar. 13, 2023 [publication date unknown], in 6 pages. URL: https://helpcenter.gomotive.com/hc/en-us/articles/6162556676381-How-to-set-up-Custom-Safety-Event-Thresholds-for-vehicles.

Motive Help Center, "How to track vehicle speed from the Motive Fleet Dashboard", Motive Technologies, Inc., accessed on Oct. 24, 2023 [publication date unknown], in 4 pages. URL: https://helpcenter.gomotive.com/hc/en-us/articles/6189043119261-How-to-track-vehicle-speed-from-the-Motive-Fleet-Dashboard.

Motive Help Center, "How to unpair and repair Environmental Sensors", Motive Technologies, Inc., accessed on Oct. 24, 2023 [publication date unknown], in 3 pages. URL: https://helpcenter.gomotive.com/hc/en-us/articles/6905963506205-How-to-unpair-and-repair-Environmental-Sensors.

Motive Help Center, "How to view a Safety Event", Motive Technologies, Inc., accessed on Oct. 25, 2023 [publication date unknown], in 4 pages. URL: https://helpcenter.gomotive.com/hc/en-us/articles/6189410468509-How-to-view-a-Safety-Event.

Motive Help Center, "How to view Fleet DRIVE Score Report on Fleet Dashboard", Motive Technologies, Inc., accessed on Feb. 7, 2024 [publication date unknown]. URL: https://helpcenter.gomotive.com/hc/en-us/articles/13200798670493-How-to-view-Fleet-DRIVE-Score-Report-on-Fleet-Dashboard (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 2 pages.

Motive Help Center, "How to view Fuel Hub Driver Details", Motive Technologies, Inc., [publication date unknown]. URL: https://helpcenter.gomotive.com/hc/en-us/articles/6173246145053-How-to-view-Fuel-Hub-Driver-Details (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 5 pages.

Motive Help Center, "How to view Fuel Hub Driver Details", Motive Technologies, Inc., accessed on Oct. 24, 2023 [publication date unknown], in 7 pages. URL: https://helpcenter.gomotive.com/hc/en-us/articles/6173246145053-How-to-view-Fuel-Hub-Driver-Details.

Motive Help Center, "How to view Group DRIVE Score Report on Fleet Dashboard", Motive Technologies, Inc., accessed on Feb. 7, 2024 [publication date unknown]. URL: https://helpcenter.gomotive.com/hc/en-us/articles/12743858622365-How-to-view-Group-DRIVE-Score-Report-on-Fleet-Dashboard (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 2 pages.

Motive Help Center, "How to view safety events report", Motive Technologies, Inc., accessed on Oct. 24, 2023 [publication date unknown], in 2 pages. URL: https://helpcenter.gomotive.com/hc/en-us/articles/6190647741853-How-to-view-safety-events-report.

Motive Help Center, "How to view Stop Sign Violation events on Fleet Dashboard", Motive Technologies, Inc., accessed on Feb. 7, 2024 [publication date unknown]. URL: https://helpcenter.gomotive.com/hc/en-us/articles/6163732277917-How-to-view-Stop-Sign-Violation-events-on-Fleet-Dashboard (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 2 pages.

Motive Help Center, "How to view Stop Sign Violation events on Fleet Dashboard", Motive Technologies, Inc., accessed on Oct. 24, 2023 [publication date unknown], in 2 pages. URL: https://helpcenter.gomotive.com/hc/en-us/articles/6163732277917-How-to-view-Stop-Sign-Violation-events-on-Fleet-Dashboard.

Motive Help Center, "How to view the Driver DRIVE Score Report", Motive Technologies, Inc., accessed on Feb. 7, 2024 [publication date unknown]. URL: https://helpcenter.gomotive.com/hc/en-us/articles/13200710733853-How-to-view-the-Driver-DRIVE-Score-Report (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 2 pages.

Motive Help Center, "How to view the Safety Hub and DRIVE Score details in the DriverApp", Motive Technologies, Inc., accessed on Oct. 24, 2023 [publication date unknown], in 5 pages. URL: https://helpcenter.gomotive.com/hc/en-us/articles/6162215453853-How-to-view-safety-events-and-Dashcam-videos-on-Motive-App.

Motive Help Center, "How to view your vehicle's Utilization details", Motive Technologies, Inc., accessed on Feb. 7, 2024 [publication date unknown]. URL: https://helpcenter.gomotive.com/hc/en-us/articles/6176914537373-How-to-view-your-vehicle-s-Utilization-details (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 3 pages.

Motive Help Center, "Viewing Close Following Events on the Motive Fleet Dashboard", Motive Technologies, Inc., accessed on Oct. 24, 2023 [publication date unknown], in 7 pages. URL: https://helpcenter.gomotive.com/hc/en-us/articles/6189574616989-Viewing-Close-Following-Events-on-the-Motive-Fleet-Dashboard.

Motive Help Center, "What are Alert Types?", Motive Technologies, Inc., accessed on Oct. 24, 2023 [publication date unknown], in 3 pages. URL: https://helpcenter.gomotive.com/hc/en-us/articles/8239240188957-What-are-Alert-Types-.

Motive Help Center, "What are Environmental Sensors?", Motive Technologies, Inc., accessed on Oct. 24, 2023 [publication date unknown], in 4 pages. URL: https://helpcenter.gomotive.com/hc/en-us/articles/6907551525661-What-are-Environmental-Sensors-.

Motive Help Center, "What are safety risk tags?", Motive Technologies, Inc., accessed on Feb. 21, 2024 [publication date unknown], in 4 pages. URL: https://helpcenter.gomotive.com/hc/en-us/articles/6163713841053.

Motive Help Center, "What are the definitions of safety behaviors triggered by Motive's AI & Smart Dashcams", Motive Technologies, Inc., accessed on Mar. 13, 2023 [publication date unknown], in 3 pages. URL: https://helpcenter.gomotive.com/hc/en-us/articles/8218103926941-What-are-the-definitions-of-safety-behaviors-triggered-by-Motive-s-AI-Smart-Dashcams.

Motive Help Center, "What are the definitions of safety behaviors triggered by Motive's AI & Smart Dashcams", Motive Technologies, Inc., accessed on Oct. 24, 2023 [publication date unknown], in 3 pages. URL: https://helpcenter.gomotive.com/hc/en-us/articles/8218103926941-What-are-the-definitions-of-safety-behaviors-triggered-by-Motive-s-AI-Smart-Dashcams.

Motive Help Center, "What are unsafe behaviors?", Motive Technologies, Inc., accessed on Mar. 13, 2023 [publication date unknown], in 4 pages. URL (archived version): https://web.archive.org/web/20230203093145/https://helpcenter.gomotive.com/hc/en-us/articles/6858636962333-What-are-unsafe-behaviors-.

Motive Help Center, "What are Vehicle Gateway Malfunctions and Data Diagnostics", Motive Technologies, Inc., accessed on Oct. 24, 2023 [publication date unknown], in 4 pages. URL: https://helpcenter.gomotive.com/hc/en-us/articles/6160848958109-What-are-Vehicle-Gateway-Malfunctions-and-Data-Diagnostics.

Motive Help Center, "What is DRIVE Risk Score?", Motive Technologies, Inc., accessed on Oct. 24, 2023 [publication date unknown], in 5 pages. URL: https://helpcenter.gomotive.com/hc/en-us/articles/6162164321693-What-is-DRIVE-risk-score-.

Motive Help Center, "What is DRIVE Risk Score?", Motive Technologies, Inc., accessed on Oct. 24, 2023 [publication date unknown].

(56)            References Cited

OTHER PUBLICATIONS

URL: https://helpcenter.gomotive.com/hc/en-us/articles/ 6162164321693-What-is-DRIVE-risk-score- (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 5 pages.

Motive Help Center, "What is Event Severity?", Motive Technologies, Inc., accessed on Oct. 24, 2023 [publication date unknown], in 3 pages. URL: https://helpcenter.gomotive.com/hc/en-us/articles/ 6176003080861-What-is-Event-Severity-.

Motive Help Center, "What is Fuel Hub?", Motive Technologies, Inc., accessed on Feb. 5, 2024 [publication date unknown]. URL: https://helpcenter.gomotive.com/hc/en-us/articles/6161577899165-What-is-Fuel-Hub (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 9 pages.

Motive Help Center, "What is Fuel Hub?", Motive Technologies, Inc., accessed on Oct. 24, 2023 [publication date unknown], in 9 pages. URL: https://helpcenter.gomotive.com/hc/en-us/articles/ 6161577899165-What-is-Fuel-Hub-.

Motive Help Center, "What is Motive Fleet App?", Motive Technologies, Inc., accessed on Oct. 24, 2023 [publication date unknown], in 12 pages. URL: https://helpcenter.gomotive.com/hc/en-us/articles/ 6113996661917-What-is-Motive-Fleet-App-.

Motive Help Center, "What is Safety Hub?", Motive Technologies, Inc., accessed on Oct. 24, 2023 [publication date unknown], in 10 pages. URL: https://helpcenter.gomotive.com/hc/en-us/articles/ 6162472353053-What-is-Safety-Hub-.

Motive Help Center, "What Motive fuel features are available?", Motive Technologies, Inc., accessed on Oct. 24, 2023 [publication date unknown], in 2 pages. URL: https://helpcenter.gomotive.com/ hc/en-us/articles/6189158796445-What-Motive-fuel-features-are-available-.

Motive Help Center, "What unsafe behaviors does Motive monitor through Dashcam and Vehicle Gateway?", Motive Technologies, Inc., accessed on Feb. 21, 2024 [publication date unknown], in 5 pages. URL: https://helpcenter.gomotive.com/hc/en-us/articles/ 6858636962333-What-unsafe-behaviors-does-Motive-monitor-through-Dashcam-and-Vehicle-Gateway-#01HCB72T2EXXW3FFVJ1XSDEG77.

Motive Help Center, "What unsafe behaviors does Motive monitor through Dashcam and Vehicle Gateway?", Motive Technologies, Inc., accessed on Oct. 25, 2023 [publication date unknown], in 4 pages. URL: https://helpcenter.gomotive.com/hc/en-us/articles/ 6858636962333-What-are-unsafe- behaviors-.

Motive, "AI dash cam comparison: Motive, Samsara, Lytx", Motive Technologies, Inc., [publication date unknown]. URL: https:// gomotive.com/products/dashcam/fleet-dash-cam-comparison/#seat-belt-use (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 9 pages.

Motive, "AI dash cam comparison: Motive, Samsara, Lytx", Motive Technologies, Inc., accessed on Feb. 18, 2024 [publication date unknown], in 20 pages. URL: https://gomotive.com/products/dashcam/ fleet-dash-cam-comparison/.

Motive, "Asset Gateway Installation Guide | Cable/Vehicle Powered" [video], YouTube, Jun. 25, 2020, screenshot in 1 page. URL: https://www.youtube.com/watch?v=pME-VMauQgY.

Motive, "Asset Gateway Installation Guide | Solar Powered" [video], YouTube, Jun. 25, 2020, screenshot in 1 page. URL: https://www. youtube.com/watch?v=jifKM3GT6Bs.

Motive, "Benchmarking AI Accuracy for Driver Safety" [video], YouTube, Apr. 21, 2022, screenshot in 1 page. URL: https://www. youtube.com/watch?v=brRt2h0J80E.

Motive, "CEO Shoaib Makani's email to Motive employees.", Motive Technologies, Inc., Dec. 7, 2022, in 5 pages. URL: https:// gomotive.com/blog/shoaib-makanis-message-to-employees/.

Motive, "Coach your drivers using the Motive Safety Hub." [video], YouTube, Mar. 27, 2023, screenshot in 1 page. URL: https://www. youtube.com/watch?v=VeErPXF30js.

Motive, "Equipment and trailer monitoring", Motive Technologies, Inc., accessed on Feb. 18, 2024 [publication date unknown], in 11 pages. URL: https://gomotive.com/products/tracking-telematics/ trailer-tracking/.

Motive, "Experts agree, Motive is the most accurate, fastest AI dash cam.", Motive Technologies, Inc., accessed Feb. 21, 2024 [publication date unknown] in 16 pages. URL: https://gomotive.com/ products/dashcam/best-dash-cam/.

Motive, "Guide: DRIVE risk score", Motive Technologies, Inc., accessed on Apr. 8, 2023 [publication date unknown], Document No. 2022Q2_849898994, in 22 pages.

Motive, "Guide: Smart Event Thresholds", Motive Technologies, Inc., accessed on Apr. 8, 2023 [publication date unknown], Document No. 2022Q1_902914404, in 11 pages.

Motive, "How to install a Motive Vehicle Gateway in light-duty vehicles." [video], YouTube, Aug. 5, 2022, screenshot in 1 page. URL: https://www.youtube.com/watch?v=WnclRs_cFw0.

Motive, "How to install your Motive AI Dashcam." [video], YouTube, Aug. 5, 2022, screenshot in 1 page. URL: https://www.youtube. com/watch?v=3JNG2h3KnU4.

Motive, "IFTA fuel tax reporting", Motive Technologies, Inc., accessed on Feb. 18, 2024 [publication date unknown], in 4 pages. URL: https://gomotive.com/products/fleet-compliance/ifta-fuel-tax-reporting/.

Motive, "Improve road and fleet safety with driver scores.", Motive Technologies, Inc., Feb. 7, 2019, in 5 pages. URL: https://gomotive. com/blog/improve-fleet-safety-driver-scores/.

Motive, "Industry-leading fleet management solutions", Motive Technologies, Inc., accessed on Feb. 18, 2024 [publication date unknown], in 13 pages. URL: https://gomotive.com/products/.

Motive, "Introducing an easier way to manage unidentified trips.", Motive Technologies, Inc., Apr. 30, 2020, in 5 pages. URL: https:// gomotive.com/blog/introducing-easier-ude-management/.

Motive, "Introducing Motive Driver Workflow.", Motive Technologies, Inc., Oct. 16, 2017, in 5 pages. URL: https://gomotive.com/ blog/motive-driver-workflow/.

Motive, "Introducing the Motive Asset Gateway and dual-facing Smart Dashcam.", Motive Technologies, Inc., Sep. 9, 2019, in 5 pages. URL: https://gomotive.com/blog/trailer-tracking-and-dual-facing-dash-cam-introducing/.

Motive, "Introducing the Motive Smart Dashcam", Motive Technologies, Inc., Jun. 6, 2018. URL: https://gomotive.com/blog/ announcing-smart-dashcam (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 9 pages.

Motive, "KeepTruckin ELD Training for Drivers" [video], YouTube, Feb. 2, 2018, screenshot in 1 page. URL: https://www.youtube.com/ watch?v=LKJLIT2bGS0.

Motive, "KeepTruckin Smart Dashcam" [video], Facebook, Jun. 6, 2018. URL: https://www.facebook.com/keeptrucking/videos/ keeptrucking-smart-dashcam/10212841352048331/ (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 3 pages.

Motive, "Motive Fleet View | Advanced GPS system for live and historical fleet tracking." [video], YouTube, Jan. 23, 2023, screenshot in 1 page. URL: https://www.youtube.com/watch?v=CSDiDZhjVOQ.

Motive, "Motive introduces Reefer Monitoring for cold chain logistics.", Motive Technologies, Inc., Oct. 4, 2022, in 5 pages. URL: https://gomotive.com/blog/motive-introduces-reefer-monitoring-for-cold-chain-logistics/.

Motive, "Motive Reefer Monitoring for cold chain logistics." [video], YouTube, Oct. 5, 2022, screenshot in 1 page. URL: https://www. youtube.com/watch?v=rDwS5AmQp-M.

Motive, "Motive Smart Load Board—designed to help you find the right loads faster." [video], YouTube, Nov. 28, 2022, screenshot in 1 page. URL: https://www.youtube.com/watch?v=UF2EQBzLYYk.

(56) References Cited

OTHER PUBLICATIONS

Motive, "Motive vs. Samsara: What's the difference?", Motive Technologies, Inc., accessed Feb. 21, 2024 [publication date unknown], in 16 pages. URL: https://gomotive.com/motive-vs-samsara/#compare-chart.

Motive, "No time for downtime—automate fleet maintenance schedules" [video], YouTube, Dec. 20, 2022, screenshot in 1 page. URL: https://www.youtube.com/watch?v=flUccP-ifaU.

Motive, "Product Brief: Driver Safety", Motive Technologies, Inc., accessed on Oct. 24, 2023 [publication date unknown], Document No. 2023Q2_1204527735206670, in 4 pages.

Motive, "Product Brief: System Overview", Motive Technologies, Inc., accessed on Oct. 24, 2023 [publication date unknown], Document No. 2022Q4_1203331000367178, in 4 pages.

Motive, "Product Brief: Tracking & Telematics", Motive Technologies, Inc., accessed on Oct. 24, 2023 [publication date unknown], Document No. 2022Q3_1202933457877590, in 4 pages.

Motive, "Products | AI Dashcam—Smart, accurate, and responsive AI dash cams.", Motive Technologies, Inc., [publication date unknown]. URL: https://gomotive.com/products/dashcam/ (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 7 pages.

Motive, "Products | AI Dashcam—Smart, accurate, and responsive AI dash cams.", Motive Technologies, Inc., accessed on Feb. 18, 2024 [publication date unknown], in 9 pages. URL: https://gomotive.com/products/dashcam/.

Motive, "Products | Dispatch—Manage your dispatches with ease.", Motive Technologies, Inc., accessed on Feb. 18, 2024 [publication date unknown], in 9 pages. URL: https://gomotive.com/products/dispatch-workflow/.

Motive, "Products | Driver Safety—Protect your fleet and profits with an all-in-one safety solution.", Motive Technologies, Inc., accessed on Feb. 18, 2024 [publication date unknown], in 13 pages. URL: https://gomotive.com/products/driver-safety/.

Motive, "Products | Driver Safety—Protect your fleet and profits with an all-in-one safety solution.", Motive Technologies, Inc., accessed on Feb. 5, 2024 [publication date unknown]. URL: https://gomotive.com/products/driver-safety/ (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 16 pages.

Motive, "Products | Platform—Everything you need to manage your fleet. In one place.", Motive Technologies, Inc., accessed on Feb. 7, 2024 [publication date unknown]. URL: https://gomotive.com/products/platform/ (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 12 pages.

Motive, "Products | Reefer Monitoring—The strongest link in cold chain transportation.", Motive Technologies, Inc., accessed on Feb. 18, 2024 [publication date unknown], in 8 pages. URL: https://gomotive.com/products/reefer-monitoring-system/.

Motive, "Products | Tracking & Telematics—Track and monitor your fleet.", Motive Technologies, Inc., accessed on Feb. 18, 2024 [publication date unknown], in 11 pages. URL: https://gomotive.com/products/tracking-telematics/.

Motive, "Spec Sheet: AI Dashcam", Motive Technologies, Inc., accessed on Oct. 24, 2023 [publication date unknown], Document No. 2022Q3_1202788858717595, in 5 pages.

Motive, "Spec Sheet: Asset Gateway", Motive Technologies, Inc., accessed on Mar. 15, 2023 [publication date unknown], Document No. 2022Q1_849551229, in 6 pages.

Motive, "Take control of your fleet with Groups and Features Access.", Motive Technologies, Inc., Apr. 4, 2017, in 3 pages. URL: https://gomotive.com/blog/take-control-fleet-groups-features-access/.

Motive, "Take the time and hassle out of IFTA fuel tax reporting with Motive's fleet card." [video], YouTube, Jan. 26, 2023, screenshot in 1 page. URL: https://www.youtube.com/watch?v=OEN9Q8X3j6l.

Motive, "The most accurate AI just got better.", Motive Technologies, Inc., Mar. 8, 2023, in 8 pages. URL: https://gomotive.com/blog/fewer-fleet-accidents-with-the-new-ai/.

Motive, "The Motive Driver App: Change current duty status in your driving log." [video], YouTube, Aug. 10, 2022, screenshot in 1 page. URL: https://www.youtube.com/watch?v=m4HPnM8BLBU.

Motive, "The Motive Driver App: Claim and correct unidentified trips." [video], YouTube, Sep. 13, 2022, screenshot in 1 page. URL: https://www.youtube.com/watch?v=z2_kxd3dRac.

Motive, "The Motive Driver App: Connect to the Vehicle Gateway." [video], YouTube, Sep. 13, 2022, screenshot in 1 page. URL: https://www.youtube.com/watch?v=egZmLYDa3kE.

Motive, "The Motive Driver App: Creating fleet vehicle inspection reports." [video], YouTube, Aug. 10, 2022, screenshot in 1 page. URL: https://www.youtube.com/watch?v=u1JI-rZhbdQ.

Motive, "The Motive Driver App: Digitally record hours of service (HOS)." [video], YouTube, Aug. 10, 2022, screenshot in 1 page. URL: https://www.youtube.com/watch?v=gdexlb_zqtE.

Motive, "The Motive Driver App: Insert past duty driving log status." [video], YouTube, Aug. 10, 2022, screenshot in 1 page. URL: https://www.youtube.com/watch?v=TmOipFKPBeY.

Motive, "The Motive Driver App: Switch to DOT inspection mode to share driving logs." [video], YouTube, Aug. 10, 2022, screenshot in 1 page. URL: https://www.youtube.com/watch?v=S2LR1ZUImBU.

Motive, "The Motive Driver App: View hours of service (HOS) violations." [video], YouTube, Aug. 10, 2022, screenshot in 1 page. URL: https://www.youtube.com/watch?v=qJX2ZiBGtV8.

Motive, "U.S. speed limits. What drivers and fleets need to know.", Motive Technologies, Inc., Jan. 13, 2022, in 8 pages. URL: https://gomotive.com/blog/us-speed-limits-for-drivers/.

Motive, "What is an AI dashcam?", Motive Technologies, Inc., Jan. 21, 2022, in 6 pages. URL: https://gomotive.com/blog/what-is-ai-dashcam/.

Motive, "WiFi Hotspot sets you free from restrictive cell phone data plans.", Motive Technologies, Inc., Jun. 27, 2019, in 5 pages. URL: https://gomotive.com/blog/wifi-hotspot/.

Motive, "WiFi Hotspot", Motive Technologies, Inc., accessed on Feb. 18, 2024 [publication date unknown], in 5 pages. URL: https://gomotive.com/products/wifi-hotspot/.

Samsara Support, "AI Event Detection", Samsara Inc., accessed on Feb. 7, 2024 [publication date unknown]. URL: https://kb.samsara.com/hc/en-us/articles/360043619011-AI-Event-Detection#UUID-4790b62c-6987-9c06-28fe-c2e2a4fbbb0d (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 3 pages.

Samsara Support, "Alert Configuration", Samsara Inc., accessed Feb. 7, 2024 [publication date unknown]. URL: https://kb.samsara.com/hc/en-us/articles/217296157-Alert-Configuration (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 5 pages.

Samsara Support, "Alert Triggers", Samsara Inc., accessed Feb. 7, 2024 [publication date unknown]. URL: https://kb.samsara.com/hc/en-us/articles/360043113772-Alert-Triggers (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 6 pages.

Samsara Support, "Automatic Driver Detection (Camera ID)", Samsara Inc., accessed on Feb. 7, 2024 [publication date unknown]. URL: https://kb.samsara.com/hc/en-us/articles/360042878172#UUID-294cf192-f2f6-2c5a-3221-9432288c9b25 (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 3 pages.

Samsara Support, "Dash Cam Recording Logic", Samsara Inc., accessed on Feb. 7, 2024 [publication date unknown]. URL: https://kb.samsara.com/hc/en-us/articles/360011372211-Dash-Cam-Recording-Logic (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 2 pages.

(56)                    References Cited

OTHER PUBLICATIONS

Samsara Support, "Dash Cam Settings Overview", Samsara Inc., accessed on Feb. 7, 2024 [publication date unknown]. URL: https://kb.samsara.com/hc/en-us/articles/360042037572-Dash-Cam-Settings-Overview (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 3 pages.

Samsara Support, "Rolling Stop Detection", Samsara Inc., accessed on Feb. 7, 2024 [publication date unknown]. URL: https://kb.samsara.com/hc/en-us/articles/360029629972-Rolling-Stop-Detection (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 2 pages.

Samsara Support, "Safety Score Categories and Calculation", Samsara Inc., [publication date unknown]. URL: https://kb.samsara.com/hc/en-us/articles/360045237852-Safety-Score-Categoriesand-Calculation (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 3 pages.

Samsara Support, "Safety Score Weights and Configuration", Samsara Inc., accessed Feb. 7, 2024 [publication date unknown]. URL: https://kb.samsara.com/hc/en-us/articles/360043160532-Safety-Score-Weights-and-Configuration#UUID-fcb096dd-79d6-69fc-6aa8-5192c665be0a_sectionidm4585641455801633238429578704 (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 4 pages.

Samsara, "AI Dash Cams", Samsara, Inc., [publication date unknown] (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 9 pages.

Samsara, "CM31 Dash Camera Datasheet—Internet-Connected Front-Facing HD Camera Module", [publication date unknown] (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 4 pages.

Samsara, "CM32 Dash Camera—Internet-Connected Dual-Facing HD Camera Module", [publication date unknown] (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 2 pages.

Samsara, "Unpowered Asset Tracker AG45 Datasheet", accessed Feb. 21, 2024 [publication date unknown], in 4 pages. URL: https://www.samsara.com/pdf/docs/AG45_Datasheet.pdf.

Samsara, "Vehicle Gateways—VG34, VG54, VG54H Datasheet", [publication date unknown] (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 8 pages.

U.S. Appl. No. 18/051,634, Method and System to Automate Route Assignment, filed Nov. 1, 2022.

Driver I, The Power of Vision, Netradyne, [publication date unknown], in 2 pages.

"Driver Speed Management for Fleets—Monitoring Speeding in your fleet to increase safety and lower costs", Lytx, 2018, in 9 pages. URL: https://web.archive.org/web/20181217230050/https://www.lytx.com/en-us/fleet-services/program-enhancements/speed-management-for-fleets.

"Eco:Drive™ Social, the community of responsible drivers", Stellantis, Apr. 15, 2014, in 2 pages. URL: https://www.media.stellantis.com/em-en/fiat/press/eco-drive-social-the-community-of-responsible-drivers.

"EcoDrive", Wikipedia, 2022, in 1 page. URL: https://en.wikipedia.org/wiki/EcoDrive.

"Fiat 500—2015 Owner's Manual", FCA US LLC, 2016, 5th ed., in 440 pages.

"Fiat 500 Eco system", Fiat 500 Eco System Forum, Apr. 21, 2020, in 5 pages. URL: https://www.fiat500usaforum.com/forum/fiat-500-forums/fiat-500-general-discussion/32268-fiat-500-eco-system?36406-Fiat-500-Eco-system=.

"Fiat launches EcoDrive for 500 and Grande Punto", Indian Autos Blog, Jul. 10, 2008, in 4 pages. URL: https://indianautosblog.com/fiat-launches-ecodrive-for-500-and-grande-punto-p3049.

"Fiat launches fleet-specific eco:Drive system", Fleet World, 2010, in 3 pages. URL: https://fleetworld.co.uk/fiat-launches-fleet-specific-ecodrive-system/.

Goodwin, A., "Fiats ecoDrive teaches efficient driving", CNET, Oct. 22, 2008, in 5 pages. URL: https://www.cnet.com/roadshow/news/fiats-ecodrive-teaches-efficient-driving/.

"Introduction Pack", Drivecam, Inc., 2012, in 32 pages. URL: https://www.iae-services.com.au/downloads/DriveCam-Introduction-Pack.pdf.

"Lytx DriveCam Program Adds New Client-Centric Enhancements", Mass Transit, Oct. 4, 2016, in 6 pages. URL: https://www.masstransitmag.com/safety-security/press-release/12265105/lytx-lytx-drivecamtm-program-adds-newclient-centric-enhancements-evolving-the-gold-standard-video-telematics-program.

"Lytx Video Services Workspace—Screenshot Key", Lytx, 2017, in 1 page. URL: https://www.multivu.com/players/English/7899252-lytx-video-services-program/docs/KeytoLytx_1505780254680-149005849.pdf.

"Making roads safer for everyone, everywhere", Light Metrics, 2023, in 8 pages. URL: https://www.lightmetrics.co/about-us.

"Meet Return on Traffic Data—The new potential for contextualized transportation analytics", Geotab ITS, accessed on Apr. 1, 2024 [publication date unknown], in 13 pages. URL: https://its.geotab.com/return-on-traffic-data/.

"Motive Announces AI Omnicam, the Industry's First AI-Enabled Camera Built for Side, Rear, Passenger, and Cargo Monitoring", Business Wire, Jun. 15, 2023, in 2 pages. URL: https://www.businesswire.com/news/home/20230615577887/en/Motive-Announces-AI-Omnicam-the-Industry%E2%80%99s-First-AI-Enabled-Camera-Built-for-Side-Rear-Passenger-and-Cargo-Monitoring.

"Nauto—Getting Started", Manualslib, Nauto, Inc., Apr. 20, 2017, in 18 pages. URL: https://www.manualslib.com/manual/1547723/Nauto-Nauto.html.

"Netradyne Adds New Detection Features to Driveri Platform", Automotive Fleet Magazine, Oct. 27, 2016, in 13 pages. URL: https://www.automotive-fleet.com/137445/netradyne-adds-new-detection-features-to-driveri-platform.

"NetraDyne Discuss their AI Platform 5G and their vision of the IoT (Internet of Things)", GSMA, Oct. 3, 2018, in 2 pages. URL: https://www.gsma.com/solutions-and-impact/technologies/internet-of-things/news/netradyne-interview/.

"Netradyne Vision based driver safety solution—Model Name: Driver I, Model No. DRI-128-TMO" [device specification], [publication date unknown], in 4 pages. URL: https://device.report/m/4dd89450078fa688b333692844d3bde954ddfbaf5c105c9d1d42dfd6965cbf1b.pdf.

"NetraDyne, an Artificial Intelligence Leader, Launches Driver-i™, a Vision-Based Platform, Focusing on Commercial Vehicle Driver Safety", Netradyne, [publication date unknown], in 2 pages.

"NetraDyne's Artificial Intelligence Platform Improves Road Safety", Sierra Wireless, Oct. 31, 2016, in 4 pages. URL: https://device.report/m/7d898f1b967fc646a1242d092207719be5da8c6cc9c7daabc63d4a307cfd3dcb.pdf.

"Sensor Fusion: Building the Bigger Picture of Risk", Lytx, Apr. 12, 2019, in 1 page. URL: https://www.lytx.com/newsletter/sensor-fusion-building-the-bigger-picture-of-risk.

"The 2012 Fiat 500: eco:Drive", Fiat500USA.com, Feb. 14, 2011, in 24 pages. URL: http://www.fiat500usa.com/2011/02/2012-fiat-500-ecodrive.html.

"The World's Smartest 360° Dashcam: Vezo 360—Fast Facts", Arvizon, [publication date unknown], in 7 pages. URL: https://cdn.newswire.com/files/x/5e/13/b92cd7c6259a708e1dfdaa0123c4.pdf.

"What is a ter-a-flop?", netradyne.com, [publication date unknown], in 2 pages.

(56) References Cited

OTHER PUBLICATIONS

"Vezo 360 Dash Cam—Capture Every Single Angle in Crisp Detail", ArVizon, 2019, in 13 pages. URL: https://www.arvizon.com/vezo-360-dash-cam/.

"Vezo 360, the World's Smartest Dashcam, Keeps You Awake at the Wheel", PR Newswire, Apr. 2, 2019, in 4 pages. URL: https://www.prnewswire.com/news-releases/vezo-360-the-worlds-smartest-dashcam-keeps-you-awake-at-the-wheel-300823457.html.

"The Home of Actionable Transportation Insights—Meet Altitude", Geotab ITS, accessed on Apr. 1, 2024 [publication date unknown], in 5 pages. URL: https://its.geotab.com/altitude/.

Alpert, B., "Deep Learning for Distracted Driving Detection", Nauto,URL: https://www.nauto.com/blog/nauto-engineering-deep-learning-for-distracted-driver-monitoring.

Amazon Web Services, "How Nauto Is Using AI & MI to Build a Data Platform That Makes Driving Safer and Fleets Smarter" [video], YouTube, Apr. 16, 2018, screenshot in 1 page. URL: https://www.youtube.com/watch?v=UtMIrYTmCMU.

Armstrong, C. et al. "Transport Canada Commercial Bus HVEDR Feasibility Study (File No. T8080-160062) Deliverable No. 4", Mecanica Scientific Services Corp, 2018, in 62 pages. URL: https://transcanadahvedr.ca/wp-content/uploads/2022/01/T8080_Deliverable4-DevSmryRpt-FINAL-20180804_English.pdf.

AutoMotoTV, "Fiat ecoDrive System" [video], YouTube, Oct. 6, 2008, screenshot in 1 page URL: https://www.youtube.com/watch?v=AUSb2dBBI8E.

Batchelor, B. et al., "Vision Systems on the Internet", Proc. SPIE 6000, Two- and Three-Dimensional Methods for Inspection and Metrology III, Nov. 2005, vol. 600003, in 15 pages.

Bendix Commercial Vehicle Systems LLC, "Bendix launches new Wingman Fusion safety system at Mid-America Trucking Show", OEM Off-Highway, Mar. 25, 2015, in 10 pages. URL: https://www.oemoffhighway.com/electronics/sensors/proximity-detection-safety-systems/press-release/12058015/bendix-launches-new-wingman-fusion-safety-system-at-midamerica-trucking-show.

Bendix, "Bendix® Wingman® Fusion: The Integration of camera, radar, and brakes delivers a new level of performance in North America", Waterstruck.com, 2015, in 10 pages. URL: https://www.waterstruck.com/assets/Bendix-Wingman-Fusion-brochure_Truck-1.pdf.

Bendix, "Quick Reference Catalog", Bendix Commercial Vehicle Systems LLC, 2018, in 165 pages. URL: https://www.bendix.com/media/home/bw1114_us_010.pdf (uploaded in 2 parts).

Bergasa, L. M. et al., "DriveSafe: an App for Alerting Inattentive Drivers and Scoring Driving Behaviors", IEEE Intelligent Vehicles Symposium (IV), Jun. 2014, in 7 pages.

Boodlal, L. et al., "Study of the Impact of a Telematics System on Safe and Fuel-efficient Driving in Trucks", U.S. Department of Transportation, Federal Motor Carrier Safety Administration, Apr. 2014, Report No. FMCSA-13-020, in 54 pages.

Camillo, J., "Machine Vision for Medical Device Assembly", Assembly, Mar. 3, 2015, in 5 pages. URL: https://www.assemblymag.com/articles/92730-machine-vision-for-medical-device-assembly.

Camillo, J., "Machine Vision for Medical Device Assembly", Assembly, Mar. 3, 2015, in 5 pages.

Cetecom, "FCC/IC Test Setup Photos, Intelligent Driving Monitoring System Smart Connected Dash Cam", Cetecom, Inc., Feb. 7, 2018, in 9 pages. URL: https://device.report/m/a68e1abef29f58b699489f50a4d27b81f1726ab4f55b3ac98b573a286594dc54.pdf.

Chauhan, V. et al., "A Comparative Study of Machine Vision Based Methods for Fault Detection in an Automated Assembly Machine", Procedia Manufacturing, 2015, vol. 1, pp. 416-428.

Chiou, R. et al., "Manufacturing E-Quality Through Integrated Web-enabled Computer Vision and Robotics", The International Journal of Advanced Manufacturing Technology, Aug. 2009, vol. 43, in 19 pages.

Chiou, R. et al., "Manufacturing E-Quality Through Integrated Web-enabled Computer Vision and Robotics", The International Journal of Advanced Manufacturing Technology, 2009 (published online Oct. 1, 2008), vol. 43, in 11 pages.

Cook, B., "Drivecam: Taking Risk out of Driving, Findings related to In-Cab driver Distraction", Drivecam, 2010, in 50 pages. URL: https://www.fmcsa.dot.gov/sites/fmcsa.dot.gov/files/docs/MCSAC_201006_DriveCam.pdf.

Cordes, C., "Ask an Expert: Capturing Fleet Impact from Telematics", McKinsey & Co., Jun. 13, 2017, in 3 pages. URL: https://www.mckinsey.com/capabilities/operations/our-insights/ask-an-expert-capturing-fleet-impact-from-telematics.

D'Agostino, C. et al., "Learning-Based Driving Events Recognition and Its Application to Digital Roads", IEEE Transactions on Intelligent Transportation Systems, Aug. 2015, vol. 16(4), pp. 2155-2166.

Dillon, A., "User Interface Design", MacMillan Encyclopedia of Cognitive Science, 2003, vol. 4, London: MacMillan, in 18 pages (pp. 453-458). Downloaded from http://hdl.handle.net/10150/105299.

Dillon, A., "User Interface Design", *MacMillan Encyclopedia of Cognitive Science*, 2006, vol. 4, London: MacMillan, in 6 pages (pp. 453-458). Downloaded from https://onlinelibrary.wiley.com/doi/10.1002/0470018860.s00054.

Dunn, B., "What is the Lytx DriveCam?", Autobytel, Jul. 12, 2014, in 1 page. URL: https://www.autobytel.com/what-is-lytx-drivecam.

Ekström, L., "Estimating fuel consumption using regression and machine learning", KTH Royal Institute of Technology, Degree Project in Mathematics, 2018, in 126 pages.

Engelbrecht, J. et al., "A Survey of Smartphone-based Sensing in Vehicles for ITS Applications", IET Intelligent Transport Systems, Jul. 2015, vol. 9(10), in 23 pages.

Fiat, "Interview to Giorgio Neri: videotutorial eco:Drive" [video], YouTube, Dec. 1, 2010, screenshot in 1 page. URL: https://www.youtube.com/watch?v=XRDeHbUimOs&t=27s.

Fiatfranco, ""Ciao!"—Fiat ecoDrive" [video], YouTube, Sep. 10, 2007, screenshot in 1 page URL: https://www.youtube.com/watch?v=SluE9Zco55c.

Firstnet™ Built with AT&T, "Reliable telematics solution for utility fleets", Fleet Complete, Apr. 25, 2019, in 2 pages. URL: https://www.firstnet.com/content/dam/firstnet/white-papers/firstnet-fleet-complete-utilities. pdf.

Fleet Complete, "Tony Lourakis tests out Fleet Complete Vision—our new video telematics and driver coaching tool" [video], YouTube, Jan. 9, 2019, screenshot in 1 page. URL: https://www.youtube.com/watch?v=3zEY5x5DOY8.

Fleet Equipment Staff, "Lytx announces enhancements to DriveCam system", Fleetequipmentmag.com, Oct. 7, 2016, in 9 pages. URL: https://www.fleetequipmentmag.com/lytx-drivecam-system-truck-telematics/.

Gilman, E. et al., "Personalised assistance for fuel-efficient driving", Transportation Research Part C, Mar. 2015, pp. 681-705.

Ginevra2008, "Fiat EcoDrive" [video], YouTube, Mar. 7, 2008, screenshot in 1 page. URL: https://www.youtube.com/watch?v=D95p9Bljr90.

Goncalves, J. et al., "Smartphone Sensor Platform to Study Traffic Conditions and Assess Driving Performance", 17th International IEEE Conference on Intelligent Transportation Systems (ITSC), Oct. 2014, in 6 pages.

Groover, M. P., "Chapter 22 Inspection Technologies", in Automation, Production Systems, and Computer-Integrated Manufacturing, 2015, 4th Edition, Pearson, pp. 647-684.

Groover, M. P., *Automation, Production Systems, and Computer-Integrated Manufacturing*, 2016, 4th Edition (Indian Subcontinent Adaptation), Pearson, in 11 pages.

Hampstead, J. P. "Lightmetrics:an exciting video telematics software startup", FrieghtWaves, Aug. 5, 2018, in 4 pages. URL: https://www.freightwaves.com/news/lightmetrics-exciting-video-telematics-startup.

Han, Z. et al., "Design of Intelligent Road Recognition and Warning System for Vehicles Based on Binocular Vision", IEEE Access, Oct. 2018, vol. 6, pp. 62880-62889.

Haworth, N. et al., "The Relationship between Fuel Economy and Safety Outcomes", Monash University, Accident Research Centre, Dec. 2001, Report No. 188, in 67 pages.

(56) References Cited

OTHER PUBLICATIONS

Horsey, J., "VEZO 360 4K 360 dash cam from $149", Geeky Gadgets, Apr. 3, 2019, in 12 pages. URL: https://www.geeky-gadgets. com/vezo-360-4k-360-dash-cam-03-04-2019/.

Huang, K.-Y. et al., "A Novel Machine Vision System for the Inspection of Micro-Spray Nozzle", Sensors, Jun. 2015, vol. 15(7), pp. 15326-15338.

Huff, A., "Lytx DriveCam", CCJDigital, Apr. 4, 2014, in 12 pages. URL: https://www.ccjdigital.com/business/article/14929274/lytx-drivecam.

Huff, A., "NetraDyne Uses Artificial Intelligence in New Driver Safety Platform", CCJ, Sep. 15, 2016, in 10 pages. URL: https:// www.ccjdigital.com/business/article/14933761/netradyne-uses-artificial-intelligence-in-new-driver-safety-platform.

Junior, J. F. et al., "Driver behavior profiling: An investigation with different smartphone sensors and machine learning", PLoS ONE, Apr. 2017, vol. 12(4): e0174959, in 16 pages.

Kwon, Y. J. et al., "Automated Vision Inspection in Network-Based Production Environment", International Journal of Advanced Manufacturing Technology, Feb. 2009, vol. 45, pp. 81-90.

Lan, M. et al., "SmartLDWS: A Robust and Scalable Lane Departure Warning System for the Smartphones", Proceedings of the 12th International IEEE Conference on Intelligent Transportation Systems, Oct. 3-7, 2009, pp. 108-113.

Lekach, S., "Driver safety is 'all talk' with this AI real-time road coach", Mashable, Aug. 3, 2018, in 11 pages. URL: https://mashable. com/article/netradyne-driveri-ai-driver-safety.

Lotan, T. et al., "In-Vehicle Data Recorder for Evaluation of Driving Behavior and Safety". Transportation Research Record Journal of the Transportation Research Board, Jan. 2006, in 15 pages.

Lytx, "TeenSafe Driver Program", American Family Insurance®, 2014, in 10 pages. URL: https://online-sd02.drivecam.com/Downloads/ TSD_WebsiteGuide.pdf.

Malamas, Elias N. et al. "A survey on industrial vision systems, applications and tools", Image and Vision Computing, Dec. 28, 2002, vol. 21, pp. 171-188.

Meiring, G. et al., "A Review of Intelligent Driving Style Analysis Systems and Related Artificial Intelligence Algorithms", Sensors, Dec. 2015, vol. 15, pp. 30653-30682.

Mitrovic, D. et al., "Reliable Method for Driving Events Recognition", IEEE Transactions on Intelligent Transportation Systems, Jun. 2005, vol. 6(2), pp. 198-205.

Motive, "Guide: AI Model Development", Motive Technologies, Inc., accessed on Mar. 29, 2024 [publication date unknown], Document No. 2022Q1_849898994, in 14 pages.

Multivu.com, "Powerful Technology ER-SV2 Event Recorder", Lytx Inc., 2015, in 2 pages. URL: https://www.multivu.com/players/ English/7277351-lytx-activevision-distracted-driving/document/ 52a97b52-6f94-4b11-b83b-8c7d9cef9026.pdf.

Nauto, "How Fleet Managers and Safety Leaders Use Nauto" [video], YouTube, Jan. 25, 2018, screenshot in 1 page. URL: https://www.youtube.com/watch?v=k_iX7a6j2-E.

Nauto, "The New World of Fleet Safety—Event Keynote" [video], YouTube, Jul. 9, 2020, screenshot in 1 page. URL: https://www. youtube.com/watch?v=iMOab9Ow_CY.

Netradyne Inc., "Netradyne Introduces New DriverStar Feature to Recognize and Reward Safe Driving", PR Newswire, Netradyne, Inc., Oct. 19, 2017, in 2 pages. URL: https://www.prnewswire.com/ news-releases/netradyne-introduces-new-driverstar-feature-to-recognize-and-reward-safe-driving-300540267.html.

Netradyne India, "Netradyne Driveri Covered in BBC Click" [video], YouTube, Jan. 25, 2018, screenshot in 1 page. URL: https://www. youtube.com/watch?v=jhULDLj9iek.

Netradyne presentation, Netradyne, Oct. 2016, in 23 pages.

Netradyne, "Driver•i™ Catches No Stop ad Stop Sign | Fleet Management Technology" [video], YouTube, Oct. 3, 2017, screenshot in 1 page. URL: https://www.youtube.com/watch?v=I8sX3X02aJo.

Netradyne, "Driver•i™ Flags Commercial Driver Running Red Light—360-degree vi" [video], YouTube, Oct. 3, 2017, screenshot in 1 page. URL: https://www.youtube.com/watch?v=au9_ ZNGYCmY.

Netradyne, Driver Card 1, 2018, in 2 pages.

Netradyne, Driver Card 2, 2018, in 2 pages.

Ohidan, A., "Fiat And AKQA Launch Eco:Drive™", Science 2.0, Oct. 7, 2008, in 4 pages. URL: https://www.science20.com/newswire/ fiat_and_akqa_launch_eco_drive_tm.

Perez, L. et al., "Robot Guidance Using Machine Vision Techniques in Industrial Environments: A Comparative Review", Sensors, Mar. 2016, vol. 16(3), in 27 pages.

Puckett, T. et al. "Safety Track 4B—Driver Risk Management Program", Airports Council International, Jan. 18, 2019, in 29 pages. URL: https://airportscouncil.org/wp-content/uploads/2019/ 01/4b-DRIVER-RISK-MANAGEMENT-PROGRAM-Tamika-Puckett-Rob-Donahue.pdf.

Ramkumar, S. M. et al., "Chapter 14 Web Based Automated Inspection and Quality Management", in Web-Based Control and Robotics Education, 2009, ed., Spyros G. Tzafestas, Springer, in 42 pages.

Tzafestas, S. G. (ed.), *Web-Based Control and Robotics Education*, 2009, Springer, ISBN 978-90-481-2504-3, in 362 pages. [uploaded in 3 parts].

Sindhu MV, "How this three-year-old Bengaluru startup is helping make US roads safer with its video analytics solutions", Yourstory. com, Mar. 26, 2018, in 7 pages. URL: https://yourstory.com/2018/ 03/lightmetrics-road-safety-analytics.

Smart Dash Cam Vezo360!, "Vivek Soni Co-Founder at Arvizon" [video], YouTube, Feb. 21, 2019, screenshot in 1 page. URL: https://www.youtube.com/watch?v=leclwRCb5ZA.

Song, T. et al., "Enhancing GPS with Lane-level Navigation to Facilitate Highway Driving", IEEE Transactions on Vehicular Technology, Jun. 2017 (published on Jan. 30, 2017), vol. 66, No. 6, in 12 pages.

Song, T. et al., "Enhancing GPS with Lane-level Navigation to Facilitate Highway Driving", IEEE Transactions on Vehicular Technology, Jun. 2017 (published on Jan. 30, 2017), vol. 66, No. 6, pp. 4579-4591, in 13 pages.

Soumik Ukil, "LightMetrics ADAS demo" [video], YouTube, Jul. 20, 2017, screenshot in 1 page. URL: https://www.youtube.com/ watch?app=desktop&v=9LGz1oo7dTw.

Steger, C. et al., "Chapter 2 Image Acquisition" and "Chapter 3 Machine Vision Algorithms", in Machine Vision Algorithms and Applications, 2018, 2nd ed., Wiley, in 604 pages.

Steger, C. et al., *Machine Vision Algorithms and Applications*, 2018, 2nd ed., Wiley, in 60 pages.

Straight, B. "Over 20 years later, Lytx continues to evolve alongside the industry it serves", FreightWaves, Apr. 16, 2019, in 4 pages. URL: https://www.freightwaves.com/news/technology/the-evolution-of-lytx.

Straight, B., "Netradyne using AI to provide intelligent insight into distracted driving", Netradyne, Inc., Nov. 8, 2017, in 4 pages. URL: https://www.freightwaves.com/news/2017/11/7/netradyne-using-ai-to-provide-intelligent-insight-into-distracted-driving.

Su, C.-C. et al., "Bayesian depth estimation from monocular natural images", Journal of Vision, 2017, vol. 17(5):22, pp. 1-29.

Sung, T.-W. et al., "A Speed Control Scheme of Eco-Driving at Road Intersections", 2015 Third International Conference on Robot, Vision and Signal Processing, 2015, pp. 51-54.

Suppose U Drive, "New Trucking Tech: Forward Facing Cameras" supposeudrive.com, Mar. 15, 2019, in pp. 7. URL: https://supposeudrive. com/new-trucking-tech-forward-facing-cameras/.

The Wayback Machine, "AT&T Fleet Complete—Give your Business a competitive advantage", AT&T, 2019, in 12 pages. URL: https://web.archive.org/web/20190406125249/http:/att.fleetcomplete. com/.

The Wayback Machine, "Introducing Driver-I™", NetraDyne, Sep. 22, 2016, in 4 pages URL: https://web.archive.org/web/ 20160922034006/http://www.netradyne.com/solutions.html.

The Wayback Machine, "NetraDyne's Driver-I™ platform delivers results beyond legacy safety video systems Counting safe driving as safe driving—taking second-guessing out of commercial fleet driver

(56)          References Cited

OTHER PUBLICATIONS safety", NetraDyne, Feb. 9, 2018, in 7 pages. URL: https://web.archive.org/web/20180209192736/http:/netradyne.com/solutions/.
Top Fives, "15 Biggest Data Centers on Earth" [video], YouTube, Jun. 9, 2024, screenshot in 1 page. URL: https://www.youtube.com/watch?v=1LmFmCVTppo.
Uliyar, M., "LightMetrics' RideView video safety system provides the best ROI", Linkedin, Sep. 8, 2016, in 4 pages URL: https://www.linkedin.com/pulse/lightmetrics-rideview-video-safety-system-provides-best-mithun-uliyar/.
Vezo 360, "World's Smartest Dash Cam Powered by AI" [video], YouTube, Mar. 31, 2019, screenshot in 1 page. URL: https://www.youtube.com/watch?v=M5r5wZozS0E.
Vlahogianni, E. et al., "Driving analytics using smartphones: Algorithms, comparisons and challenges", Transportation Research Part C, Jun. 2017, vol. 79, pp. 196-206.
Wahlstrom, J. et al., "Smartphone-based Vehicle Telematics—A Ten-Year Anniversary", IEEE Transactions on Intelligent Transportation Systems, Nov. 2016, vol. 18(10), in 23 pages.
Wu, S., "Motivating High-Performing Fleets with Driver Gamification", Samsara, Feb. 2, 2018, in 4 pages. URL: https://www.samsara.com/blog/motivating-high-performing-fleets-with-driver-gamification/.
Yufeng, Z. et al., "3G-Based Specialty Vehicles Real-Time Monitoring System", Applied Mechanics and Materials, Feb. 2014, vols. 513-517, pp. 871-875.
Yufeng, Z. et al., "3G-Based Specialty Vehicles Real-Time Monitoring System", Applied Mechanics and Materials, Feb. 2014, vols. 513-517, pp. 871-875, in 7 pages.
Zanini, M. et al., "Mobile Assets Monitoring for Fleet Maintenance", SAE International, Apr. 11-14, 2005, in 9 pages.
Zanini, M. et al., "Mobile Assets Monitoring for Fleet Maintenance", SAE International, 2005, pp. 369-375, in 8 pages.
Zhong, R. Y. et al., "Intelligent Manufacturing in the Context of Industry 4.0: A Review", Engineering, Oct. 2017, vol. 3, Issue 5, pp. 616-630.
"5 Minutes", Netradyne, [publication date unknown], (filed in: In the Matter of Certain Vehicle Telematics, Fleet Management, and Video-Based Safety Systems, Devices, and Components thereof, Investigation No. 337-TA-1393, complaint filed Feb. 8, 2024), in 1 page (ND_ITC_0014).
"Fleet Dashcam Solution—Vision Mobile App", Fleet Complete, accessed on May 16, 2024 [publication date unknown], in 13 pages. URL: https://www.fleetcomplete.com/products/old-vision-xxxxxx/.

"Fleet Complete Vision Brings Intelligent Video Analytics to Advance Fleet Safety", Fleet Complete, Apr. 5, 2018, in 1 page. URL: https://www.fleetcomplete.com/fleet-complete-vision-brings-intelligent-video-analytics-to-advance-fleet-safety/.
"Fuelopps" [archived webpage], Propel It, archived on Nov. 14, 2017, in 3 pages. URL: https://web.archive.org/web/20171114184116/http://www.propelit.net:80/fuelopps2.
"Fuelopps", Propel It, [publication date unknown], in 1 page. (PROPEL-IT-1393_00001).
"FuelOpps™ Delivers for Covenant Transportation Group—Improved driver behavior contributes to a 3+% MPG improvement in less than 12 months", FuelOpps by Propel IT, [publication date unknown], in 2 pages.
"FuelOpps™ Version 2.0" [presentation], Propel IT, Inc., [publication date unknown], in 17 pages.
"Our Products" [archived webpage], Propel It, archived on Aug. 3, 2018, in 2 pages. URL: https://web.archive.org/web/20180803052120/http://www.propelit.net:80/our-products-1.
"Our Products" [archived webpage], Propel It, archived on Aug. 3, 2018, in 2 pages. URL: https://web.archive.org/web/20180803052120/http://www.propelit.net:80/our-products-1 (MOTIVE-ITC-1393-0024677).
"Our Story", Netradyne, [publication date unknown], (filed in: In the Matter of Certain Vehicle Telematics, Fleet Management, and Video-Based Safety Systems, Devices, and Components thereof, Investigation No. 337-TA-1393, complaint filed Feb. 8, 2024), in 1 page (ND_ITC_0015).
"Safetyopps" [archived webpage], Propel It, archived on Nov. 14, 2017, in 3 pages. URL: https://web.archive.org/web/20171114183538/http://www.propelit.net:80/safetyopps2.
"Safetyopps", Propel It, [publication date unknown], in 1 page. (PROPEL-IT-1393_00019).
Belkhouche_B. et al., "Modeling and Deployment of an Autonomous Cart Pickup and Delivery System", 2019 Amity International Conference on Artificial Intelligence, 2019, pp. 42-48.
Gallagher, J., "KeepTruckin's AI Focus driving down costs for customers", FreightWaves, Dec. 9, 2019, in 4 pages. URL: https://www.freightwaves.com/news/ai-focus-vaults-keeptruckin-higher-on-freighttech-25-list.
Netradyne, Warnings, [publication date unknown], (filed in: In the Matter of Certain Vehicle Telematics, Fleet Management, and Video-Based Safety Systems, Devices, and Components thereof, Investigation No. 337-TA-1393, complaint filed Feb. 8, 2024), in 2 pages (ND_ITC_0005-ND_ITC_0006).

* cited by examiner

Figure 4A:
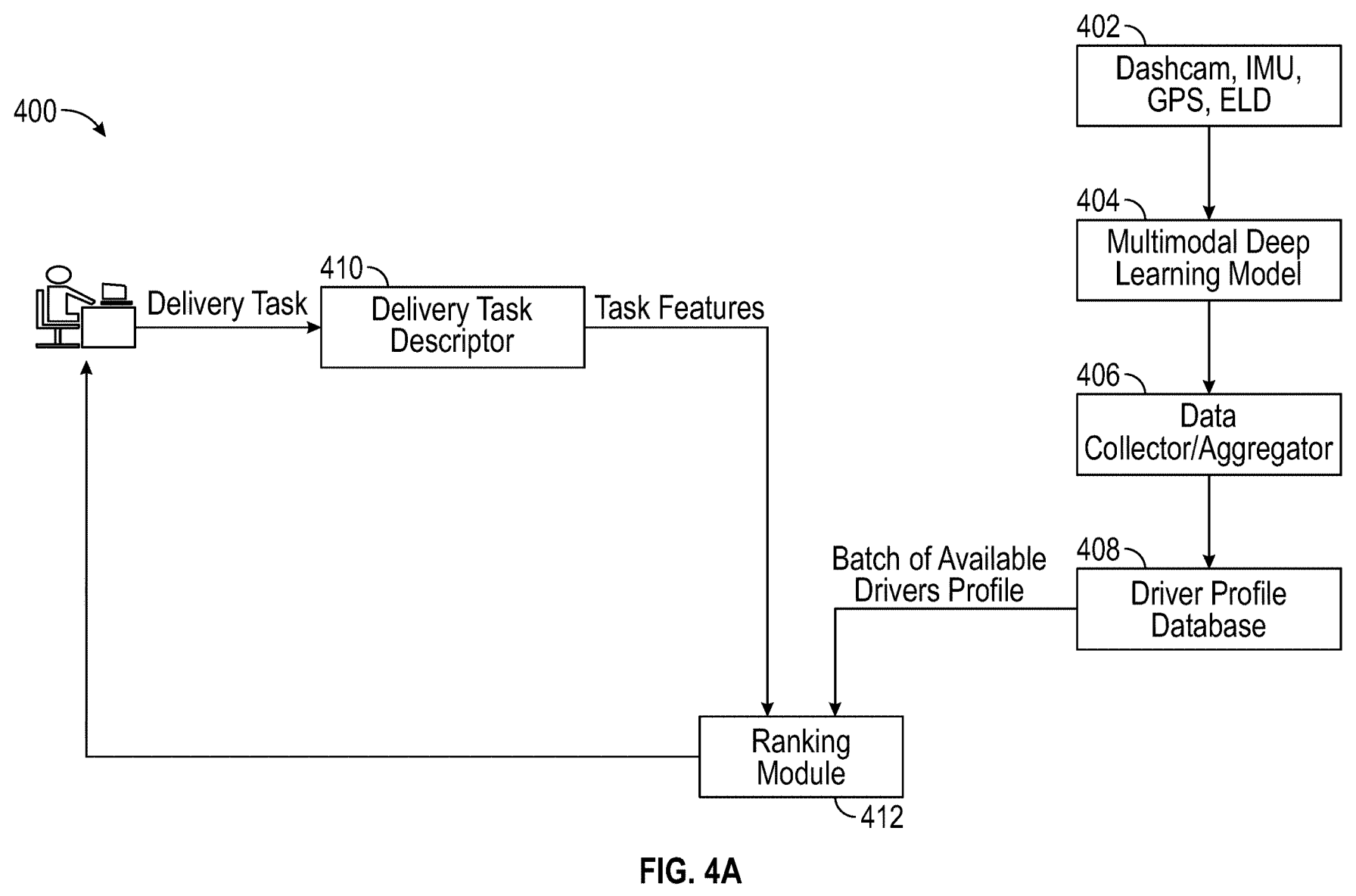

400

402 — Dashcam, IMU, GPS, ELD

404 — Multimodal Deep Learning Model

406 — Data Collector/Aggregator

408 — Driver Profile Database

Batch of Available Drivers Profile

410 — Delivery Task Descriptor

Delivery Task

Task Features

412 — Ranking Module

452
Receive video stream

454
Receive sensor data

456
Apply video stream and sensor data to encoder

458
Receive driver profile from encoder

460
Receive delivery  task

462
Apply driver profile and delivery task to neural network

464
Receive from neural network a score for driver

468
Assign driver with highest score

470
Update GPS of the driver for delivery task

850

852 — Receive delivery task

854 — Receive driver profiles

856 — Identify potential routes

858 — Retrieve road condition map

860 — Input to ranking algorithm

862 — Receive rankings for potential routes

864 — Recommend route

868 — Autonomously control to route

METHOD AND SYSTEM TO AUTOMATE TASK ASSIGNMENT

TECHNICAL FIELD

Embodiments of the present disclosure relate to devices, systems, and methods that provide task assignment in fleet management software for a fleet of vehicles.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Processing data from a fleet of vehicles, which can be fleets of hundreds or thousands of vehicles, that is usable to detect events that are indicative of driving behavior of an individual driver, requires significant data storage and processing power. Moreover, driver and vehicle assignments are typically performed without the aid of useful data, such as driver behavior on the road, limitations on the vehicle, current road conditions, and the like.

SUMMARY

The systems, methods, and devices described herein each have several aspects, no single one of which is solely responsible for its desirable attributes. Without limiting the scope of this disclosure, several non-limiting features will now be described briefly.

Further, as described herein, according to various embodiments, systems and or devices may be configured and/or designed to identify a driver of a vehicle using data from diverse driver assignment sources. Further, the systems and/or devices can assign a driver and/or a vehicle to a particular delivery task. The systems and/or devices can generate driver profiles for individual drivers based on sensor information collected from the vehicle. For example, a video stream from a dashcam sensor can be recorded and this data can be used to identify particular features of driver or driving behavior, such as whether the driver is sleeping behind the wheel or if the vehicle is passing by a stop sign or is tailgating another car. Other sensor data can include Global Positioning System (GPS) data, Inertial Measurement Unit (IMU) data, Electronic Logging Devices (ELD), and/or the like. The systems and/or devices can input a video stream and sensor data to a neural network to retrieve a driver profile. When a delivery task to deliver goods to a location is received, a second neural network can be used to assign a driver, a route, and/or a vehicle to the delivery task.

This non-trivial development has resulted in embodiments described herein which may provide significant increases and advantages over previous systems including increases in efficiency, cost-effectiveness, and accuracy. The systems and/or devices can reduce the time required to assign drivers, vehicles, and/or routes to a delivery task. The systems and/or devices can also increase the efficiency and accuracy of assigning drivers, vehicles, and routes when data is obtained from diverse driver assignment sources. For example, the data obtained from each of the diverse driver sources may identify a different driver and the systems and/or devices can identify the driver of the vehicle.

Various embodiments of the present disclosure provide improvements to various technologies and technological fields, and practical applications of various technological features and advancements. For example, as described above, existing driver assignment systems are limited in various ways, and various embodiments of the present disclosure provide significant improvements over such technology, and practical applications of such improvements. Additionally, various embodiments of the present disclosure are inextricably tied to, and provide practical applications of, computer technology.

Advantageously, various embodiments of the present disclosure may overcome various disadvantages of prior systems and methods. Some embodiments include, a vehicle management server system for a plurality of vehicles, the vehicle management server system comprising: a computer readable storage medium having program instructions embodied therewith; and one or more processors configured to execute the program instructions to cause the vehicle management server system to: receive a delivery task for delivery of items by a vehicle to a location at a particular time period; retrieve driver profiles for a plurality of drivers; identify potential routes that the vehicle can travel for the delivery task; retrieve a map including indications of safety risks for road segments on at least the identified potential routes that correspond to the particular time period for the delivery; for each potential route: for each driver of the plurality of drivers: input an individual driver profile of the plurality of driver profiles and at least a portion of the map that includes the individual potential route into a neural network; and receive from the neural network a rating for the individual driver that corresponds to the individual potential route; identify the highest rating and the corresponding driver and potential route; and assign the driver and the potential route with the highest rating to the delivery task.

In some embodiments, the received map comprises a heat map with the indications of safety risks overlaid on top of a map image.

In some embodiments, the received map comprises the indications of safety risks for the time period, wherein the time period comprises a time of the year.

In some embodiments, the received map comprises the indications of safety risks for the time period, wherein the time period comprises a time of the day.

In some embodiments, the indications of safety risks comprise at least one of: a risk for an accident, an indication of high historical accidents, traffic conditions, icy road conditions, or historical traffic accident conditions.

In some embodiments, the driver profiles further comprise driver working hours, wherein the one or more processors are further configured to filter the plurality of drivers based on driver working hours and the particular time period for the delivery.

In some embodiments, the driver profile comprises an indication of distracted driving, harsh braking, tailgating, or fuel efficiency for the driver.

In some embodiments, the driver profile comprises an indication of delivery quality or delivery time.

Some embodiments include a method comprising: receiving a delivery task for delivery of items by a vehicle to a location at a particular time period; retrieving driver profiles for a plurality of drivers; identifying potential routes that the vehicle can travel for the delivery task; retrieving a map including indications of safety risks for road segments on at least the identified potential routes that correspond to the particular time period for the delivery; for each potential route: for each driver of the plurality of drivers: inputting an individual driver profile of the plurality of driver profiles and at least a portion of the map that includes the individual potential route into a first neural network; and receiving from the first neural network a rating for the individual driver that corresponds to the individual potential route; identifying the highest rating and the corresponding driver and potential route; and assigning the driver and the potential route with the highest rating to the delivery task.

In some embodiments, a second neural network is used to generate the plurality of driver profiles.

In some embodiments, the first neural network is trained separately from the second neural network.

In some embodiments, the second neural network is trained using self-supervised learning, and the first neural network is trained using supervised learning.

In some embodiments, the neural network is trained using historical driver profile data comprising historical delivery information and resulting safety events that have occurred during the historical delivery.

Some embodiments include a non-transitory computer storage medium storing computer-executable instructions that, when executed by a processor, cause the processor to perform the following method: receiving a delivery task for delivery of items by a vehicle to a location at a particular time period; retrieving driver profiles for a plurality of drivers; identifying potential routes that the vehicle can travel for the delivery task; retrieving a map including indications of safety risks for at least a portion of the identified potential routes that correspond to the particular time period for the delivery; for each potential route: for each driver of the plurality of drivers: inputting an individual driver profile of the plurality of driver profiles and at least a portion of the map that includes the individual potential route into a first neural network; and receiving from the first neural network a rating for the individual driver that corresponds to the individual potential route; identifying the highest rating and the corresponding driver and potential route; and assigning the driver and the potential route with the highest rating to the delivery task.

In some embodiments, the method further comprises filtering the plurality of driver profiles to generate a subset of driver profiles.

In some embodiments, filtering the plurality of driver profiles is based on a type of items for the delivery.

In some embodiments, individual driver profiles are specific to an individual driver and an individual vehicle.

In some embodiments, the method further comprises wirelessly transmitting an alert to a device associated with the driver, wherein the alert comprises information corresponding to the delivery task.

In some embodiments, the alert activates an application on the device associated with the driver to display the assigned potential route with the highest rating for the delivery task.

In some embodiments, the assigned driver corresponds to an autonomous vehicle, the alert initiates control of an autonomous vehicle to travel on the assigned potential route with the highest rating for the delivery task.

Some embodiments include a vehicle management server system for a plurality of vehicles, the vehicle management server system comprising: a computer readable storage medium having program instructions embodied therewith; and one or more processors configured to execute the program instructions to cause the vehicle management server system to: generate a plurality of driver profiles for individual drivers of a plurality of drivers, wherein to generate a driver profile comprises: receiving a video stream from a dashcam sensor attached to a vehicle recording the video stream; receiving sensor data from one or more sensors attached to the vehicle, wherein the one or more sensors record the sensor data that indicates a characteristic of the vehicle or a surrounding of the vehicle; inputting the video stream and the sensor data from the vehicle into an encoder of a first neural network, wherein the first neural network is trained using the encoder and a decoder; and receiving a driver profile for the individual driver as an output of the encoder; receive a delivery task comprising a delivery task for delivery by a vehicle to a location at a particular time; for each driver of the plurality of drivers: input the individual driver profile and the delivery task into a second neural network; and receive from the second neural network a rating for the individual driver; identify the driver of the plurality of drivers with the highest rating; and assign the driver with the highest rating to the delivery task.

In some embodiments, the video stream from the dashcam sensor records a video stream of the driver.

In some embodiments, the video stream from the dashcam sensor records a video stream of an external surrounding of the vehicle.

In some embodiments, the sensor data comprises Global Positioning System (GPS) data, Inertial Measurement Unit (IMU) data, and Electronic Logging Devices (ELD) data.

In some embodiments, ELD data comprises distance the vehicle moved, velocity of the vehicle, fuel efficiency, battery, and diagnostics data.

In some embodiments, the driver profile comprises an indication of distracted driving, harsh braking, tailgating, or fuel efficiency for the driver.

In some embodiments, the driver profile comprises an indication of delivery quality or delivery time.

Some embodiments include a method comprising: generating a plurality of driver profiles for individual drivers of a plurality of drivers, wherein generating the plurality of driver profiles comprises: receiving a video stream from a dashcam sensor attached to a vehicle recording the video stream; receiving sensor data from one or more sensors attached to the vehicle, wherein the one or more sensors record the sensor data that indicates a characteristic of the vehicle or a surrounding of the vehicle; inputting the video stream and the sensor data from the vehicle into an encoder of a first neural network, wherein the first neural network is trained using the encoder and a decoder; and receiving a driver profile for the individual driver as an output of the encoder; receiving a delivery task comprising a delivery task for delivery of cargo by a vehicle to a location at a particular time; for each driver of the plurality of drivers: inputting the individual driver profile and the delivery task into a second neural network; and receiving from the second neural network a rating for the individual driver; identify the driver of the plurality of drivers with the highest rating; and assigning the driver with the highest rating to the delivery task.

In some embodiments, the first neural network is trained separately from the second neural network.

In some embodiments, the first neural network is trained using self-supervised learning, and the second neural network is trained using supervised learning.

In some embodiments, the first neural network is trained to output, from the decoder, a reconstruction of the input to the encoder.

In some embodiments, the second neural network is trained using historical driver profile data comprising historical delivery information and resulting safety events that have occurred during the historical delivery.

Some embodiments include a non-transitory computer storage medium storing computer-executable instructions that, when executed by a processor, cause the processor to perform the following method: generating a plurality of driver profiles for individual drivers of a plurality of drivers, wherein generating the plurality of driver profiles comprises: receiving a video stream from a dashcam sensor attached to a vehicle recording the video stream; receiving sensor data from one or more sensors attached to the vehicle, wherein the one or more sensors record the sensor data that indicates a characteristic of the vehicle or a surrounding of the vehicle; inputting the video stream and the sensor data from the vehicle into an encoder of a first neural network, wherein the first neural network is trained using the encoder and a decoder; and receiving a driver profile for the individual driver as an output of the encoder; receiving a delivery task comprising a delivery task for delivery of cargo by a vehicle to a location at a particular time; for each driver of the plurality of drivers: inputting the individual driver profile and the delivery task into a second neural network; and receiving from the second neural network a rating for the individual driver; identify the driver of the plurality of drivers with the highest rating; and assigning the driver with the highest rating to the delivery task.

In some embodiments, the method further comprises filtering the plurality of driver profiles to generate a subset of driver profiles.

In some embodiments, filtering the plurality of driver profiles is based on a type of cargo for the delivery.

In some embodiments, individual driver profiles are specific to an individual driver and an individual vehicle.

In some embodiments, the method further comprises wirelessly transmitting an alert to a device associated with the driver, wherein the alert comprises information corresponding to the delivery task.

In some embodiments, the alert activates an application on the device associated with the driver to display a pickup location for the delivery task.

In some embodiments, the alert activates an application on the device associated with the driver to display a recommended route for the delivery task.

In some embodiments, the assigned driver corresponds to an autonomous vehicle, the alert initiates control of an autonomous vehicle to drive to a pickup location for the delivery task.

BRIEF DESCRIPTION OF THE DRAWINGS

The following drawings and the associated descriptions are provided to illustrate embodiments of the present disclosure and do not limit the scope of the claims. Aspects and many of the attendant advantages of this disclosure will become more readily appreciated as the same become better understood by reference to the following detailed description, when taken in conjunction with the accompanying drawings, wherein:

FIG. 4A is a flow diagram illustrating an example process for the management server to assign drivers and/or vehicles, according to various embodiments of the present disclosure.

DETAILED DESCRIPTION

Figure 1:
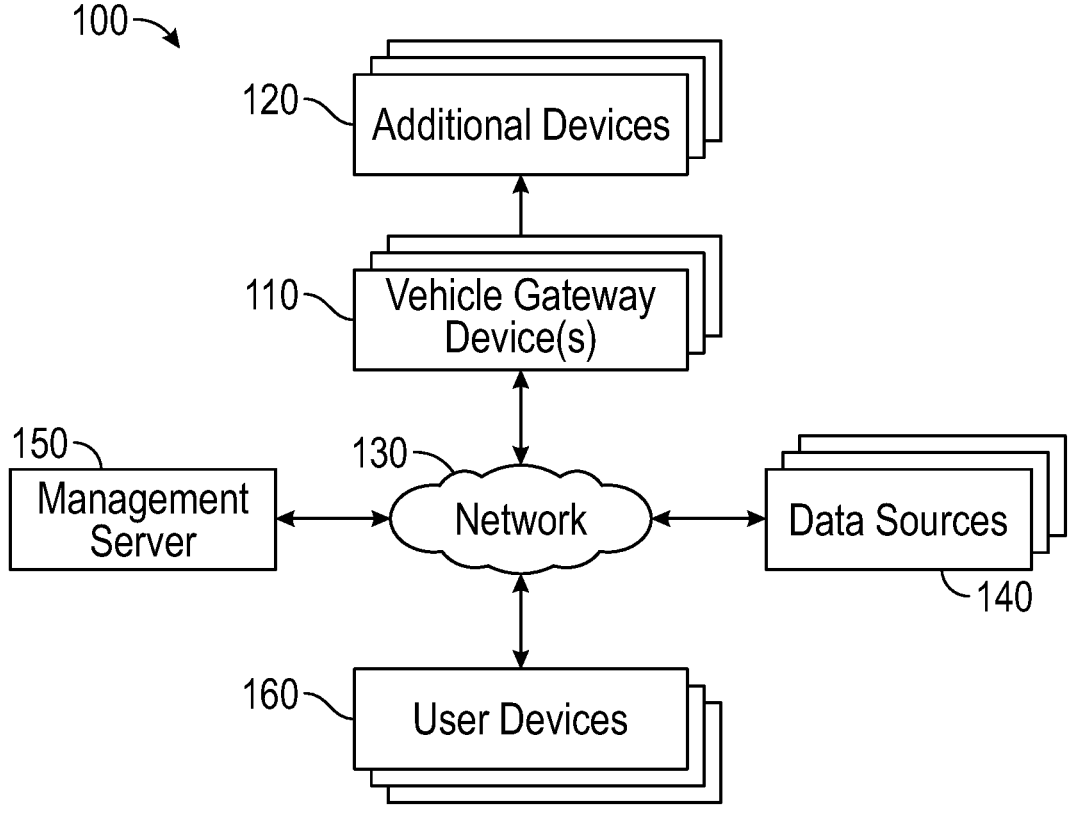
FIG. 1 illustrates a block diagram of an example operating environment in which one or more aspects of the present disclosure may operate, according to various embodiments of the present disclosure.

Although certain preferred embodiments and examples are disclosed below, inventive subject matter extends beyond the specifically disclosed embodiments to other alternative embodiments and/or uses and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Overview

In current fleet management software, the assignment process of a delivery task to a vehicle or driver is manual and suboptimal. Existing fleet management software do not have access to sensor data of the vehicle to make certain decisions on delivery task assignments, let alone road conditions for potential routes when making a delivery. As the internet of things and big data technology are evolving, more sensors are equipped to a vehicle, such as a dashcam, IMU, GPS ELD, and other devices.

Some embodiments herein include gathering data from the aforementioned sensing, and generate a driving behavior profile for each driver. The management server can collect such sensor data and analyze data for each driver and/or for each vehicle to make determinations such as distracted driving, harsh brake, fuel efficiency, delivery quality, delivery time, and/or the like. The management server can make these determinations using a multimodal deep learning neural network, such as an encoder. The data collector can collect on-trip information and delivery quality (delivery time, customer satisfaction rating) to feed into driver profile database. Such information can also be used when making the determinations described herein. The neural network can be trained using an encoder and a decoder, but only the encoder used when making inferences of the driving behavior. The multimodal deep learning model can extract safety driving behavior (distracted driving, harsh brake/acceleration/turn, tailgating, collision risk) associated with particular safety risks, road conditions, timestamp, fuel efficiency, and other characteristics of the driver.

In some embodiments, the delivery task descriptor can extract information about the task, such as delivery cargo type and value, source and destination of trip, required delivery time. The delivery task descriptor can be inputted with each driver profile to determine a score for the driver for this particular delivery task.

In some embodiments, the management server can use driver behavioral profile and make assignments for delivery tasks based on these driver behavioral profiles for each driver in the fleet of drivers. The management server can apply a second neural network (e.g., a ranking module) to each of the driver behavioral profiles and a delivery task to generate a score for each driver. The driver with the highest score can be assigned to a delivery task. The ranking module can utilize a deep learning algorithm on both task feature vector (e.g., from the delivery task descriptor) and the driver profile vector (e.g., outputted from the encoder) to make a prediction aiming to assign a driver based on delivery quality, safety and efficiency. The recommended assignment from ranking module would send back to delivery scheduler or automatically assign driver to the task. Advantageously, the management server can assign a driver to a delivery task that is optimized to minimize various types of delivery risks.

In some embodiments, the neural network can be optimized for a set of stops, in addition to the other factors described above. The user can provide a set of stops with expected durations and a set of drivers with working hours for each driver. The management server can then use a map that includes temporal risk information (e.g. assigns risk for different road segments for each time). This risk information can be combined with each driver's historical performance as well as information about the types of vehicles the drivers are driving to determine an expected risk value for each road segment for each time. The management server can then generate routes for each driver that minimize overall risk while remaining within the driver's working hours and completing all stops (taking account the expected duration of each stop).

In some embodiments, the temporal risk information can include which road segments are more likely to have an accident on these segments. The temporal risk information can include which road segments have had accidents at certain time frames. The temporal risk information can include IMU and/or Accelerometer data from vehicles, historical crash information, traffic information on certain road segments, road characteristics (e.g. curvature, road type, road surface, road grade, etc.), and/or the like. A non-limiting example is to use a modified version of Dijkstra's algorithm where edge weights correspond to a risk of accident and the edge weights operate within the delivery task constraints.

In some embodiments, the management server can apply this temporal risk information to determine how the driver drives in different situations. The management server can determine whether the driver is a risk or less risky driver in heavy traffic. The management server can determine whether the driver is more likely to be distracted in less populated areas. The management server can determine whether the driver is more capable at driving than other drivers.

In some embodiments, the management server can determine given routes that meet the deliver task constraints and pick the route that minimizes the likelihood of being in a collision. By using the driver's risk characteristics, the risk characteristics of the potential routes, and the time at which the routes would have to be driven, the management server can make an assessment of how likely the driver will perform in a collision given the route. Moreover, the management server can make other assessments such as the likelihood of hijacking (e.g. for money deliveries) or the likelihood of a traffic violation. By using data about the driver and the route, the management server can provide additional advantages and efficiencies over using either one independently since the management server can match drivers with routes that the drivers would perform better on.

As mentioned above, according to various embodiments of the present disclosure, an improved system is configured to associate a driver with a vehicle (e.g., a route or routes assigned to a driver and/or vehicle) so that information regarding the trip may be accurately associated with the driver. For example, improved accuracy of driver assignment may allow any detected safety events, such as driver assistance (e.g., ADAS or "Advanced Driver Assistance Systems"), harsh events, and/or other events of interest, to be more accurately associated with a particular driver.

As discussed further herein, the system can identify the driver of the vehicle from data associated with the vehicle (e.g., sensor and non-sensor data) that may indicate multiple different potential drivers of the vehicle. The data may further include prior assignment data identifying a particular driver assigned to the vehicle, a vehicle device, a vehicle trip, etc. during a first time period. All or a portion of the subsets of data may be associated with different drivers (e.g., a driver different from a driver associated with at least one other subset of data, a driver different from the driver identified by the prior assignment data, etc.)

Each subset of data may be associated with a data source and/or a driver assignment category. For example, a first subset of data may be associated with a log and a log-based driver assignment category, a second subset of data may be associated with a vehicle device (e.g., including a vehicle gateway) and a vehicle monitoring device based driver assignment category, etc. The driver assignment categories may include a review based assignment category, a user based assignment category, a log based assignment category, a vehicle monitoring device based assignment category, a network based assignment category (e.g., an active-active network based assignment category, an active-passive network based assignment category, etc.), a static assignment category, and/or a machine learning based assignment category.

In some embodiments, the review based assignment category, the user based assignment category, and/or the static assignment category may include driver assignments provided directly to the management server system. For example, a user may provide user input (e.g., via an application programming interface ("API")) identifying the driver. Further, the user may provide the user input in response to a prompt. For example, the management server system may prompt a user to identify a driver by causing display of a portion of sensor data via a user interface (e.g., image data, audio data, etc.). The review based assignment category may include assignments by quality control ("QC"), the user based assignment category may include assignments by the user, and the static assignment category may include a static assignment linking a particular driver to a particular vehicle.

In some embodiments, the log based assignment category, the vehicle monitoring device based assignment category, and the network based assignment category may include driver assignments based on obtained sensor data. For example, the management server system may obtain sensor data from one or more sensor of the vehicle and identify a driver of the vehicle using the obtained sensor data. In some embodiments, a separate system may obtain the sensor data, identify a driver of the vehicle, and provide data identifying the driver of the vehicle to the management server system. The log based assignment category may include assignments based on a driver log (e.g., an hours of service ("HOS") log), the vehicle monitoring device based assignment category may include assignments based on sensor data obtained from a vehicle device of the vehicle (e.g., a tachograph), and the network based assignment category may include assignments based on active-passive network communications (e.g., sensor data from a near field communication ("NFC") card reader) and/or active-active network communication (e.g., sensor data from a network device such as a Bluetooth device).

In some embodiments, a machine learning based assignment category may include driver assignment by a dash cam (which is referred to more generally as a "vehicle device") configured to execute one or more neural networks (and/or other artificial intelligence or program logic), such as based on input from one or more of the cameras and/or other sensors associated with the dash cam, to intelligently detect safety events and a driver (driver associated with the safety event). The dash cam may include logic for determining data to transmit to a management server system. The data transmitted to the management server system may be further analyzed to determine if further alerts should be provided to the driver and/or to a safety manager (e.g., to request review of a safety event).

The management server system, for each subset of data, can identify a potential driver (e.g., an identity of an individual, an account, a persona, etc.) associated with the vehicle. To identify the potential driver associated with the vehicle, the management server system may process a particular subset of data and identify the potential driver based on processing the particular subset of data, such as based on a hierarchy of data (e.g., from different data sources) that most reliably indicates identify of the driver. In some embodiments, the management server system may parse a particular subset of data and identify the potential driver based on parsing the particular subset of data.

As discussed above, each subset of data may be associated with a different driver assignment category. Further, the management server system may determine a plurality of potential drivers based on the subsets of data. For example, the management server system may identify a first potential driver of the vehicle based on a first subset of the data (e.g., from a first data source) and a second potential driver of the vehicle based on a second subset of the data (e.g., from a second data source).

To determine the driver of the vehicle, the management server system can utilize a hierarchical plurality of driver assignment categories. The hierarchical plurality of driver assignment categories may include a plurality of driver assignment categories that are ordered, listed, grouped, etc. in the hierarchical plurality of driver assignment categories. The plurality of driver assignment categories may be ordered in the hierarchical plurality of driver assignment categories based on a priority of each of the driver assignment categories. For example, a first driver assignment category with a higher priority than a priority of a second driver assignment category may be ordered before the second driver assignment category in the hierarchical plurality of driver assignment categories.

Using the hierarchical plurality of driver assignment categories, the management server system can identify a subset of data that is associated with a driver assignment category with a higher priority as compared to the priority of driver assignment categories associated with other subsets of the data. For example, the hierarchical plurality of driver assignment categories may rank the driver assignment categories from a 1 (e.g., a low priority) to a 10 (e.g., a high priority). The management server system can identify whether any subset of the data is associated with a driver assignment category with a priority of 10. If the management server system cannot identify a subset of the data that is associated with a driver assignment category with a priority of 10, the management server system can identify whether any subset of the data is associated with a driver assignment category with a next highest priority (e.g., a priority of 9, 8, 7, 6, etc.). In some cases, the management server system can determine whether any subset of data is associated with a driver assignment category with a higher priority as compared to the priority of a driver assignment category associated with prior assignment data. Based on identifying a subset of data that is associated with a driver assignment category with a higher priority as compared to the priority of driver assignment categories associated with other subsets of the data, the management server system can assign a driver identified by the subset of data to the vehicle (e.g., generate assignment data). Further, the management server system can, based on the assignment of the driver identified by the subset of data to the vehicle, identify a driver associated with a particular event (e.g., a distracted driver event). In some embodiments, the management server system can assign a driver to a particular event based on the assignment of the driver to the vehicle.

In some embodiments, the management server system may identify multiple subsets of data that are associated with a driver assignment category with a highest priority as compared to the priority of driver assignment categories with other subsets of the data. If the multiple subsets of the data identify the same driver, the management server system can assign the driver identified by the multiple subsets of data to the vehicle. If the multiple subsets of the data identify different drivers, the management server system can identify a time period of a vehicle trip associated with each of the multiple subsets of the data. For example, a first subset of data may be associated with (e.g., captured over, represent data points distributed over, etc.) a first time period and a second subset of data may be associated with a second time period. The management server system can identify the subset of data of the multiple subsets of the data that is associated with the greater time period of the vehicle trip and assign a driver identified by the subset of data to the vehicle.

To facilitate an understanding of the systems and methods discussed herein, several terms are described below. These terms, as well as other terms used herein, should be construed to include the provided descriptions, the ordinary and customary meanings of the terms, and/or any other implied meaning for the respective terms, wherein such construction is consistent with context of the term. Thus, the descriptions below do not limit the meaning of these terms, but only provide example descriptions.

Backend Server System (also referred to herein as a "management server", "backend," "cloud," or "cloud server") can include one or more network-accessible servers configured to communicate with vehicle devices (e.g., via a vehicle gateway and/or communication circuitry of a dashcam). A management server is typically configured to communicate with multiple vehicle devices, such as each of a fleet of hundreds, thousands, or more vehicles. Thus, the management server may have context and perspective that individual vehicle devices do not have. For example, the management server may include data associated with a large quantity of vehicles, such as vehicles across a fleet, multiple fleets, and/or within a geographic area. Thus, the management server may perform analysis of asset data across multiple vehicles and between groups of vehicles (e.g., comparison of fleets operated by different entities). A backend server system may also include a feedback system that periodically updates event models used by vehicle devices to provide real-time detection of events, such as safety events, that may trigger in-vehicle alerts. For example, when the backend server has optimized an event model based on analysis of asset data associated with many safety events, potentially across multiple fleets of vehicles, an updated event model may be sent to the vehicle devices.

Vehicle Device can include one or more electronic components positioned in or on a vehicle and configured to communicate with a backend server system. A vehicle device includes one or more sensors, such as one or more video sensors, audio sensors, accelerometers, global positioning systems (GPS), and the like, which may be housed in a single enclosure (e.g., a dashcam) or multiple enclosures. A vehicle device may include a single enclosure (e.g., a dashcam) that houses multiple sensors as well as communication circuitry configured to transmit sensor data to a backend server system. Alternatively, a vehicle device may include multiple enclosures, such as a dashcam that may be mounted on a front window of a vehicle and a separate vehicle gateway that may be positioned at a different location in the vehicle, such as under the dashboard. In this example implementation, the dashcam may be configured to acquire various sensor data, such as from one or more cameras of the dashcam, and communicate sensor data to the vehicle gateway, which includes communication circuitry configured to communicate with the backend server system. Vehicle devices may also include memory for storing software code that is usable to execute one or more event detection models, such as neural network or other artificial intelligence programming logic, that allow the vehicle device to trigger events without communication with the backend.

Vehicle Gateway can include a device positioned in or on a vehicle, which is configured to communicate with one or more sensors in the vehicle, e.g., in a separate dashcam mounted in the vehicle, and to a backend server system. In some embodiments, a vehicle gateway can be installed within a vehicle by coupling an interface of the vehicle gateway to an on-board diagnostic (OBD) port of the vehicle. A vehicle gateway may include short-range communication circuitry, such as near field communication ("NFC"), Bluetooth ("BT"), Bluetooth Low Energy ("BLE"), etc., for communicating with sensors in the vehicle and/or other devices that are in proximity to the vehicle (e.g., outside of the vehicle).

Event of interest (or "event") can include circumstances of interest to a safety manager, fleet administrator, vehicle driver, and/or others. Events may be identified based on various combinations of characteristics associated with one or more vehicles. For example, an event associated with a vehicle may indicate a safety concern, such as a likelihood of a crash by the vehicle is above an expected threshold level.

Safety Event can include an event that indicates an accident involving a vehicle, such as a crash of the vehicle into another vehicle or structure, or an event that indicates an increased likelihood of a crash of vehicle.

Harsh Event can include one type of safety event indicating an extreme action of a driver and/or status of a vehicle. Harsh events may include, for example, detecting that a driver has accelerated quickly, has braked extensively, has made a sharp turn, or that the vehicle has crashed.

Event Model (or "triggering criteria") can include a set of logic that may be applied to asset data to determine when an event has occurred. An event model may be, for example, an algorithm, statistical model, or neural network that takes as input one or more types of asset data. An event model may be stored in any format, such as a list of criteria, rules, thresholds, and the like, that indicate occurrence of an event. Event models may be executed by a vehicle device and/or by an event analysis system (e.g., in the cloud).

Sensor Data can include any data obtained by the vehicle device, such as asset data and metadata.

Event Data can include data associated with an event, such as a set of sensor data (e.g., metadata and/or asset data), such as photographs, video files, etc., associated with a detected safety event.

Asset Data can include any data associated with a vehicle and/or driver of the vehicle, such as data that is usable by an event model to indicate whether a safety event has occurred. Asset data may include video files, still images, audio data, and/or other data files. Example of asset data include: video files, which may be uploaded for each camera of a multi-camera vehicle device. Video files that are uploaded to the event analysis system may be trimmed to a default length by the vehicle device (e.g., 3 seconds before and 3 seconds after the detected safety event) and/or may be selected based on rules associated with the detected event. Video transcode may be customized to adjust the bit rate, frame rate, resolution, etc. of video files, still Images from each camera, e.g., single frames of a video file, may be transmitted to the event analysis system either as part of initial event data transmitted to the event analysis system after detecting a safety event and/or in response to a request for still images from the event analysis system. In situations where the event analysis system requests still images from a vehicle device, the event analysis system may determine image settings (e.g., image quality, downsampling rate, file size, etc.), as well as timeframe from which images are requested (e.g., one image every 0.2 seconds for the five second time period preceding the detected event), and/or audio data can be combined with video, or sent separately and transcoded into video files after the fact. The event analysis system may determine audio transcoding parameters for requested audio data.

Metadata can include data that provides information regarding a detected event, typically in a more condensed manner than the related asset data. Metadata may include, for example, accelerometer data, global positioning system (GPS) data, ECU data, vehicle speed data, forward camera object tracking data, inward (driver)-facing camera data, hand tracking data and/or any other related data. For example, metadata regarding a triggered event may include a location of an object that triggered the event, such as a vehicle in which a forward collision warning ("FCW") or tailgating safety event has triggered, or position of a driver's head ("head pose") when a distracted driver event has triggered. Metadata may include calculated data associated with a detected safety event, such as severity of the event, which may be based on one or more event models that may consider duration of an event, distance to a leading vehicle, and/or other event data. Metadata may include information about other vehicles within the scene in the case of tailgating or FCW event, as well as confidence levels for these detections. Metadata may also include information such as event keys and other identification information, event type, event date and time stamps, event location, and the like.

Features can include an "interesting" part of sensor data, such as data that is extracted from and/or derived from sensor data and may provide an abstraction of the sensor data. Event models may identify features, such as those that are useful in triggering a safety event. Features may include items (and/or metadata associated with those Items) such as objects within images obtained by one of the cameras of the dash cam. Other examples of features may include eye pose, head pose (e.g., a head pose in a particular direction, a head pose in a direction towards a phone, etc.), hand actions (e.g., a hand action of holding a phone, a hand action of texting, a hand action of holding food, etc.), objects in images, other vehicle metadata, such as GPS, acceleration, and the like.

Data Store can include Any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage).

Database can include Any data structure (and/or combinations of multiple data structures) for storing and/or organizing data, including, but not limited to, relational databases (e.g., Oracle databases, PostgreSQL databases, etc.), non-relational databases (e.g., NoSQL databases, etc.), in-memory databases, spreadsheets, comma separated values (CSV) files, eXtendible markup language (XML) files, TEXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores. Additionally, although the present disclosure may show or describe data as being stored in combined or separate databases, in various embodiments such data may be combined and/or separated in any appropriate way into one or more databases, one or more tables of one or more databases, etc. As used herein, a data source may refer to a table in a relational database, for example.

User Input (also referred to as "Input") can include Any interaction, data, indication, etc., received by a system/device from a user, a representative of a user, an entity associated with a user, and/or any other entity. Inputs may include any interactions that are intended to be received and/or stored by the system/device; to cause the system/device to access and/or store data items; to cause the system to analyze, integrate, and/or otherwise use data items; to cause the system to update to data that is displayed; to cause the system to update a way that data is displayed; and/or the like. Non-limiting examples of user inputs include keyboard inputs, mouse inputs, digital pen inputs, voice inputs, finger touch inputs (for example, via touch sensitive display), gesture inputs (for example, hand movements, finger movements, arm movements, movements of any other appendage, and/or body movements), and/or the like. Additionally, user inputs to the system may include inputs via tools and/or other objects manipulated by the user. For example, the user may move an object, such as a tool, stylus, or wand, to provide inputs. Further, user inputs may include motion, position, rotation, angle, alignment, orientation, configuration (for example, fist, hand flat, one finger extended, etc.), and/or the like. For example, user inputs may comprise a position, orientation, and/or motion of a hand or other appendage, a body, a 3D mouse, and/or the like.

Example Operating Environment

FIG. 1 illustrates a block diagram of an example operating environment 100 in which one or more aspects of the present disclosure may operate, according to various embodiments of the present disclosure. The operating environment 100 may include one or more user devices 160, a management server 150, one or more vehicle devices 110, one or more data sources 140, and one or more additional devices 120. The various devices may communicate with one another via, for example, one or more networks 130, as illustrated.

In general, the vehicle device 110 comprises a gateway device and one or more sensors, which may be enclosed in one or more housings. A vehicle device may include one or more processor(s), memory, data input/output (I/O) interface(s), communication module(s), location determination module(s), controller(s), and etc. For example, the vehicle device 110 may be installed to or positioned inside a moving vehicle. The vehicle device 110 may determine location information associated with the vehicle device, determine a current configuration information associated with the vehicle device, and transmit the location information and configuration information to the management server based at least in part on the current configuration of the vehicle device 110.

Configurations of the vehicle device 110 may include default network information, location determination frequency, organization preference information, vehicle cargo type, and the like, as described herein.

The default network information, the location information, the configuration information, and other types of information associated with the vehicle device 110 may be stored in a memory of the vehicle device 110 (for example, a computer readable storage medium). In some embodiments, such data may be automatically transmitted intermittently or continuously from the vehicle device 110 to the management server 150. The management server 150 may thereby receive location information and configuration information from multiple vehicle devices 110, and may aggregate and perform further analyses on the location information and configuration information from multiple vehicle devices 110.

The management server 150 may communicate with the vehicle device(s) 110 to enable remote, rapid configuration of the vehicle device(s) 110. In some embodiments, the management server 150 can configure one or more portions of the vehicle devices 110, such as autonomously driving the vehicle, changing a GPS device on the vehicle to display a particular route or delivery task, etc. Such configuration may be accomplished via interactive graphical user interfaces provided by the management server 150. In some embodiments, such interactive graphical user interfaces may be accessible by the user device(s) 160. Via the management server 150, and/or directly by communication with the vehicle device(s) 110, user device(s) 160 may access real-time views of status, location information analysis, configuration information analysis, and the like of the vehicle device(s) 110. Communications with the vehicle device(s) 110 may be accomplished via web-servers executing on the vehicle devices 110 themselves.

In some embodiments, the management server 150 may have access to network subscription information associated with network providers. The network subscription information may include pricing information, subscription term information, and the like. Based at least in part on the network subscription information, the management server 150 may automatically determine appropriate configuration for the vehicle device(s) 110. For example, by comparing network subscription information associated with network providers, the management server 150 may identify a default network provider and network activation and handover schemes.

In general, the data sources 140 may be any type of database or server that can collect and store various types of information, for example, network availability information, network drop information, data transmissibility information, data transfer speed information, network connectivity information, and the like. The data sources 140 may be remote from the management server 150 and may have communication capabilities to wireless communication with the management server 150, for example, via the network 130. For example, the data sources 140 can include weather data on a particular time of the year or time of the day, car accident statistics, safety risks or road condition data (such as potholes or icy roads), traffic data, and/or the like. Such data can be used in the neural networks for making inferences, such as assigning a driver to a particular delivery task or assigning a potential route for a driver and/or delivery task.

The additional device(s) 120 may include sensors, programmable logic controllers (PLCs), and other devices that may be capable of generating and providing the vehicle devices 110 real-time or delayed visibility via alerts, notifications, and data associated with assets associated with the vehicle device 110. For example, the asset may be a trailer transported by a vehicle. In this regard, the additional devices 120 get collect and generate information related to the trailer and such information may include, but not limited to, temperature of the trailer, pressure inside the trailer, video feedback of the trailer, trailer door operation, and the like. In some embodiments, the additional devices 120 are part of the vehicle devices 110.

In general, the user devices 160 can be any computing device such as a desktop, laptop or tablet computer, personal computer, tablet computer, wearable computer, server, personal digital assistant (PDA), hybrid PDA/mobile phone, mobile phone, smartphone, set top box, voice command device, digital media player, and the like. A user device 160 may execute an application (for example, a browser, a stand-alone application, etc.) that allows a user to access interactive user interfaces, view images, analyses, or aggregated data, and/or the like as described herein. In various embodiments, users may interact with various components of the example operating environment 100 (for example, the management server 150, the vehicle device(s) 110, the additional device(s) 120, etc.) via the user device(s) 160. Such interactions may typically be accomplished via interactive graphical user interfaces, however alternatively such interactions may be accomplished via command line, and/or other means.

The network 130 may include any wired network, wireless network, or combination thereof. For example, the network 130 may be a personal area network, local area network, wide area network, over-the-air broadcast network (for example, for radio or television), cable network, satellite network, cellular telephone network, or combination thereof. As a further example, the network 130 may be a publicly accessible network of linked networks, possibly operated by various distinct parties, such as the Internet. In some embodiments, the network 130 may be a private or semi-private network, such as a corporate or shared intranet. The network 130 may include one or more wireless networks, such as a Global System for Mobile Communications (GSM) network, a Code Division Multiple Access (CDMA) network, a Long Term Evolution (LTE) network, or any other type of wireless network. The network 130 can use protocols and components for communicating via the Internet or any of the other aforementioned types of networks. For example, the protocols used by the network 130 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

In some embodiments, the network 130 may include an external network, a local network, or both. The local network can be local to a particular organization (for example, a private or semi-private network), such as a corporate or shared intranet. In some implementations, devices may communicate via the local network without traversing the external network such as the Internet. In some implementations, devices connected via the local network may be walled off from accessing the external network (for example, the Internet), for example, by a vehicle device, unless specifically granted access to the external network. Accordingly, for example, the user device(s) 160 may communicate with the vehicle device 110 directly (via wired or wireless communications) or via the local network, without traversing the external network. Thus, even if the external network is down, or is not currently providing connectivity to the management server 150, the vehicle device(s) 110, and the user device(s) 160 may continue to communicate and function via the local network (or via direct communications).

As described herein, the vehicle devices 110 may be capable of, or configured to, communicate via multiple networks 130. Accordingly, while the diagram of FIG. 1 includes a representation of a single network, it is to be understood that the network 130 may include multiple networks 130, each of which may be operated by different network providers, and which may utilize different communications technologies, protocols, bands, etc.

In various embodiments, communications among the various components of the example operating environment 100 may be accomplished via any suitable means. For example, the vehicle device(s) 110 may communicate with one another, the additional device(s) 120, the data sources 140, the management server 150, and/or the user device(s)

160 via any combination of the network 130 and any other wired or wireless communications means or method (for example, Bluetooth, Wi-Fi, infrared, cellular, etc.).

Further details and examples regarding the implementations, operation, and functionality, including various interactive graphical user interfaces, of the various components of the example operating environment 100 are described herein in reference to various figures.

Example Management Device/Server

Figure 2:
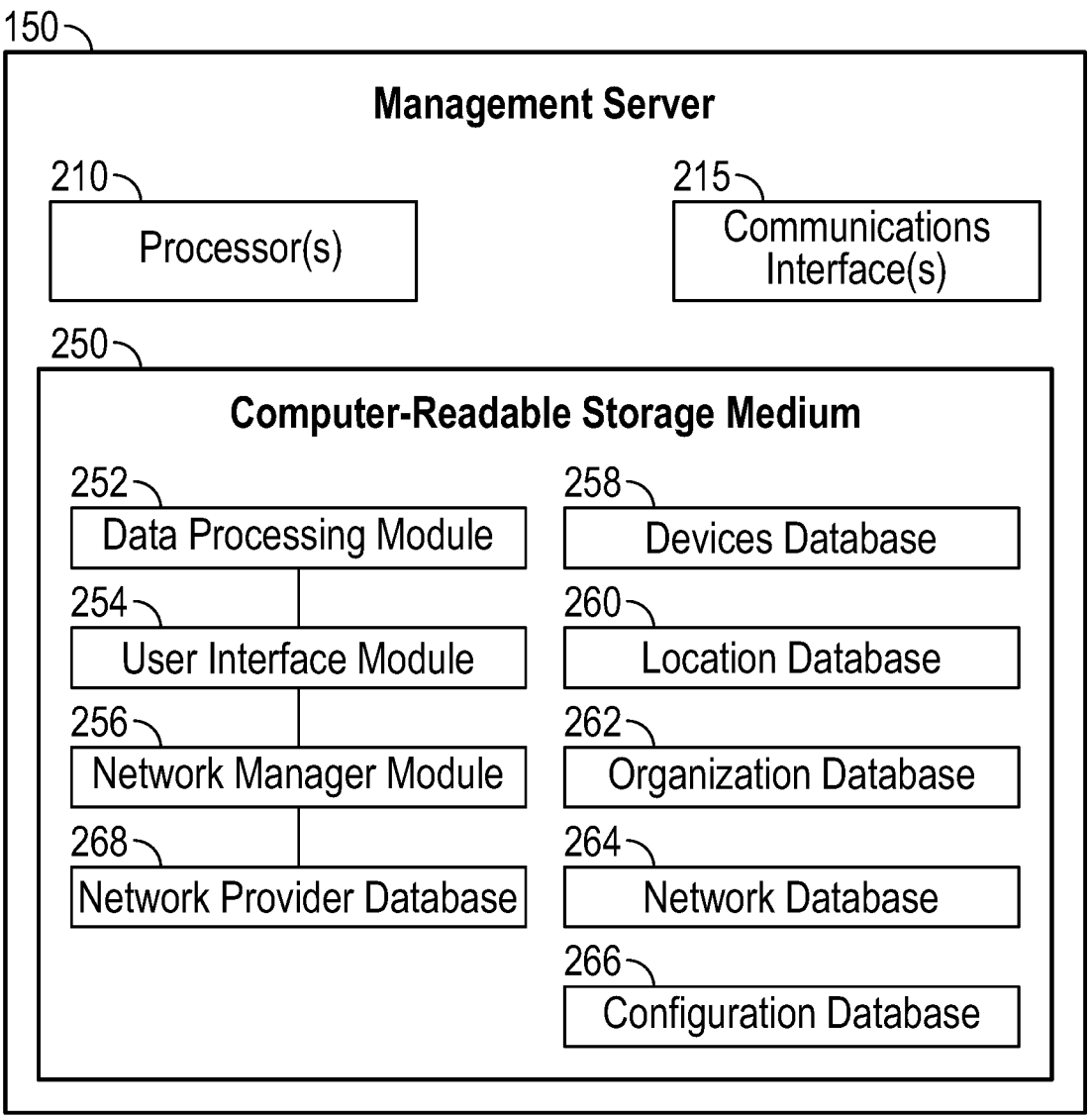
FIG. 2 illustrates a block diagram including an example implementation of a management server, according to various embodiments of the present disclosure.

FIG. 2 illustrates a block diagram including an example implementation of a management server 150, according to various embodiments of the present disclosure. The management server 150 may be a Web or cloud server, or a cluster of servers, running on one or more sets of server hardware. In an embodiment, the management server 150 may work for multiple organizations with different administrators that may have, for example, multiple vehicle devices and additional devices.

According to various embodiments, management server 150 may include one or more communication interfaces 215, one or more processors 210, and one or more computer readable storage mediums 250, each of which may be in communication with one another. The computer readable storage medium 250 includes data processing module 252, user interface module 254, network manager module 256, devices database 258, location database 260, organizations database 262, network database 264, configuration database 266, and a network provider database 268. In various implementations, the various databases of the management server 150 may be combined or separated/partitioned as appropriate to implement the functionality described herein, and to maintain security and separation of data, for example, for different organizations. In various implementations, the various databases may or may not be stored separately from the management server 150.

In various implementations one or more interfaces, APIs, communication layers, buses, interconnects, wires/cables, etc. may be used to interconnect the various components of the management server 150.

In operation, the one or more communication interfaces 215, one or more processors 210, and one or more computer readable storage mediums 250 communicate with one another to, for example, execute by the processor(s) 210 computer program instructions (for example, as provided by the user interface module 254); receive, access, and transmit data (for example, to/from the databases and via the communication interface(s) 215); and/or the like. In general, the processor 210, the communication interface 215, and the computer readable storage medium 250 enable the functionality of the management server 150 as described herein. Further implementation details are described below.

In operation, the communication interface(s) 215 may provide wired and/or wireless communications with other devices and networks, as described herein. In various embodiments, communications among the various components of the example operating environment 100 may be accomplished via any suitable means. For example, the management server 150 may communicate with the vehicle device 110, the data source(s) 140, the additional device(s) 120, and/or the user device(s) 160 via any combination of the network 130 or any other communications means or method (for example, Bluetooth, Wi-Fi, infrared, cellular, etc.). Accordingly, the communications interface(s) 215 may include one or more of wired and wireless transceivers, such as a Joint Test Action Group (JTAG) transceiver, a Bluetooth or Bluetooth Low Energy (LE) transceiver, an IEEE 802.11 transceiver, an Ethernet transceiver, a USB transceiver, a Thunderbolt transceiver, an infrared transceiver, a wireless cellular telephony transceiver (for example, 2G, 3G, 4G, 5G), or the like.

In operation, data processing module 252 may provide processing and analysis of data (for example, data received from the various devices, including the vehicle device(s) as described herein. The data processing/analysis may usefully provide insights and information that may be provided via various interactive graphical user interfaces, as described herein.

In operation, the user interface module 254 may provide the various interactive graphical user interface functionality described herein. This may include, for example, generating user interface data useable for rendering the various interactive user interfaces described. The user interface data may be used by various computer systems, devices, and/or software programs (for example, a browser program of a user device 160), to render the interactive user interfaces. The interactive user interfaces may be displayed on, for example, electronic displays (including, for example, touch-enabled displays). For example, the user interface module 254 may provide various network accessible interactive graphical user interfaces, for example, to allow the administrators of the various organizations and devices to create and log into an account associated with an organization to which a set of devices belong (for example, vehicle devices and additional devices), and manage, and access data associated with, those devices as described herein.

In operation, the network manager module 256 may provide communication with and configuration and management of the various devices associated with each organization. This may include, for example, receiving and managing information related to the various devices (for example, vehicle devices and additional devices) at the time of manufacture, associating devices with particular organizations when they are purchased/claimed and implemented by the organizations (for example, the claiming may be performed at least in part by populating the devices database 258 and the organizations database 262 with appropriate information when the devices are associated with an organization), receiving data from the various devices (for example, and storing the data in the devices database 258 or other appropriate database), sending data to various devices (for example, sending and/or syncing configurations stored in the configurations database 266 to/with various devices), and/or the like.

In operation, the devices database 258 may store information regarding the vehicle devices 110 and/or additional devices 120, and various relationships and associations among these devices. This information may include identifiers associated with these devices, location data received from these devices, network data from these devices, and etc.

In operation, the locations database 260 can include map information and location information. The map information can be associated with different geographical area and may further be linked with network information stored within the network database 264. The location information may be associated with various locations associated with the vehicle devices 110. For example, the location information can include longitudinal and latitudinal information associated with the vehicle devices 110. In some embodiments, the location information can be associated the location of the vehicle devices 110 within a map tile of a grid.

In operation, the organizations database 262 may store information regarding the organizations to which the vehicle devices 110 or additional devices 120 belong. In various embodiments, different configurations from the configurations database 266 may be applied for the vehicle devices 110 or the additional devices 120 based at least in part on the organization the vehicle devices 110 or additional devices 120 belong.

In operation, the network database 264 may store network information related to one or more network service providers and the network provided by those network service providers. The network information may include, but not limited to, data transmissibility, data transmission speed, signal strength, signal availability, signal to noise ratio, or number of dropped calls or disconnected wireless communications associated with each of the network service providers associated with the vehicle device 110. The management server 150 may receive the network information stored in the network database 264 from the data sources 140, the vehicle devices 110, the user devices 160, or any other remote data servers that may collect, store, or process network provider related information.

In various embodiments, the network information stored in the network database 264 may include network desirability information. The network desirability information may include at least one of, or any combination of the network information as described herein. As described herein, the vehicle device 110 can be associated with one or more network service providers, wherein each of the one or more network service providers has corresponding network desirability information. In some embodiments, the network desirability information for a given network service provider may vary based at least in part on the location of the vehicle device 110. In some embodiments, the network desirability information may be include a network desirability index. The network desirability index may represent the overall desirability of a network provider. The network desirability index may be a number that vary between 0 and 1. Alternatively, the network desirability index may vary between 0 and 100.

In operation, the network information stored in the network database 264 may be linked with the location information stored in the locations database 260, as described herein. The network information and the location information may be combined to create a network provider map. The network provider map may indicate which areas of the map may be associated with which network provider associated with the vehicle device 110. Based on the information provided by the network provider map, the vehicle device 110 may perform dynamic network handovers as described herein. In some embodiments, the network provider maps may be stored within the network database 264, or in any other modules or databases of the management server 150.

In operation, the configurations database 266 may store information regarding configurations of the vehicle devices 110 or the additional devices 120. The information stored in the configuration database 266 may be configuration information specific to certain vehicle devices 110 or certain organizations associated with the vehicle devices 110.

In operation, the network provider database 268 may store information regarding a list of networks associated with one or more network providers. For example, the network provider database 268 may store information regarding networks supported by or preferred by one or more network providers. In some embodiments, the management server 150 may not store the network provider database 268. For example, the network provider database 268 may be stored locally at a vehicle device as a network cache. Further, the information stored in the network provider database 268 may be a list of networks specific to a particular vehicle device, a particular type of network provider, a particular location, etc.

In various embodiments, the management server 150 may include various other modules, components, engines, etc. to provide the functionality as described herein. It will be appreciated that additional components, not shown, may also be part of the management server 150 and, in certain embodiments, fewer components than that shown in FIG. 2 may also be used in the management server 150. For example, the management server 150 may include a security module used to manage cryptographic keys, certificates, and/or other data associated with establishing secure communication with various other devices. For example, the devices database 258 may include an identifier of each device (for example, a serial number), a secret to be used to establish a secure communication with the devices of the same organization, and/or a mechanism to authenticate the devices' identity (for example, the public key of a private public key pair, the private key of which was embedded or stored in the device during the manufacturing, etc.).

Example Gateway Device

Figure 3:
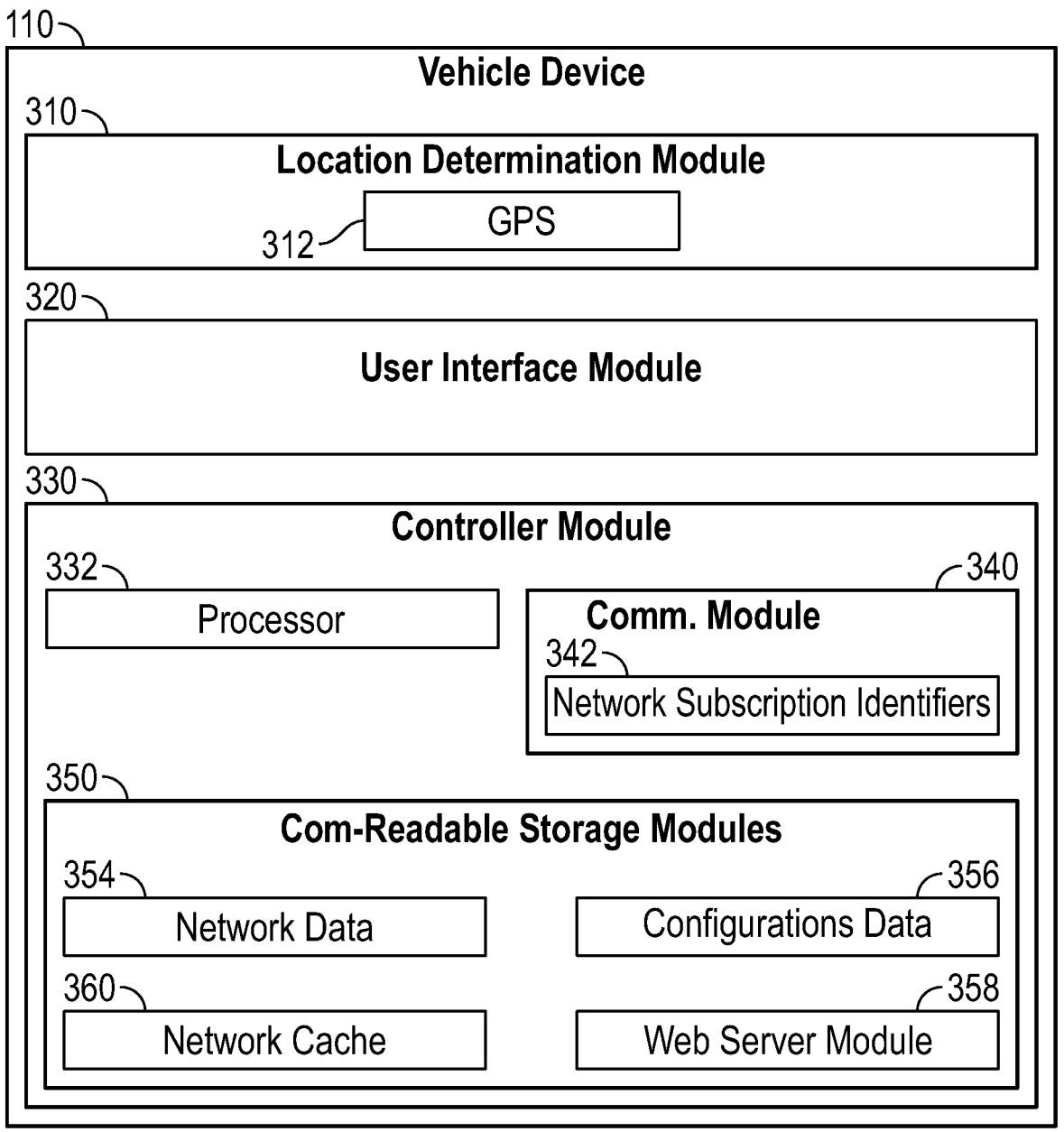
FIG. 3 illustrates a block diagram of an example vehicle devices, according to various embodiments of the present disclosure.

FIG. 3 illustrates a block diagram of an example vehicle device 110, according to various embodiments of the present disclosure. A vehicle device 110 may comprise one or more location determination modules 310, one or more user interface modules 320, and one or more controller modules 330. In various implementations, the location determination modules 310, the user interface module 320, and the controller module 330 may be housed in different housings, and/or may be housed in a same housing. In various implementations, the various components and functionality of the vehicle device 110 (including the components and functionality of the location determination modules 310, the under interface module 320, and the controller module 330) described herein may be combined, separated, and/or reorganized.

The location determination module 310 may include one or more location determination devices 312 (e.g., global positioning system (GPS) devices, GLONASS devices, and/or the like). In some embodiments, the location determination devices 312 may determine location of the vehicle device 110 using various methods including, but not limited to, Wi-Fi, Bluetooth, Internet Protocol (IP) look up, and proximity to beacons (for example, other location determination devices 312). The location determination device(s) 312 may determine location of the vehicle device 110 and generate location information associated with the location of the vehicle device 110. The location information may include geographical positioning information (e.g., GPS coordinates, latitudinal or longitudinal data, and/or the like) that may represent the location of the vehicle device 110. Additionally or alternatively, the location information may identify a map tile within a grid for identifying or estimating the location of the vehicle device 110.

The user interface module 320 may generate various graphical user interfaces that can be displayed on other devices, for example, the user devices 160. The graphical interfaces may be transmitted, for example, to the user devices 160 via the network 130. The graphical user interfaces may be interactive. The graphical user interfaces may be able to detect user inputs and such user inputs may be transmitted to the vehicle device 110 via the network 130 and the user interface module 320. The user interface module 320 may furthermore, for example, generate user interface data useable for rendering the various interactive user interfaces.

The controller module 330 may include one or more processors 332, one or more communication modules 340, and one or more computer readable storage mediums 350, each of which may be in communication with one another. The computer readable storage medium(s) 350 may include network data 354, configurations data 356, web server module 358, and network cache 360. The configurations data 356, the web server module(s) 358, and/or the network cache 360 may be stored in one or more databases of the controller module 330, or may be stored on virtualization mediums in the cloud. The communication module 340 may include one or more transceivers and one or more network subscription identifiers (e.g., subscriber identification modules (SIMs)), wherein each of the one or more network subscription identifiers is associated with a network provider. In various implementations one or more buses, interconnects, wires/cables, etc. may be used to interconnect the various components of the controller module 330, and of the vehicle device 110 more generally.

In operation, the one or more of the communication modules 340, one or more processors 332, and one or more computer readable storage mediums 350 communicate with one another to, for example, execute by the processor(s) 332 computer program instructions (for example, as provided by the configurations data 356); receive, access, and transmit data (for example, to/from the configurations data 356 or network data 354, via the communication module(s) 340); and/or the like. In general, the controller module 330, in connection with the location determination module 310 and the user interface module 320, enables the functionality of the vehicle device 110 as described herein. Further implementation details are described below.

In operation, the communication module(s) 340 may provide wired and/or wireless communications with other devices and networks, as described herein. In various embodiments, communications among the various components of the example operating environment 100 may be accomplished via any suitable means. For example, the vehicle device(s) 110 may communicate with one another, the additional device(s) 120, the management server 150, and/or the user device(s) 160 via the network 130 or any other communications means or method (for example, Bluetooth, WiFi, infrared, cellular, etc.). Accordingly, the communication module(s) 340 may include one or more of wired and wireless transceivers, such as a Joint Test Action Group (JTAG) transceiver, a Bluetooth or Bluetooth Low Energy (LE) transceiver, an IEEE 802.11 transceiver, an Ethernet transceiver, a USB transceiver, a Thunderbolt transceiver, an infrared transceiver, a wireless cellular telephony transceiver (for example, 2G, 3G, 4G, 5G) configured with one or more radios for communicating on various cellular networks (e.g., GSM, CDMA, LTE, EDGE, and/or the like), or the like. As noted herein, the communications module(s) 340 may further include one or more application programming interfaces ("APIs").

In operation, the network data 354 may include, for example, association between the network subscription identifiers 342 to the network providers, network communication settings, router configurations, firewall settings, network sharing settings, IP address settings, user authentication settings, network traffic settings, and the like. The network data 354, together with the configuration data 356, may control and facilitate network connectivity of the vehicle device 110 with the network 130, the management server 150, the user device(s) 160, and the additional device(s) 120.

In operation, the configuration data 356 includes one or more configurations that configure operation of the vehicle device 110, as described herein. For example, such configurations may be received from a user via the user device(s) 160 or the management server 150 (other devices in communication with the vehicle device 110). Each of the configurations stored in the configuration data 356 may include network preference information, location determination frequency, network connectivity information, and the like. The vehicle device 110 may store multiple configurations in the configuration data 356, which may be selectively run or implemented, for example, via user selection via the management server 150 or the user device(s) 160.

In various embodiments, the configurations of the vehicle device 110 may include default network settings. For example, the default network settings may indicate which network provider is to be used for the vehicle device 110 to establish network communications. The default network settings may be based at least in part on network preference associated with an organization associated with the vehicle device 110, cost information associated with network providers associated with the vehicle device 110, or any other information associated with the network providers and the organization associated with the vehicle device 110.

In operation, the web server module(s) 358 may include program code executable, for example, by the processor(s) 332 to provide a web-based access (for example, interactive graphical user interfaces accessible via web-based communications protocols, rendering of interactive graphical user interfaces written in web-based languages by web-based browsers, etc.) to the vehicle device 110, for example, to configure the vehicle device 110 and/or access data of the vehicle device 110. Such web-based access may be via one or more communications protocols, for example, TCP/IP, UDP, WebRTC, etc., and may include one or more secure communications/cryptographic protocols, for example, TLS, SSL, etc., and may further be provided via communications module(s) 340. This may include, for example, generating user interface data useable for rendering the various interactive user interfaces described. The user interface data may be used by various computer systems, devices, and/or software programs (for example, a browser program of a user device 160), to render the interactive user interfaces. The interactive user interfaces may be displayed on, for example, electronic displays (including, for example, touch-enabled displays). In various implementations one or more of the management server 150 and the user device(s) 160 may communicate with the vehicle device 110 via one or more of the web server module(s) 358.

In operation, the network cache 360 may store information regarding a list of networks associated with one or more network providers. The one or more network providers may be network providers associated with or linked to the network subscription identifiers 342. In some embodiments, the vehicle device 110 may not store the network cache 360. In other embodiments, multiple devices and/or systems may store the network cache 360. Further, the information stored in the network cache 360 may be a list of networks specific to a particular vehicle device, a particular type of network provider, a particular location, etc.

The location information, the network data, or the configuration data may be communicated, for example, via the communications module(s) 340, to other devices, such as the management server 150 or user device(s) 160. For example, the vehicle device 110 may be configured to reliably and securely transmit data to the management server 150 regardless of whether the connectivity of the vehicle device 110

(for example, to the management server 150) is intermittent. For example, data may be stored by the vehicle device 110 until connectivity is available, and may then by transmitted to the management server 150. In another example, data may be stored by the vehicle device 110 for a predetermined duration, and may then be transmitted to the management server 150.

In various implementations, as described above, the vehicle device(s) 110 may communicate with one or more additional devices 120, which may include, for example, sensors or programmable logic controller (PLC) capable of generating and providing real-time or delayed alerts, notifications, data, for example, related to assets associated with the vehicle device(s) 110. Communications with additional device(s) 120 may be via direct (for example, not via a network) wired and/or wireless communications, and/or may be via a network (for example, a local network) wired and/or wireless communications.

In various embodiments, the vehicle device 110, may include various other modules, components, engines, etc. to provide the functionality as described herein. It will be appreciated that additional components, not shown, may also be part of the vehicle device 110, and, in certain embodiments, fewer components than that shown in FIG. 3 may also be used in the vehicle device 110.

In various embodiments, firmware of the vehicle device 110 may be updated such that the vehicle device 110 may provide additional functionality. Such firmware updating may be accomplished, for example, via communications with the management server 150, thereby enabling updating of multiple vehicle device 110 remotely and centrally. Additional functionality may include additional ways of communieating with additional devices 120, additional configurations or options for configurations, and/or the like.

Example Event Detection Models

As will be discussed further herein, the vehicle device and/or the event analysis system may implement certain machine learning techniques that are configured to identify features within sensor data, such as in images from one or more of the outward-facing or inward-facing cameras of the vehicle device, audio detected by one or more microphones of the vehicle device, metadata from other sensors, and the like. The feature detection may be performed by a feature detection module (e.g., part of the vehicle device and/or the event detection system), which may include program code executable by one or more processors to analyze video data, audio data, sensor data (e.g., motion sensors, positioning, etc.) and/or any other sensor data. While some of the discussion herein is with reference to analysis of video data, such discussions should be interpreted to also cover analysis of any other type of data, such as any asset data.

In some embodiments, the vehicle device can process video data locally to identify various associated features, such as detection of an object (e.g., a person or a vehicle), characteristics of the object (e.g., speed, distance, dimensions, etc.), location of the object within the image files of the video, and the like. This feature data comprises metadata, which can be indexed (e.g., to a corresponding video recording or video feed) to track the time ranges that each detection begins and ends in video data. Such metadata, and other optimized data, can then be analyzed by event detection models executing on the vehicle device and/or selectively transmitted to the event analysis system.

In some embodiments, the feature detection module and/or event models (e.g., executed by the vehicle device or the event analysis system) can include a machine learning component that can be used to assist in detection of safety events, such as in real-time at the vehicle device. For example, the machine learning component can implement machine learning algorithms or artificial intelligence (AI) to generate and/or update neural networks that are executed by a processor (e.g., in the vehicle device and/or the event analysis system). In some embodiments, the machine learning component can use one or more machine learning algorithms to generate one or more models or parameter functions for the detections. The machine learning component can be configured to generate an event model that understands which types of data indicate which types of detections. One or more of these event models may be used to determine an expected value or occurrence based on analysis of received data. In some embodiments, video recording criteria (e.g., pre-configured video recording criteria) can be designated by a user, admin, or automatically. For example, the video recording criteria can indicate which types of detected features to monitor, record, or analyze. By designating specific types of detections, resources (e.g., processing power, bandwidth, etc.) can be preserved for only the types of feature detections desired.

Various types of algorithms may be used by the machine learning component to generate the event detection models (e.g., that perform feature detection and related event detection). For example, certain embodiments herein may use a logistical regression model, decision trees, random forests, convolutional neural networks, deep networks, or others. However, other event detection models are possible, such as a linear regression model, a discrete choice model, or a generalized linear model. The machine learning algorithms can be configured to adaptively develop and update the event detection models over time based on new input received by the machine learning component. For example, the event detection models executed by the vehicle device may be regenerated on a periodic basis (e.g., by the event analysis system) as new received data is available to help keep the predictions in the event detection model more accurate as the data is collected over time. Also, for example, the event detection models may be regenerated based on configurations received from a user or management device.

Some non-limiting examples of machine learning algorithms that can be used to generate and update event detection models can include supervised and non-supervised machine learning algorithms, including regression algorithms (such as, for example, Ordinary Least Squares Regression), instance-based algorithms (such as, for example, Learning Vector Quantization), decision tree algorithms (such as, for example, classification and regression trees), Bayesian algorithms (such as, for example, Naive Bayes), clustering algorithms (such as, for example, k-means clustering), association rule learning algorithms (such as, for example, Apriori algorithms), artificial neural network algorithms (such as, for example, Perceptron), deep learning algorithms (such as, for example, Deep Boltzmann Machine), dimensionality reduction algorithms (such as, for example, Principal Component Analysis), ensemble algorithms (such as, for example, Stacked Generalization), and/ or other machine learning algorithms.

These machine learning algorithms may include any type of machine learning algorithm including hierarchical clustering algorithms and cluster analysis algorithms, such as a k-means algorithm. In some cases, the performing of the machine learning algorithms may include the use of an artificial neural network. By using machine-learning techniques, copious amounts (such as terabytes or petabytes) of received data may be analyzed to generate models without manual analysis or review by one or more people.

Example Driver Profile Generation and Driver Assignment to a Delivery Task

FIG. 4A is a flow diagram 400 illustrating an example process for the management server to assign drivers and/or vehicles, according to various embodiments of the present disclosure. Depending on the embodiment, however, the processes may be performed by different devices than illustrated, the method may include fewer or additional blocks, and/or the blocks may be performed in an order different than is illustrated.

In some embodiments in FIG. 4A and throughout the description, features are described for the driver and/or the vehicle for simplicity of the description. However it is appreciated that features for the driver can be applied for the vehicle, and vice versa.

Beginning at block 402, sensor data (e.g., video data) is stored for processing by one or more event models. For example, sensor data output from the multiple sensors associated with the vehicle device 110 of FIG. 1 may be recorded at block 402. At least some of the sensor data (e.g., metadata and asset data) can be stored in a sensor data store in the associated vehicle. For example, video data and metadata from one or more sensors may be stored for a particular time period (e.g., 2, 12, 24 hours, etc.). Such sensor data can include a video stream or image from a dashcam installed within the vehicle. The dashcam can record a view of the driver and/or a surrounding area of the vehicle, such as in front of the vehicle. The video stream of or individual images captured from the dashcam can be analyzed to identify events, as described herein. For example, the video stream can be inputted into a neural network to determine characteristics of the user, such as whether the user is distracted or sleepy while driving. In some embodiments, the assessment of the images or video stream occurs on the dashcam and the derived events (without the video stream) are sent to the management server.

In some embodiments, the sensor data can also include IMU, GPS, and ELD data. Sensor data may further comprise any vehicle diagnostic data, such as, but not limited to, data related to cruise control use, coasting, accelerator pedal use, idling, battery state, anticipation, motor rotations per minute, motor power, fuel level, engine revolutions per minute (RPM), speed, engine torque, engine load, brake use, etc. of the vehicle 110. U.S. application Ser. No. 17/242,919, titled "Vehicle Gateway Device and Interactive Graphical User Interfaces Associated Therewith," filed on Apr. 28, 2021, which is hereby incorporated by reference in its entirety and for all purposes, includes further sensor data that can be collected from the vehicles.

In some embodiments, the vehicle gateway device can receive vehicle battery data associated with a battery from the vehicle 110. The vehicle battery data can represent a state of the vehicle battery. The vehicle battery data can be for an electric vehicle, a hybrid vehicle (such as a plug-in hybrid electric vehicle), or internal combustion engine (ICE) vehicles. The vehicle gateway device can listen for battery-related messages from a battery management system (BMS) of the vehicle 110. Additionally or alternatively, the vehicle gateway device can request vehicle battery data from the battery management system. Advantageously, the management server can apply this data when controlling autonomous vehicles in a fleet of vehicles.

In some embodiments, the vehicle gateway device can receive and/or determine vehicle metric data. In particular, the vehicle gateway device can determine vehicle metric data from the raw vehicle data. For example, the raw vehicle data regarding cruise control use, coasting, accelerator pedal use, idling, battery state, anticipation, motor rotations per minute, motor power, fuel level, engine revolutions per minute (RPM), speed, engine torque, engine load, brake use, etc. can be voluminous. The vehicle gateway device can parse and organize the raw vehicle data into individual vehicle metrics. For example, a value and/or on/off state can be determined for each of cruise control use, coasting, accelerator pedal use, idling, battery state, anticipation, motor rotations per minute, motor power, fuel level, engine revolutions per minute (RPM), speed, engine torque, engine load, brake use, etc. over the period of time. Moreover, some example vehicle metrics can be based on a combination of vehicle parameters. For example, a vehicle metric can be for coasting. The vehicle gateway device can determine the vehicle metric for coasting to be either true or false based on a combination of vehicle parameters, such as engine torque, vehicle speed, brake pedal engagement, and/or accelerator pedal engagement. In particular, the vehicle gateway device can determine the vehicle metric for coasting to be true when each of the following are determined to be true: engine torque is zero, vehicle speed is greater than zero, brake pedal is not engaged, and accelerator pedal is not engaged.

Another example of determined vehicle metric can be for accelerator pedal engagement. In some embodiments, accelerator pedal data from the vehicle bus may be unreliable. Accordingly, the vehicle gateway device can determine the vehicle metric for accelerator pedal engagement based on at least one of engine torque or engine load. For example, the vehicle gateway device can determine the vehicle metric for accelerator pedal engagement as a percentage based value ranges for engine torque and/or engine load.

Yet another example of determined vehicle metric can be for anticipation. Anticipation can generally refer to driver behavior with respect to anticipating having to brake, which can be indicative of fuel/energy efficient driving. For example, those drivers that anticipate traffic in their driving will typically not have to brake as hard. The vehicle metric for anticipation can be a categorizations of brake events, such as, any brake event and/or a quick brake event. The vehicle gateway device can determine the brake event category based on a combination of vehicle parameters, such as brake pedal engagement, accelerator pedal engagement, engine torque, and/or engine load. In particular, the vehicle gateway device can determine the vehicle metric for a quick brake event when each of the following are determined: the accelerator pedal is disengaged and the brake pedal is subsequently engaged in approximately less than one second. Any brake event can include any time the driver presses the brake pedal.

At block 404, a multimodal deep learning model can be applied to generate a driver profile. The inputs of this multimodal deep learning model can include the sensor data that was captured in block 402. The multimodal deep learning model (or the one or more event models) can be executed on the sensor data to identify harsh events indicative of a sudden, extreme, and/or unexpected movement of the vehicle and/or driver. In some embodiments, the one or more event models can be separate from the multimodal deep learning model, whereby the one or more event models detect harsh events and the harsh events are inputted into the multimodal deep learning model to generate a driver profile. In other embodiments, the multimodal deep learning model is trained to output and/or apply the harsh events when generating the driver profile. Related U.S. Application No.

63/113,645, titled "Dynamic Delivery of Vehicle Event Data," filed on Nov. 13, 2020, which is hereby incorporated by reference in its entirety and for all purposes, includes further methods and circuitry for detecting harsh events. In addition, or as an alternative, to detection of harsh events, the vehicle device 110 advantageously executes one or more event models (e.g., neural networks) on sensor data, such as video data, to detect safety events, such as a tailgating, forward collision risk, and/or distracted driver event.

In some embodiments, the neural networks that are executed for detection of safety events at the vehicle device are optimized for low latency, high recall, and low precision, whereas neural networks that are executed at a backend server system may be optimized for higher precision. Thus, the neural networks executed on the vehicle device are optimized to be executed in real-time (e.g., low latency), to have a high proportion of actual positives identified correctly (e.g., high recall), and to not be overly concerned with the proportion of positive identifications that were actually correct (e.g., low precision). Accordingly, the outputs of the neural networks at the vehicle device may be provided in substantially real-time to the actual occurrence of a detected event, such that an alert and/or other preventative actions may be taken to minimize further risks. In contrast, the neural networks that are executed at the backend server system do not typically have the same time pressure and the backend server system includes significantly more processing power and bandwidth. Accordingly, in some embodiments neural networks for detecting safety events may be trained at the backend server system for use with the low latency, high recall, and low precision constraints associated with the vehicle device, and provided to the vehicle device periodically and/or when significant updates to the neural network are made.

In some embodiments, the event detection models executed at the vehicle device are performed on downsampled images from the video feed. For example, a portion of the outward-facing video feed, such as a 300×300 pixel area of the 1920×1080 pixel video, may be extracted from the video feed to enable the low latency analysis needed to provide real-time alerts at the vehicle device. The extracted portion may change in size or position over time, such as in response to a periodic analysis of a frame of the video image to detect features of interest. In some embodiments, the additional asset data is periodically transmitted to the backend server system, regardless of detection of safety events. For example, in some implementations a still image from the outward-facing video camera may be transmitted to the backend server system every two minutes. Such additional asset data may be used in training the neural networks.

At block 406, the data collector/aggregator can collect historical trip information for a particular vehicle and/or driver. This historical trip information can be added to the driver profile that was generated by the multimodal deep learning algorithm. The historical trip information can include delivery times, customer satisfaction ratings, on-trip information, delivery quality, and/or the like.

At block 408, the driver profiles can be stored in a driver profile database. At block 410, a delivery task descriptor can be retrieved from a command center or a client requesting for a delivery task to be performed. The features can include a pickup location, a destination location, a cargo type, a pickup time, a drop off time, and/or the like.

At block 412, a ranking module can receive the features of the delivery task to be performed and access the batch of available driver profiles. The ranking module can apply the features of the delivery task and driver profiles to a neural network. The neural network can output a score for a particular driver. The ranking module can repeat this step for each available driver to identify the driver with the highest score in order to assign the driver to the delivery task.

In some embodiments, the ranking module can receive the driver profiles and delivery task information to determine driver efficiency. For example, the delivery task may require a driver to drive through a congested city. The ranking module can determine a fuel efficiency of a driver and weigh fuel efficiency based on the route taken through the congested city when determining the rank of the driver. In some embodiments, the ranking module can weigh safety events that have occurred for the user in the past and determine whether the driver would be a good fit for the delivery.

Figure 4B:
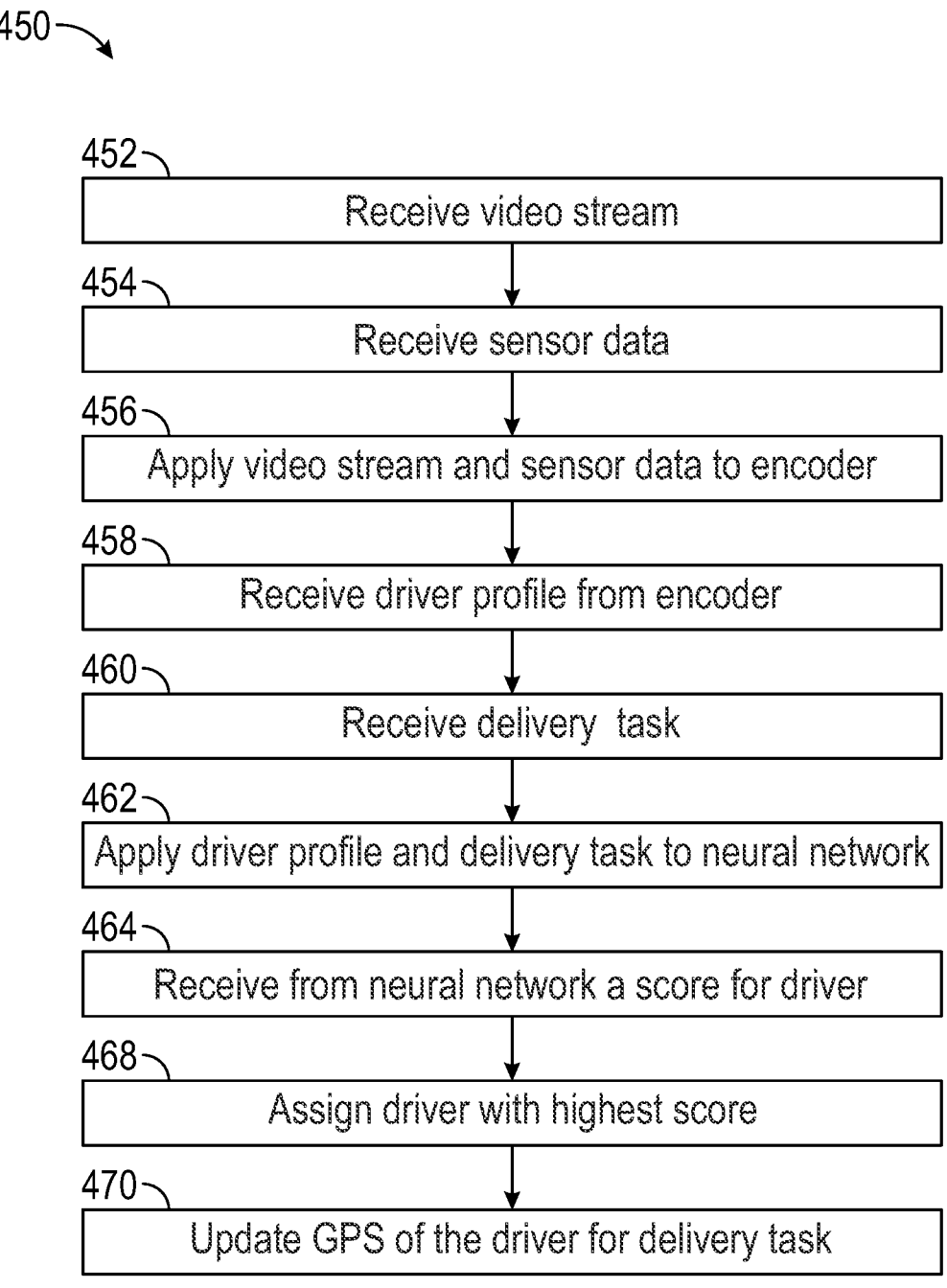
FIG. 4B is a flow diagram illustrating an example process of applying neural network to driver and/or vehicle information to make an assignment for a delivery task, according to various embodiments of the present disclosure.

FIG. 4B is a flow diagram 450 illustrating an example process of applying neural network to driver and/or vehicle information to make an assignment for a delivery task, according to various embodiments of the present disclosure. Depending on the embodiment, however, the processes may be performed by different devices than illustrated, the method may include fewer or additional blocks, and/or the blocks may be performed in an order different than is illustrated.

Starting at block 452, the management server can receive a video stream from a dashcam sensor recording the video stream. The dashcam can record a video stream of a surrounding of a vehicle, such as the front or back of the vehicle. Such information can be helpful to determine how the driver is driving. For example, the video stream can be used to identify whether there is a stop sign and apply this data with other information such as GPS or IMU data to determine whether the driver tends to perform a rolling stop at stop signs. The video stream can also be used to determine whether the vehicle is tailgating another vehicle. The dashcam can record a video stream of the driver. This video stream can be used to determine characteristics of the user, such as whether the user is distracted or sleepy while driving. In some embodiments, the dashcam can send the video stream or image to the management server for the management server to assess. In other embodiments, the dashcam can perform preprocessing on the video stream or image, such as to identify events, and send the events to the management server to perform further processing. For example, the dashcam can process the data through a neural network to identify characteristics of the user, such as whether the user is distracted. In other embodiments, the events can be an intermediary determination, such as whether the user has moved their head in a certain direction, and the management server would then make the final determination of whether the user is distracted.

At block 454, the management server can receive sensor data from one or more sensors that are on the vehicle. The one or more sensors can record the sensor data that indicates a characteristic of the vehicle or the surrounding of the vehicle. For example, the sensor data can include GPS, IMU, ELD, and other types of data. ELD devices can track how much distance a vehicle is moving, velocity of the vehicle, fuel efficiency, battery, and/or diagnostics data for the vehicle. IMU data can record inertial measurements, angular rates, force, accelerometer data, gyroscope data, and/or the like. GPS devices can record geolocation of the vehicle.

At block 456, the management server can input the video stream and the sensor data of an individual driver into an encoder of a first neural network (e.g., the multimodal deep learning model). The first neural network is trained using the encoder and a decoder. During training, the encoder and decoder can be trained to generate a similar output as the input to the first neural network. The encoder can be trained to output a latent description of the driver and/or vehicle at a particular time. In some embodiments, during inference of a driver profile, only the encoder could be used.

In some embodiments, the vehicle and/or the management server can perform preprocessing of the video stream from the dashcam before inputting the data into the first neural network. For example, the preprocessing can include an inference in the data, such as whether the vehicle is tailgating the car in front of the vehicle or if the driver is distracted. For example, each time stamp in the video stream can indicate whether the driver is focused on the road or whether the driver is distracted. The preprocessing module can track what types of information can be derived from the image or video at a certain time. Face recognition models can be applied to the video stream. The face recognition models can output a vector in latent space, where elements of this vector describe what is shown on the image, such as certain patterns on the person's face that can be used to determine whether the user is looking away. The management sever can then input these features and/or vectors from the video stream and the sensor data into the encoder of the first neural network. U.S. application Ser. No. 17/741,104, titled "Multistream Camera Architecture," filed on Apr. 28, 2021, which is hereby incorporated by reference in its entirety and for all purposes, includes further embodiments of processing video data from cameras.

At block 458, the management server can receive a driver and/or vehicle profile for the individual driver as an output of the encoder. The driver profile can be specific to an individual driver of a fleet of drivers. The management server can repeat blocks 452-458 for each individual driver or vehicle in the fleet to generate individual driver or vehicle profiles for each driver and vehicle in the fleet. The At block 460, the management server can receive a delivery task descriptor that includes a delivery task for delivery of goods to a location at a particular time. In order to assign a delivery task to a driver, the management server can perform the steps described in block 462-466.

At block 462, the management server can input an individual driver profile and the delivery task descriptor into a second neural network (such as a ranking module). The ranking module can apply information about the delivery task and information regarding the driver/vehicle to identify the suitability of the vehicle or driver to the delivery task. At block 464, the second neural network can output a score for an individual driver. The management server can repeat blocks 462-464 for each driver and/or vehicle to generate scores for each of the drivers and/or vehicles. At block 468, the driver and/or vehicle with the highest score can be identified and assigned to the delivery task.

At block 470, the management server can update a user device of the driver vehicle. Advantageously, the management server can seamlessly not only assign drivers for a delivery task, but can also update the a routing display (such as a GPS device) to display routes for the vehicle to make such pickups and deliveries of cargos. The management system can transmit such a notification over a wireless communication channel to activate the installed electronic file (e.g., a GPS application on a driver's mobile application), to cause connection between the electronic file of the user device (such as a mobile phone or a GPS device) and the management server over the Internet, and to display details of the delivery task to the driver.

Advantageously, the dynamic generation of the pickup and drop off locations for the delivery task on a GPS device associated with a driver improves an Internet-centric technical problem that is necessarily rooted in computer technology. In the example of driver assignments, the driver can be immediately notified of a delivery task. Thus, the user can be alerted of time and/or distance sensitive delivery information when the user is away from a web browser and/or not using the user's mobile phone, providing a practical solution to the technical problem of the user being away from a computing device, such as when the driver is not linked to their fleet management software portal, while the user is driving, while a home desktop or mobile phone, and/or a user device is not specifically using a communication network (such as a user not using the wireless network on the mobile phone) or have the GPS application open.

In some embodiments, the alert can be transmitted over a communication channel, such as a wireless communication channel to a wireless computing device associated with the user, where the alert can activate an application (such as a GPS device) on the computing device to launch an application that causes the alert to display the message and enable connection of the computing system with the management server over the Internet.

In some embodiments, the alert can be transmitted to an autonomous vehicle, whereby the alert advantageously initiates autonomous movement of the autonomous vehicle. The alert can include a pickup location and time as well as a dropoff location and time. The alert can initiate the autonomous vehicle to travel to the pickup location at the pickup time. The alert can also include information for the autonomous vehicle to identify a dropoff location and time, once the cargo is picked up.

In addition, the management server can receive data from the vehicle and process sensor data in the models, train the models, access sensitive data such as user data or other third party data to assign drivers/vehicles and/or recommend potential routes for deliveries. Such processing by the management server can be performed on the server side, remote from a client computing device. Advantageously, the processors can analyze large amounts of data, run complexed algorithms, and have access to databases that may not be able to be performed on a client computing device, such as a mobile phone, a laptop, or a vehicle display. Accordingly, this practical application is a technological improvement, as the processing can be performed without being dependent on the hardware, operating system, and/or software of a client computing device. Moreover, such processing on the server side can result in faster processing with more processing power of servers, rather than being limited to the processing power of a client device (such as a mobile phone or vehicle processor).

Figures 5A, 5B:
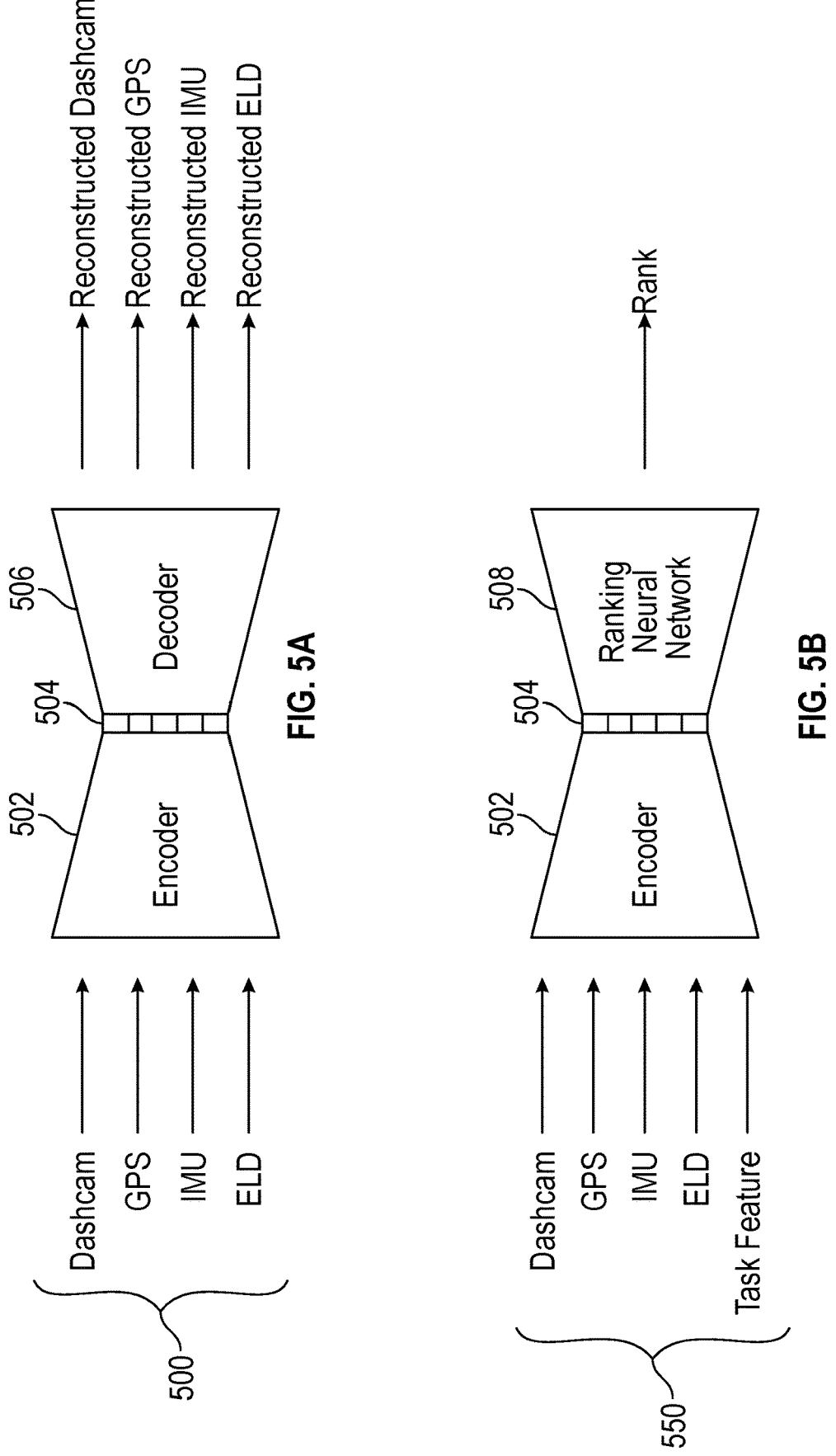
FIG. 5A is an architectural diagram illustrating the encoder and decoder for training the neural network, according to various embodiments of the present disclosure.
FIG. 5B is an architectural diagram illustrating the encoder and ranking neural network for assignment of a driver to a delivery task, according to various embodiments of the present disclosure.

Example Driver Training and Applying an Encoder Architecture for Assigning a Delivery Task FIG. 5A is an architectural diagram 500 illustrating the encoder and decoder for training the neural network, according to various embodiments of the present disclosure. The multimodal deep learning model can include an encoder 502. The encoder 502 can be trained with a decoder 506. The multimodal deep learning model can receive inputs corresponding to historical descriptions about the driver and vehicle status. The historical descriptions can be collected from historical trips. For example, a driver can have performed 8 deliveries in the past. The dashcam video, the sensor data, and the data from the data collector/aggregator can be inputted into the encoder 502.

The multimodal deep learning model can be trained using a self-supervised model whereby the encoder 502 is trained with a decoder 506 to generate a similar output as the input.

The encoder 502 can be trained to output feature descriptors 504 that describe features of the driver and/or vehicle. For example, the encoder 502 can receive as input a video stream from the dashcam and IMU, GPS and ELD data. The encoder can output specific features about the driver. These feature outputs can include the latent space that describes features of the driver. The decoder 506 can receive the features and output a reconstruction of the video stream from the dashcam and IMU, GPS and ELD data. The decoder 506 is trained to recreate the outputs close to the inputs of the encoder.

FIG. 5B is an architectural diagram 550 illustrating the encoder and ranking neural network for assignment of a driver to a delivery task, according to various embodiments of the present disclosure. During inference of a driver profile, the encoder 502 can receive as input a video stream from the dashcam and IMU, GPS and ELD data and output a driver profile that includes feature descriptors 504. These feature descriptors 504 can be inputted into a separate ranking neural network 508. The ranking neural network 508 can output a score for the individual driver. The ranking neural network 508 can also receive as input information associated with a delivery task, such as task feature information related to a particular delivery task. The output of the ranking neural network 508 can include a rank for the driver, such as a fitness of the driver for a particular delivery task.

The steps of FIG. 5B can be repeated for each driver to identify a rank for each driver for a particular delivery task. For example, if there are four individual drivers, historical sensor and dashcam data for each of the four drivers can be inputted into the encoder 502 to generate 4 separate driver profiles. Each of the driver profiles can be inputted into the ranking neural network 508, and each driver can be assigned to a ranking score (e.g., driver 1 has a 0.8 ranking score, driver 2 has a 0.5 ranking score). The management server can assign the driver with the highest rank to the delivery task.

In some embodiments, the ranking neural network 508 is a completely separate neural network than the encoder 502. The ranking neural network 508 can be trained separately from the encoder 502.

In some embodiments, the encoder/decoder and ranking neural network trained separately and on different sets of data. The encoder/decoder can be trained using self-supervised learning by inputting the sensor data and a video stream (or a derived characteristic thereof) to the encoder, and test whether the decoder reconstructs sensor data and the video stream appropriately. The ranking neural network can be trained using supervised learning. The ranking neural network can receive driver profile information and historical delivery task information and generate an output ranking. The ranking neural network can test the generated output ranking with historical outcome data, such as delivery quality, safety events, and delivery time.

In some embodiments, the encoder/decoder and/or the ranking neural network can be retrained based on certain triggers. The encoder/decoder and/or the ranking neural network can be retrained based on a predetermined time period, such as retraining the networks every six months as the system collects more data. The encoder/decoder and/or the ranking neural network can also be retrained based on a population change of the fleet, such as when new drivers or vehicles are added to the fleet.

Moreover, training of models, such as artificial intelligence models is necessarily rooted in computer technology, and advantageously improves on models by using training data to train such models and thereafter applying the models to a new set of user data. Such training involves complex processing that typically requires a lot of processor computing and extended periods of time with large training data sets, which are typically performed by massive server systems. Training of models can require logistic regression or forward/backward propagating of training data that can include input data and expected output values that are used to adjust parameters of the models. Such training is the framework of machine learning algorithms that enable the models to be applied to new data (such as new delivery information) and make predictions that the model was trained for based on the weights or scores that were adjusted during training. Such training reduces false positives and increases the performance of assigning drivers/vehicles to delivery tasks and/or recommending routes among multiple potential routes.

Example Safety Events and Factors for the Ranking Algorithm

In some embodiments, the ranking module can weigh certain safety events more than others. In some embodiments, the weighing of the safety event can vary, such as based on the delivery task. The ranking module may weigh distracted driving more heavily for longer deliveries. The ranking module can determine a rolling stop or sharp turn driving behavior. The ranking module can weigh a sharp turn more heavily than a rolling stop if the cargo is especially heavy. The ranking module can determine a pedestrian car crash, according to various embodiments of the present disclosure. Certain accidents may be weighed more heavily than others, such as hitting a pedestrian versus backing into a wall while parking. The ranking module can determine speeding behavior, according to various embodiments of the present disclosure. The ranking module may weigh different speeds differently, such as whether the driver is speeding 10 miles per hour higher than the speed limit as compared to 20 miles per hour higher. If there is a required deliver time, more positive weight can be applied to drivers that drive a little faster. Weighting of event types (such as whether the driver is speeding) or sensor data (such as speed) can be custom set and/or dynamically updated. For example, the weighting can be initially set for certain event types. The weighting can be updated based on certain factors, such is if the driver was driving under rainy conditions, the speeding threshold can be triggered at a lower speed. The ranking module can determine tailgating behavior, according to various embodiments of the present disclosure. Tailgating can also be weighed differently based on the distance of the tailgating between the cars.

In some embodiments, the ranking module can determine distracted driving behavior, according to various embodiments of the present disclosure. The ranking module can determine sleepy driving behavior, according to various embodiments of the present disclosure. Distracted driving behavior can include actions where the driver is not focused on the road. Such actions can include sleepy driving where the driver closes their eyes or bobbles their heads. Other actions include eating, texting, smoking, or performing other actions while driving instead of solely focusing on driving. The neural networks and/or preprocessing modules can process the dashcam video to determine such distracted driving actions. Certain actions may be weighed heavier than others. For example, smoking while driving may be weighed less than eating or texting while driving.

Example Flow Diagram of Assigning a Truck to a Delivery Task

Figure 6A:
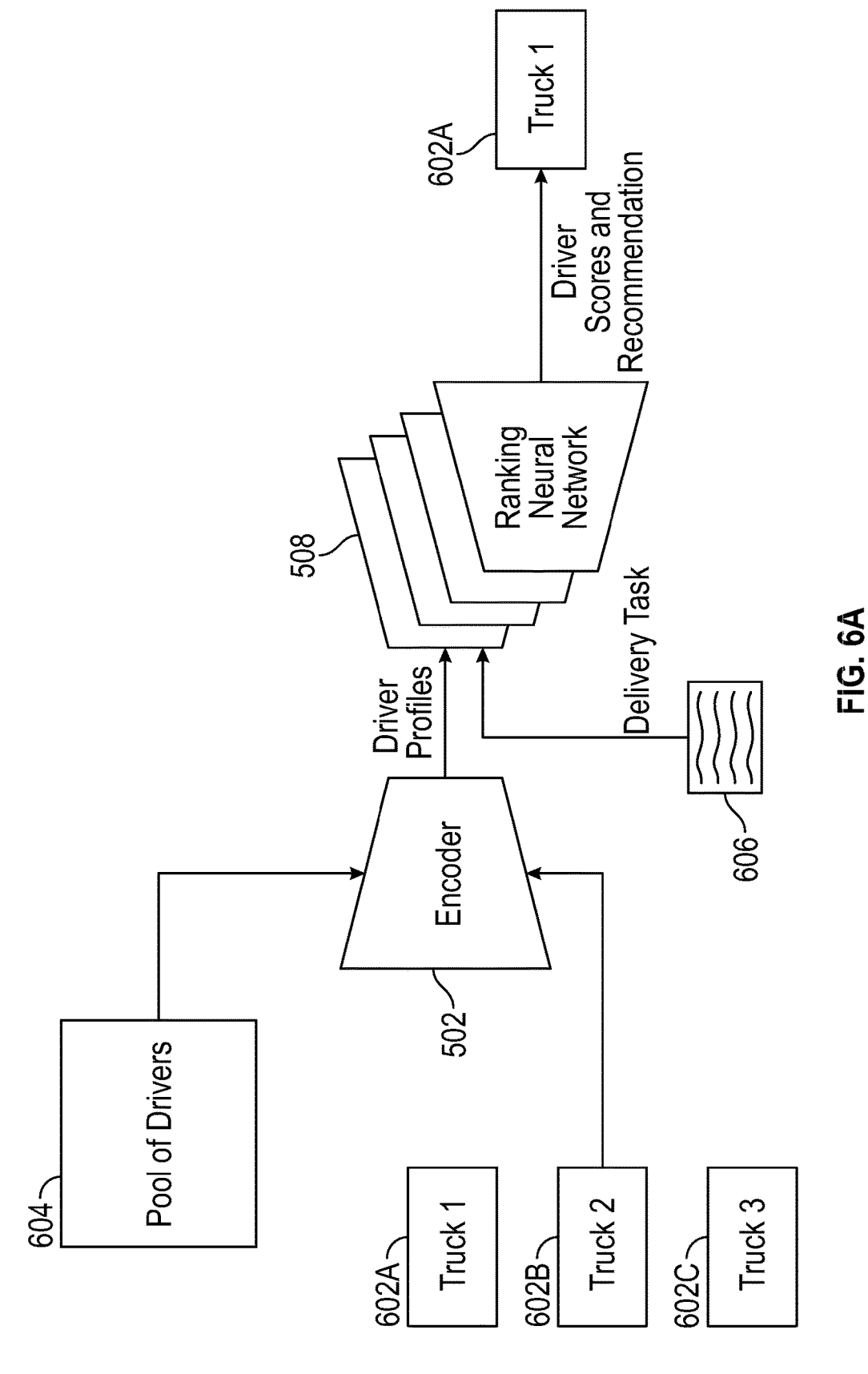
FIG. 6A is a flow diagram illustrating an example of the assignment and/or recommendation of a driver to a single delivery task, according to various embodiments of the present disclosure.

FIG. 6A is an flow diagram 600 illustrating an example of the assignment and/or recommendation of a driver to a single delivery task, according to various embodiments of the present disclosure. Information about related to a fleet of drivers 604 can be inputted into the encoder. For example, corresponding information can include demographic information about the drivers, such as age, gender, location, education, nationality, ethnicity, and/or the like. The corresponding information can also include employment statistics, such as missed work days, missed delivery times, missed pickup, timeliness, and/or the like.

In some embodiments, information from vehicles 602A, 602B, 602C (collectively referred to herein as vehicles 602) can be inputted into the encoder. Such information can include sensor data, such as from a dashcam, GPS, IMU, or ELD device. Other information can include the type of cargo that the vehicle 602 can carry.

The encoder 502 can receive inputs from the vehicles 602 and about the drivers 604 and output driver and/or vehicle profiles. The driver profiles can be specific to a particular driver. The driver profiles can be for a particular vehicle. For example, a first driver profile can be for a particular driver for vehicle 602A. a second driver profile can be for the same driver but for vehicle 602B.

The driver profiles can be inputted into a ranking neural network 508 with a delivery task 606. The ranking neural network 508 can output driver scores for each driver profile for the particular delivery task 606. In some embodiments, the management server can input each driver profile individually to the ranking neural network 508 with the same delivery task 606. When each driver profile is inputted, the ranking neural network 508 outputs a score for the individual driver. The management server can then select the driver and/or the vehicle 602A for the delivery task.

Figure 6B:
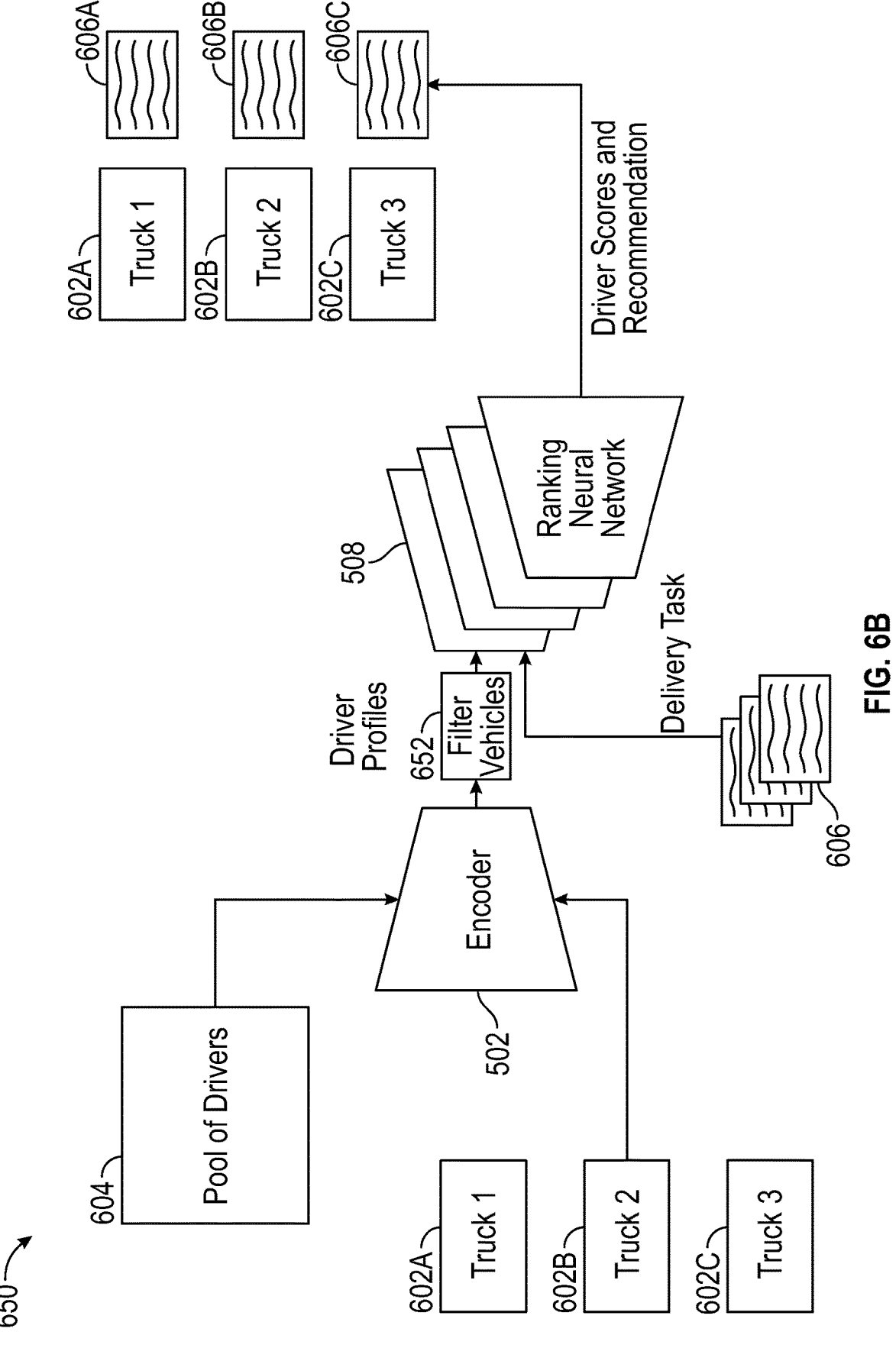
FIG. 6B is a flow diagram illustrating an example of the assignment and/or recommendation of drivers to multiple delivery tasks, according to various embodiments of the present disclosure.

FIG. 6B is an flow diagram 650 illustrating an example of the assignment and/or recommendation of drivers to multiple delivery tasks, according to various embodiments of the present disclosure. The flow diagram 650 of FIG. 6B is similar to the flow diagram 600 of FIG. 6A. Flow diagram 650 also includes a filter vehicles module 652. The filter vehicles module 652 can filter the vehicles based on the delivery task. For example, the delivery may require the delivery of a certain cargo type, such as fluids or chemicals. All vehicles of the fleet may not be equip to deliver such goods. The filter vehicles module 652 can filter these profiles before ranking the vehicles. The filter vehicles module 652 is shown to be performed before the ranking neural network for simplicity of the description. However it is understood that the filter vehicles module 652 can be applied elsewhere.

Flow diagram 650 illustrates multiple delivery tasks 606 to be inputted into the ranking neural network 508. The management server can input driver profiles and the delivery tasks 606 to the ranking neural network 508 to identify a mapping of vehicles and/or drivers to the delivery tasks. For example, the ranking neural network 508 can map vehicle 602A to delivery task 606A. The ranking neural network 508 can be trained to receive multiple driver profiles and multiple delivery tasks to assign an optimal ranking. This could be advantageous where if one driver profile is far superior than the other driver profiles, the ranking neural network 508 would not assign the superior driver profile to the first delivery task, but rather the best delivery task. In some embodiments, the management server can input a driver profile at a time with all of the delivery tasks into the ranking neural network 508 to generate rankings for each delivery task. In some embodiments, the management server can input multiple driver profiles at a time with a delivery task into the ranking neural network 508 to generate rankings for each driver for the particular delivery.

Example Flow Diagram of Route Recommendations

Figure 7:
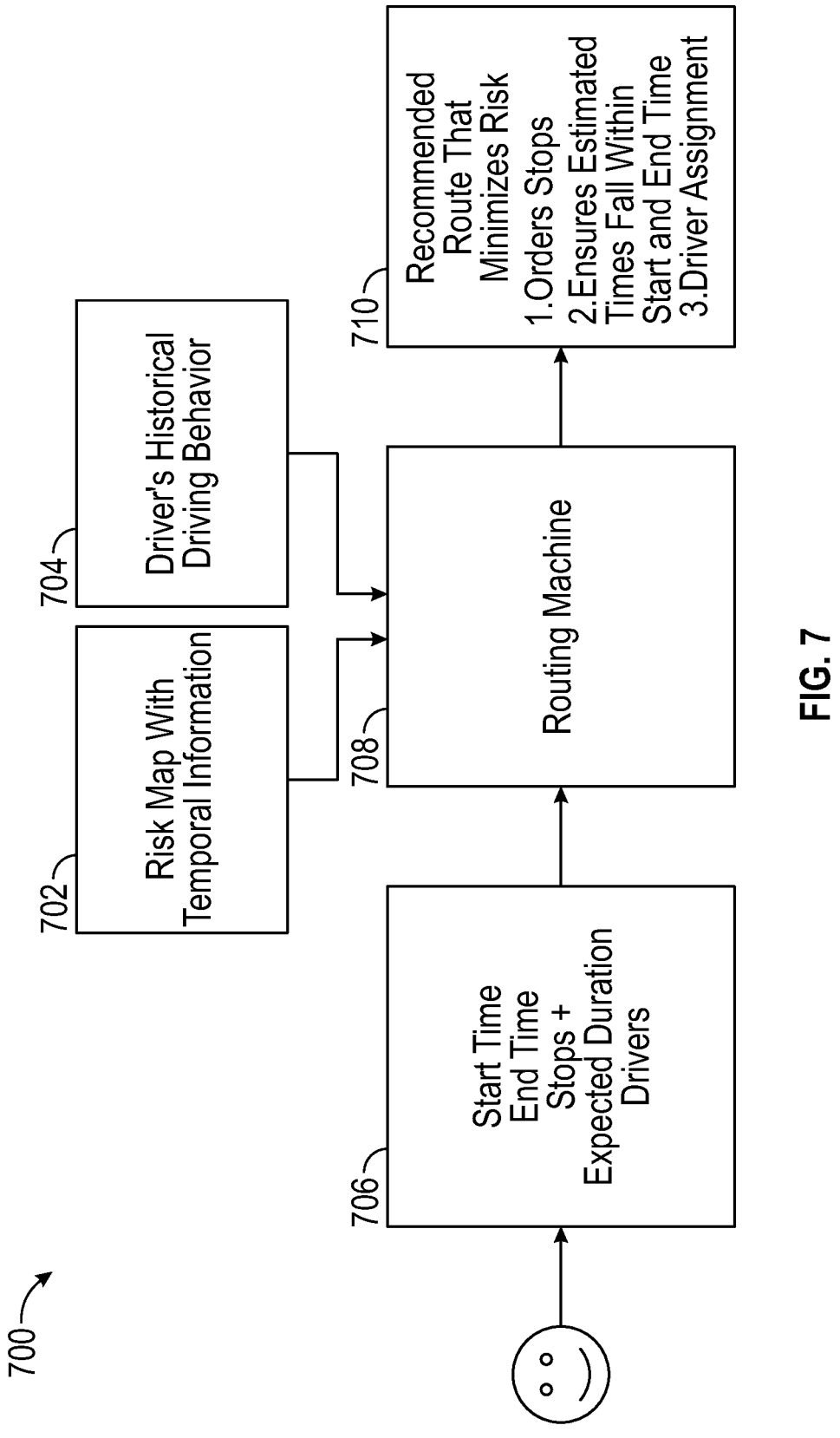
FIG. 7 is a flow diagram illustrating an example process for recommending a route that minimizes risk, according to various embodiments of the present disclosure.

FIG. 7 is flow diagram illustrating an example process for recommending a route that minimizes risk, according to various embodiments of the present disclosure. At block 706, the management server can receive delivery information, such as start and end time stops, expected durations, start and end locations, and/or the like.

At block 702, the management server can retrieve risk map information with temporal information, the system can receive or generate a heat map of dangerous road conditions (or indications of safety risks), according to various embodiments of the present disclosure. The map can include an overlay of dangerous conditions for particular segments of roads. The map including safety risks or road conditions can be specific to a particular time period, such as a time of year or time of day. For example, safety risks or road conditions in the winter months can be severe in certain geolocations, whereas traffic conditions can vary greatly based on the time of day.

At block 704, the management server can retrieve driver profiles for drivers of a fleet, which can include the driver's historical driving behavior. The driver profiles can be extracted using the multimodal deep learning model, as disclosed herein. In other embodiments, the routing machine itself can generate the driver profile by receiving sensor and/or dashcam data (or derived signal thereof) to recommend a route to a driver.

At block 708, the routing machine determines the optimal route for the delivery task. The routing machine can prioritize different factors, such as which route is more efficient, safer, or faster. The route determination can be based on the delivery task. For example, if the delivery task is to deliver fragile goods, the route determination may weigh safety over speed. The routing machine can base the recommendation on how many stops the vehicle will have to take. The routing machine can include a neural network that is trained to automatically adjust weights on factors based on the delivery task.

At block 710, the output of the routing machine can include a route that minimizes risk. Additional examples of factors to consider when recommending routes include the number of stops required for the delivery, likelihood of delivery (start and end times on the particular route), driver assignment, and/or the like.

Figure 8A:
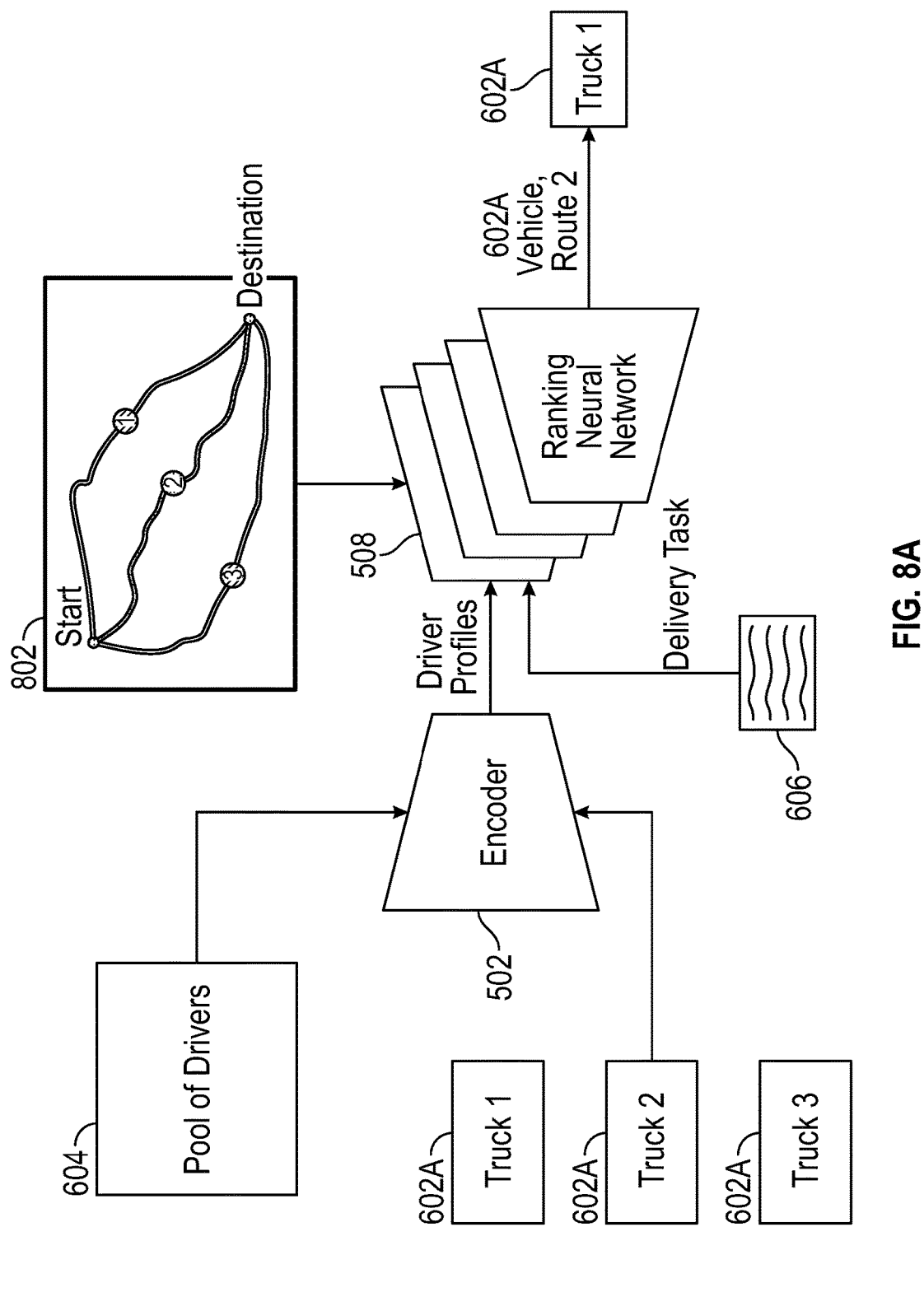
FIG. 8A is an architectural diagram illustrating an example of the assignment and/or recommendation of a route, according to various embodiments of the present disclosure.
Figure 8B:
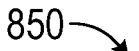
FIG. 8B is a flow diagram illustrating an example process for the recommending a route from three different potential routes, according to various embodiments of the present disclosure.
Figure 8B:
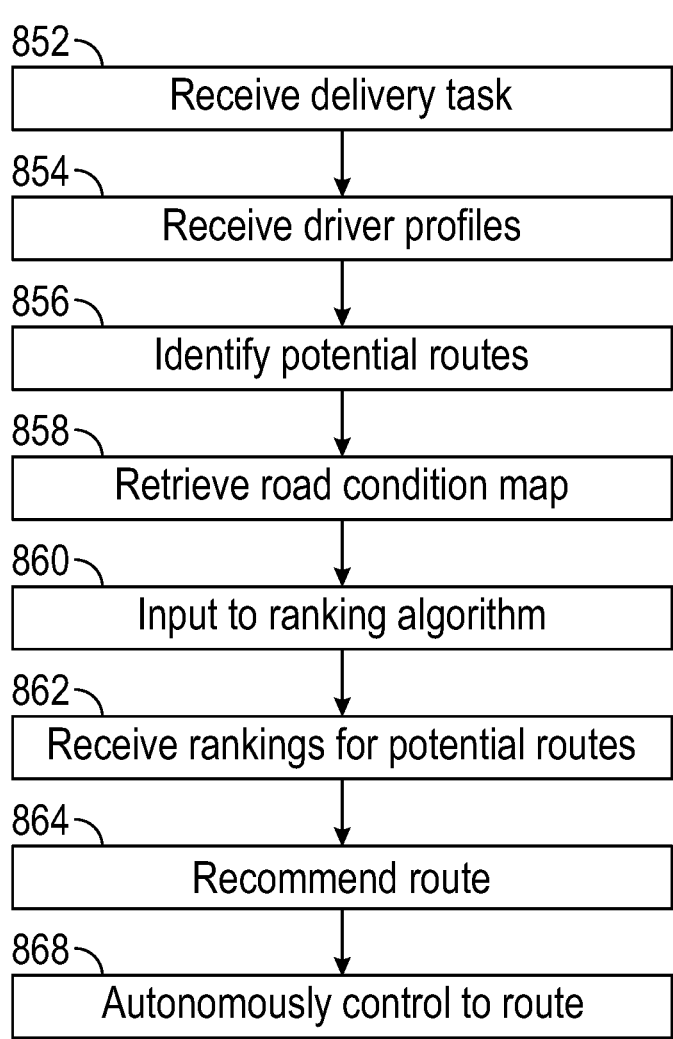

FIG. 8A is an architectural diagram 800 illustrating an example of the assignment and/or recommendation of a route, according to various embodiments of the present disclosure. FIG. 8B is a flow diagram 850 illustrating an example process for the recommending a route from three different potential routes, according to various embodiments of the present disclosure.

At block 852, the management server can receive a delivery task for delivery of goods, such as the delivery task 606. The delivery task can include a start and stop location, the type of cargo, and other requirements for the delivery.

At block 854, the management server can retrieve a plurality of driver profiles for individual drivers, such as the driver profiles outputted by the encoder 502. The driver profiles can be generated by the encoder/decoder architecture described herein. The driving profiles can be individual to each driver in the fleet of drivers.

At block 856, the management server can identify potential routes for the delivery task. In FIG. 8A, three potential routes have been identified in 802. At block 858, the management server can retrieve a map of safety risks or road conditions for these three potential routes. The heat map can include safety risks or road conditions for particular segments of the three potential routes. The heat map can be specific to the time period for the delivery. For example, the heat map can show traffic, pot holes, chances or history of car accidents, safety risks, road conditions, likely weather conditions for the time period, and/or the like.

At block 860, the driver profiles, delivery task information, potential route information, safety risks, and/or road conditions can be inputted into a ranking neural network. At block 862, the ranking neural network can rank the potential routes based on the inputted information. For example, the ranking neural network can weigh factors differently based on the driver profiles. If the driver speeds, icy road conditions may be factored more heavily for this particular driver. If the delivery information requires fast delivery of the goods, fast drivers on road with higher speed limits and less traffic may be valued higher.

In some embodiments, for each potential route and for each driver, the management system can input an individual driver profile and at least a portion of the map that includes the individual potential route into a neural network. The management server can receive from the neural network a score for the individual driver that corresponds to the individual potential route. At block 864, the management server can recommend a route with the highest score. At block 868, the management server can autonomously control the assigned vehicle to travel the recommended route at the time period requested for delivery.

Advantageously, the management server can send one of the three potential routes displayed in 802 to a GPS device of the vehicle. The GPS device can display the selected one of the three potential routes shown in 802, displaying delivery information to the driver. The management server can initiate the generation of a graphical user interface that optimizes valuable user interface real estate. For example, the management server can provide a display of a map that starts the routing of the vehicle to the pickup location. In some embodiments, the GPS device can start the routing to the pickup location near the time of pickup as indicated in the delivery task. Such an improved display interface allows a user to more quickly access the desired routing data.

In some embodiments, the management server alert can initiate a selectable function (e.g. a button, a summary list, text, radio button) on the GPS device and/or the driver's computing device that requests whether the driver accepts the delivery task and/or the route. Upon selection of the selectable function, the GPS device can launch one or more applications that provide further information to be seen. For example, selectable function can initiate display of a map that shows the pickup location for the goods and/or the recommended route. Advantageously, the specific and practical manner of displaying the limited set of information to the user via a selectable function improves the technical problem for the user interface in electronic devices over conventional systems by enabling the user to more quickly select the delivery and/or route data to launch an application for more information related to the selection (e.g., beginning GPS routing to the delivery location or displaying the recommended route). Accordingly, the visual indicators that correspond to functions that launch applications for more information improve the speed of the user's navigation through various views and windows. The user is saved from navigating to another application to identify delivery information, opening it up, navigating within a GPS application to input pickup locations, physically traveling to the pickup location, then navigating again within the GPS application to input a drop off location. The user is also saved from having to review routes to the drop off location and selecting a route. Moreover, the user is saved from paging through multiple screens of different applications (e.g., delivery information application and GPS application), and even within the same application (as discussed above with the GPS application), and instead, the management server can enable the user to access the relevant data in response to a single view and a few clicks of the user.

In some embodiments, the management server can identify or receive an indication of dangerously windy road conditions, according to various embodiments of the present disclosure. The management server can determine that certain potential routes have windy road conditions that may not be suitable, for example for a particular vehicle or driver. The management server can identify or receive an indication of icy road conditions, according to various embodiments of the present disclosure. The management server can weigh slower drivers in these conditions and/or identify potential routes that have higher collision histories when there are icy road conditions. The management server can identify or receive an indication of mountainous road conditions, according to various embodiments of the present disclosure. The management server can determine whether potential roads have narrow roads and/or no guard rails and increase weight on the danger risk for these types of roads. The management server can identify or receive an indication of sharp turn road conditions, according to various embodiments of the present disclosure. The management server can take into consideration road conditions when determining a ranking of a driver, a vehicle, or a potential route. For example, one driver may have less safety events while driving in snow than other drivers.

Additional Implementation Details and Embodiments

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code." "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Java, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression, or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers." "computer devices," "computing devices," "hardware computing devices," "hardware processors," "processing units," and/or the like. Computing devices of the above-embodiments may generally (but not necessarily) be controlled and/or coordinated by operating system software, such as Mac OS, IOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

As described above, in various embodiments certain functionality may be accessible by a user through a web-based viewer (such as a web browser), or other suitable software program. In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments may not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z." or "at least one of X, Y, or Z." unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one." whether used in the claims or elsewhere in the specification and regardless of uses of quantifiers such as "at least one." "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A vehicle management system for a plurality of vehicles, the vehicle management system comprising:

a vehicle device in a first vehicle, the vehicle device comprising:

a first enclosure configured to be mounted to a window of the first vehicle, the first enclosure housing:

a first dashcam sensor comprising an inward driver-facing camera configured to record a video stream of a first driver of the first vehicle and to generate video data based on the video stream; and a global positioning system (GPS) device configured to obtain vehicle location data associated with the first vehicle;

a vehicle gateway device in the first vehicle, the vehicle gateway device comprising:

a second enclosure configured to be positioned in the first vehicle, the second enclosure housing:

a physical vehicle interface configured to couple the vehicle gateway device to a port in the first vehicle such that the vehicle gateway device can communicate with at least one of a bus or an electronic controller of the first vehicle;

a computer readable storage medium having program instructions embodied therewith; and one or more processors configured to execute the program instructions to cause the vehicle gateway device to:

obtain raw vehicle data from the at least one of the bus or the electronic controller of the first vehicle; and determine vehicle metric data including acceleration data associated with the first vehicle and useable for harsh event determinations, the acceleration data determined based on at least one of: brake pedal engagement, accelerator pedal engagement, engine torque, or engine load; and a remote vehicle management server system for the plurality of vehicles including the first vehicle, the remote vehicle management server system comprising:

a second computer readable storage medium having second program instructions embodied therewith; and one or more processors configured to execute the second program instructions to cause the remote vehicle management server system to:

generate a plurality of driver profiles for individual drivers of a plurality of drivers, wherein to generate a first driver profile for the first driver of the plurality of drivers comprises:

receiving the video data from the vehicle device in the first vehicle, the video data including one or more features identified by an event detection model and related to one or more distracted driving events;

receiving the vehicle metric data from the vehicle gateway device in the first vehicle, the vehicle metric data including the acceleration data;

inputting the video data and the vehicle metric data into an encoder of a first neural network, wherein the first neural network is trained using the encoder and a decoder, and wherein the first neural network is configured to identify harsh events and determine a driver profile based on the video data and the vehicle metric data; and receiving the first driver profile for the first driver as an output of the encoder, wherein the first driver profile includes one or more harsh events and one or more distracted driving events associated with the first driver, wherein the one or more harsh events include at least an acceleration above a threshold rate;

receive a delivery task descriptor comprising a delivery task for delivery by a vehicle from a pickup location to a drop off location at a particular time;

filter the plurality of drivers to generate a second plurality of drivers, the filtering based on one or more of: vehicle location data or vehicle type of vehicles associated with the plurality of drivers;

for each driver of the second plurality of drivers:

input the individual driver profile and the delivery task descriptor into a second neural network, wherein the second neural network generates and applies weights for each harsh event of the one or more harsh events and each distracted driving event of the one or more distracted driving events, wherein the weights are based at least in part on the delivery task; and receive from the second neural network a rating for the individual driver;

identify a driver of the second plurality of drivers with a highest rating, wherein the driver with the highest rating is the first driver;

assign the first driver to the delivery task; and generate and transmit route data to a device associated with the first driver, the route data configured to generate a graphical user interface to display a route map that begins routing the first driver from a current location to the pickup location, and to navigate the first driver to the drop off location.

2. The vehicle management system of claim 1, wherein the port the physical vehicle interface of the vehicle gateway device is coupled to is an on-board diagnostic port of the first vehicle.

3. The vehicle management system of claim 1, wherein the vehicle device is configured to record a second video stream of an external surrounding of the first vehicle.

4. The vehicle management system of claim 1, wherein generating the first driver profile further comprises receiving sensor data comprising: Global Positioning System (GPS) data, Inertial Measurement Unit (IMU) data, and Electronic Logging Devices (ELD) data.

5. The vehicle management system of claim 1, wherein ELD data comprises distance the first vehicle moved, velocity of the first vehicle, fuel efficiency, battery, and diagnostics data.

6. The vehicle management system of claim 1, wherein the first driver profile comprises an indication of tailgating or fuel efficiency for the first driver.

7. The vehicle management system of claim 1, wherein the first driver profile comprises an indication of delivery quality or delivery time.

8. A method comprising:

generating a plurality of driver profiles for individual drivers of a plurality of drivers, wherein generating a first driver profile for a first driver of the plurality of drivers comprises:

receiving video data from a vehicle device in a first vehicle, the vehicle device comprising:

a first enclosure configured to be mounted to a window of the first vehicle, the first enclosure housing:

a first dashcam sensor comprising an inward driver-facing camera configured to record a video stream of the first driver and to generate the video data based on the video stream, the video data including one or more features identified by an event detection model and related to one or more distracted driving events; and a global positioning system (GPS) device configured to obtain vehicle location data associated with the first vehicle;

receiving vehicle metric data from a vehicle gateway device in the first vehicle, the vehicle gateway device comprising:

a second enclosure configured to be positioned in the first vehicle, the second enclosure housing:

a physical vehicle interface configured to couple the vehicle gateway device to a port in the first vehicle such that the vehicle gateway can communicate with at least one of a bus or an electronic controller of the first vehicle, wherein the vehicle gateway device is configured to obtain raw vehicle data from the at least one of the bus or the electronic controller of the first vehicle to determine the vehicle metric data, the vehicle metric data including acceleration data associated with the first vehicle and useable for harsh event determinations, the acceleration data determined based on at least one of: brake pedal engagement, accelerator pedal engagement, engine torque, or engine load;

inputting the video data and the vehicle metric data into an encoder of a first neural network, wherein the first neural network is trained using the encoder and a decoder, and wherein the first neural network is configured to identify harsh events and determine a driver profile based on the video data and the vehicle metric data; and receiving the first driver profile for the first driver as an output of the encoder, wherein the first driver profile includes one or more harsh events and one or more distracted driving events associated with the first driver, wherein the one or more harsh events include at least an acceleration above a threshold rate;

receiving a delivery task descriptor comprising a delivery task for delivery of cargo by a vehicle to a location at a particular time;

filtering the plurality of drivers to generate a second plurality of drivers, the filtering based on one or more of: vehicle location data or vehicle type of vehicles associated with the plurality of drivers;

for each driver of the second plurality of drivers:

inputting the individual driver profile and the delivery task descriptor into a second neural network, wherein the second neural network generates and applies weights for each harsh event of the one or more harsh events and each distracted driving event of the one or more distracted driving events, wherein the weights are based at least in part on the delivery task; and receiving from the second neural network a rating for the individual driver; identifying a driver of the second plurality of drivers with a highest rating; and assigning the driver with the highest rating to the delivery task.

9. The method of claim 8, wherein the first neural network is trained separately from the second neural network.

10. The method of claim 8, wherein the first neural network is trained using self-supervised learning, and the second neural network is trained using supervised learning.

11. The method of claim 8, wherein the first neural network is trained to output, from the decoder, a reconstruction of an input to the encoder.

12. The method of claim 8, wherein the second neural network is trained using historical driver profile data comprising historical delivery information and resulting safety events that have occurred during one or more historical deliveries.

13. A non-transitory computer storage medium storing computer-executable instructions that, when executed by a processor, cause the processor to perform a method comprising:

generating a plurality of driver profiles for individual drivers of a plurality of drivers, wherein generating a first driver profile for a first driver of the plurality of drivers comprises:

receiving video data from a vehicle device in a first vehicle, the vehicle device comprising:

a first enclosure configured to be mounted to a window of the first vehicle, the first enclosure housing:

a first dashcam sensor comprising an inward driver-facing camera configured to record a video stream of the first driver and to generate the video data based on the video stream, the video data including one or more features identified by an event detection model and related to one or more distracted driving events; and a global positioning system (GPS) device configured to obtain vehicle location data associated with the first vehicle;

receiving vehicle metric data from a vehicle gateway device in the first vehicle, the vehicle gateway device comprising:

a second enclosure configured to be positioned in the first vehicle, the second enclosure housing:

a physical vehicle interface configured to couple the vehicle gateway device to a port in the first vehicle such that the vehicle gateway can communicate with at least one of a bus or an electronic controller of the first vehicle, wherein the vehicle gateway device is configured to obtain raw vehicle data from the at least one of the bus or the electronic controller of the first vehicle to determine the vehicle metric data, the vehicle metric data including acceleration data associated with the first vehicle and useable for harsh event determinations, the acceleration data determined based on at least one of: brake pedal engagement, accelerator pedal engagement, engine torque, or engine load;

inputting the video data and the vehicle metric data into an encoder of a first neural network, wherein the first neural network is trained using the encoder and a decoder, and wherein the first neural network is configured to identify harsh events and determine a driver profile based on the video data and the vehicle metric data; and receiving the first driver profile for the first driver as an output of the encoder, wherein the first driver profile includes one or more harsh events and one or more distracted driving events associated with the first driver, wherein the one or more harsh events include at least an acceleration above a threshold rate;

receiving a delivery task descriptor comprising a delivery task for delivery of cargo by a vehicle to a location at a particular time;

filtering the plurality of drivers to generate a second plurality of drivers, the filtering based on one or more of: vehicle location data or vehicle type of vehicles associated with the plurality of drivers;

for each driver of the second plurality of drivers:

inputting the individual driver profile and the delivery task descriptor into a second neural network, wherein the second neural network generates and applies weights for each harsh event of the one or more harsh events and each distracted driving event of the one or more distracted driving events, wherein the weights are based at least in part on the delivery task; and receiving from the second neural network a rating for the individual driver;

identifying a driver of the second plurality of drivers with a highest rating; and assigning the driver with the highest rating to the delivery task.

14. The non-transitory computer storage medium of claim 13, wherein the event detection model is executed on the vehicle gateway device.

15. The non-transitory computer storage medium of claim 14, wherein filtering the plurality of drivers is based on a type of cargo for the delivery.

16. The non-transitory computer storage medium of claim 13, wherein individual driver profiles are specific to an individual driver and an individual vehicle.

17. The non-transitory computer storage medium of claim 13, wherein the method further comprises wirelessly transmitting an alert to a device associated with the assigned driver, wherein the alert comprises information corresponding to the delivery task.

18. The non-transitory computer storage medium of claim 17, wherein the alert activates an application on the device associated with the assigned driver to display a pickup location for the delivery task.

19. The non-transitory computer storage medium of claim 17, wherein the alert activates an application on the device associated with the assigned driver to display a recommended route for the delivery task.

20. The non-transitory computer storage medium of claim 17, wherein the driver with the highest rating is automatically assigned to the delivery task.

* * * * *